US008316067B2

(12) United States Patent
Ito et al.

(10) Patent No.: US 8,316,067 B2
(45) Date of Patent: Nov. 20, 2012

(54) DECIMAL COMPUTING APPARATUS, ELECTRONIC DEVICE CONNECTABLE DECIMAL COMPUTING APPARATUS, ARITHMETIC OPERATION APPARATUS, ARITHMETIC OPERATION CONTROL APPARATUS, AND PROGRAM-RECORDED RECORDING MEDIUM

(75) Inventors: Hisashi Ito, Ome (JP); Tetsuichi Nakae, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 863 days.

(21) Appl. No.: 12/428,288

(22) Filed: Apr. 22, 2009

(65) Prior Publication Data
US 2009/0204658 A1 Aug. 13, 2009

Related U.S. Application Data

(62) Division of application No. 11/109,888, filed on Apr. 19, 2005, now Pat. No. 7,716,267.

(30) Foreign Application Priority Data

Aug. 30, 2004 (JP) ................................. 2004-250678
Sep. 3, 2004 (JP) ................................. 2004-257057

(51) Int. Cl.
*G06F 3/00* (2006.01)
*G06F 7/38* (2006.01)
(52) U.S. Cl. ........................................ 708/164; 708/552
(58) Field of Classification Search .................. 708/164, 708/168, 552, 553, 598
See application file for complete search history.

(56) References Cited

U.S. PATENT DOCUMENTS 3,786,480 A * 1/1974 Hatano et al. ................. 708/170
(Continued)

FOREIGN PATENT DOCUMENTS

JP 55067836 A * 5/1980
(Continued)

OTHER PUBLICATIONS

Japanese Office Action dated Oct. 27, 2009 and English translation thereof issued in counterpart Japanese Application No. 2004-257057.

(Continued)

*Primary Examiner* — Chuong D Ngo
(74) *Attorney, Agent, or Firm* — Holtz, Holtz, Goodman & Chick, PC

(57) ABSTRACT

A decimal calculation apparatus, which performs multidigit decimal calculation with the number of calculation digits set in a calculation instruction, includes a multidigit memory section which stores values with greater numbers of digits than the number of digits of a predetermined digit unit in a plurality of memory areas, a calculation-instruction memory section which stores the calculation instruction having the number of calculation digits and a type of calculation set therein, and a decimal calculation section which performs decimal calculation of sequentially calculating numerical values of corresponding digit units respectively stored in the plurality of memory areas of the multidigit memory section, digit unit by digit unit in the number of calculation digits set in the calculation instruction stored in calculation-instruction memory section, in decimal calculation according to type of calculation set in the calculation instruction stored in calculation-instruction memory section, and sequentially writing calculation results in the plurality of memory areas of the multidigit memory section digit unit by digit unit.

5 Claims, 39 Drawing Sheets

U.S. PATENT DOCUMENTS

| | | | |
|---|---|---|---|
| 4,021,655 A | 5/1977 | Healey et al. | |
| 4,456,955 A | 6/1984 | Yanagita et al. | |
| 4,536,854 A | 8/1985 | Yanagita | |
| 4,542,476 A | 9/1985 | Nagafuji | |

FOREIGN PATENT DOCUMENTS

| | | | |
|---|---|---|---|
| JP | 62-075838 A | 4/1987 | |
| JP | 4-7737 A | 1/1992 | |
| JP | 4-116717 A | 4/1992 | |
| JP | 05-089041 A | 4/1993 | |
| JP | 5-233853 A | 9/1993 | |
| JP | 6-230964 A | 8/1994 | |
| JP | 7-287649 A | 10/1995 | |
| JP | 8-263264 A | 10/1996 | |
| JP | 09-190335 A | 7/1997 | |

OTHER PUBLICATIONS

Suzuki, Hiroshi. "Accuracy Estimation Algorithm in Floating-Point Arithmetic Operation and its Evaluation." Research Report of Information Processing Society. Information Processing Society of Japan. Oct. 27, 1994: vol. 94 No. 92: pp. 27 to 33.

Suda, Reiji. "2.1. The Comparison and the Conditional Branching." Basic C Language and Algorithm. Aug. 30 2002. searched: Jun. 9 2008. <http://web.archive.org/web/20020830213509/http://www.na.cse.nagoya-u.ac.jp/~reiji/lect/alg01/sec2-1R.html>.

* cited by examiner

FIG. 5

| Fuad , Suad | REGISTERS |
|---|---|
| 00 | X |
| 01 | Y |
| 10 | Z |
| 11 | A |

FIG. 8

| PATTERNS | EXT | | INSTRUCTION | | FUNCTION EXAMPLES | |
|---|---|---|---|---|---|---|
| | VALUE | SERIAL/ 1-WORD INSTRUCTION | DIRECT/ INDIRECT ADDRESSING | IMAGINARY PORTION | OPERAND PORTION | MNEMONIC | OPERATION |
| (A) | 000 | SERIAL WORD | DIRECT ADDRESSING | ADD 000 | X15   Y4 | X4~15+Y | X4~15+Y4~15 → X4~15 |
| (B) | 010 | SERIAL WORD | INDIRECT ADDRESSING | ADD 010 | X15   Y* | Xv~15+Y | Xv~15+Yv~15 → Xv~15 |
| (C) | 100 | SERIAL WORD | INDIRECT ADDRESSING | ADD 100 | X*    Y4 | X4~w+Y | X4~w+Y4~w → X4~w |
| (D) | 110 | SERIAL WORD | INDIRECT ADDRESSING | ADD 110 | X*    Y* | Xv~w+Y | Xv~w+Yv~w → Xv~w |
| (E) | 001 | 1-WORD | DIRECT ADDRESSING | ADD 001 | X15   Y4 | X15+Y4 | X15+Y4 → X15 |
| (F) | 011 | 1-WORD | INDIRECT ADDRESSING | ADD 011 | X15   Y* | X15+Yv | X15+Yv → X15 |
| (G) | 101 | 1-WORD | INDIRECT ADDRESSING | ADD 101 | X*    Y4 | Xw+Y4 | Xw+Y4 → Xw |
| (H) | 111 | 1-WORD | INDIRECT ADDRESSING | ADD 111 | X*    Y* | Xw+Yv | Xw+Yv → Xw |

ADD: ADDITION
Rn: VALUE STORED IN n-TH WORD IN REGISTER R
*: ARBITRARY VALUE
w: DATA w STORED IN REGISTER W
v: DATA v STORED IN REGISTER V

FIG. 12

| PATTERNS | EXT | | | FUNCTION EXAMPLES | | | |
|---|---|---|---|---|---|---|---|
| | VALUE | SERIAL/ 1-WORD INSTRUCTION | DIRECT/ INDIRECT ADDRESSING | INSTRUCTION | | MNEMONIC | OPERATION |
| | | | | IMAGINARY PORTION | OPERAND PORTION | | |
| (I) | 0000 | SERIAL WORD | DIRECT ADDRESSING | ADD 0000 | X15  Y4 | X4~15+Y | X4~15+Y4~15→X4~15 |
| (J) | 0010 | SERIAL WORD | INDIRECT ADDRESSING | ADD 0010 | X15  Y* | Xv~15+Y | Xv~15+Yv~15→Xv~15 |
| (K) | 0100 | SERIAL WORD | INDIRECT ADDRESSING | ADD 0100 | X15  Y* | Xi~15+Y | Xi~15+Yi~15→Xi~15 |
| (L) | 1000 | SERIAL WORD | INDIRECT ADDRESSING | ADD 1000 | X*  Y4 | X4~w+Y | X4~w+Y4~w→X4~w |
| (M) | 1010 | SERIAL WORD | INDIRECT ADDRESSING | ADD 1010 | X*  Y* | Xv~w+Y | Xv~w+Yv~w→Xv~w |
| (N) | 1100 | SERIAL WORD | INDIRECT ADDRESSING | ADD 1100 | X*  Y* | Xi~w+Y | Xi~w+Yi~w→Xi~w |
| (O) | 0001 | 1-WORD | DIRECT ADDRESSING | ADD 0001 | X15  Y4 | X15+Y4 | X15+Y4→X15 |
| (P) | 0011 | 1-WORD | INDIRECT ADDRESSING | ADD 0011 | X15  Y* | X15+Yv | X15+Yv→X15 |
| (Q) | 0101 | 1-WORD | INDIRECT ADDRESSING | ADD 0101 | X15  Y* | X15+Yi | X15+Yi→X15 |
| (R) | 1001 | 1-WORD | INDIRECT ADDRESSING | ADD 1001 | X*  Y4 | Xw+Y4 | Xw+Y4→Xw |
| (S) | 1011 | 1-WORD | INDIRECT ADDRESSING | ADD 1011 | X*  Y* | Xw+Yv | Xw+Yv→Xw |
| (T) | 1101 | 1-WORD | INDIRECT ADDRESSING | ADD 1101 | X*  Y* | Xw+Yi | Xw+Yi→Xw |

ADD: ADDITION
Rn: VALUE STORED IN n-TH WORD OR n-TH DIGIT IN REGISTER R
*: ARBITRARY VALUE w: DATA w STORED IN REGISTER W
v: DATA v STORED IN REGISTER V
i: DATA i STORED IN REGISTER I

```
                                                    ...(33)
REGISTER A + 0.04 →  1.4    REGISTER A
                     5.88
REGISTER W × 0.04 →  0.2352  ...(34) REGISTER Z
                     4.2
REGISTER Y × 0.04 × 0.04 → 0.00672 ...(35) REGISTER Z
                           0.000064 ...(36)
0.04 × 0.04 × 0.04 →       REGISTER Z
                     6.2208  ...(38)
3 × 1.44 × 1.44 →    4.32    REGISTER B
                            ...(39)
3 × 1.44 →           REGISTER Y
```

```
SET REGISTER CALCULATION START
DIGIT TO 56 (DECIMAL PORTION 6 DIGITS),
AND CALCULATION END DIGIT TO 15
(INTEGER PORTION 1 DIGIT)

0.25600              0.235200             0.020800
REGISTER X - REGISTER Z → REGISTER X 0.020800             0.006720             0.014080
REGISTER X - REGISTER Z → REGISTER X 0.014080             0.000064             0.014016 ...(37)
REGISTER X - REGISTER Z → REGISTER X
```

FIG. 34A

ARBITRARY DIGIT OPERATION

- ◆ NUMBER OF OPERATION DIGITS: [ 8 ] DIGITS — 4011a, 4013a
- ◆ OPERATION TYPE: [ $(1+x)^3 - 1$ ] ▼
- ◆ OPERAND: [ 0.00123 ] — 4015a
- ◇ OPERATION RESULT: [ ]
- ◇ DIGIT INCREASE DISPLAY: [ ]
- ◇ NUMBER OF UNDERFLOWED DIGITS: [ ]    ◇ EFFECTIVE PRECISION: [ ]

| NUMBER OF UNDERFLOWED DIGITS | EFFECTIVE PRECISION | DIGIT INCREASE DISPLAY | DISTINCTIVE DISPLAY |

ARBITRARY DIGIT OPERATION

- ◆ NUMBER OF OPERATION DIGITS: [ 8 ] DIGITS
- ◆ OPERATION TYPE: [ $(1+x)^3 - 1$ ] ▼
- ◆ OPERAND: [ 0.00123 ]
- ◇ OPERATION RESULT: [ 3.6945000 e-3 ] — 4017a
- ◇ DIGIT INCREASE DISPLAY: [ ]
- ◇ NUMBER OF UNDERFLOWED DIGITS: [ ]    ◇ EFFECTIVE PRECISION: [ ]

| NUMBER OF UNDERFLOWED DIGITS | EFFECTIVE PRECISION | DIGIT INCREASE DISPLAY | DISTINCTIVE DISPLAY |

```
≡ ARBITRARY DIGIT OPERATION ≡
```

- ◆ NUMBER OF OPERATION DIGITS: 8 DIGITS
- ◆ OPERATION TYPE: (1+x)³ − 1
- ◆ OPERAND: 0.00123

- ◇ OPERATION RESULT: 3.6945000 e-3
- ◇ DIGIT INCREASE DISPLAY:
- ◇ NUMBER OF UNDERFLOWED DIGITS: [3]   ◇ EFFECTIVE PRECISION:

| NUMBER OF UNDERFLOWED DIGITS | EFFECTIVE PRECISION | DIGIT INCREASE DISPLAY | DISTINCTIVE DISPLAY |
|---|---|---|---|

```
≡ ARBITRARY DIGIT OPERATION ≡
```

- ◆ NUMBER OF OPERATION DIGITS: 8 DIGITS
- ◆ OPERATION TYPE: (1+x)³ − 1
- ◆ OPERAND: 0.00123

- ◇ OPERATION RESULT: 3.6945000 e-3
- ◇ DIGIT INCREASE DISPLAY:
- ◇ NUMBER OF UNDERFLOWED DIGITS:    ◇ EFFECTIVE PRECISION: [5]  — 4023a

| NUMBER OF UNDERFLOWED DIGITS | EFFECTIVE PRECISION | DIGIT INCREASE DISPLAY | DISTINCTIVE DISPLAY |
|---|---|---|---|

ARBITRARY DIGIT OPERATION

- ◆ NUMBER OF OPERATION DIGITS: 8 DIGITS
- ◆ OPERATION TYPE: $(1+x)^3 - 1$
- ◆ OPERAND: 0.00123

- ◇ OPERATION RESULT: 3.6945000 e-3
- ◇ DIGIT INCREASE DISPLAY: 3.6945056000 e-3 — 4019a
- ◇ NUMBER OF UNDERFLOWED DIGITS: ◇ EFFECTIVE PRECISION

| NUMBER OF UNDERFLOWED DIGITS | EFFECTIVE PRECISION | DIGIT INCREASE DISPLAY | DISTINCTIVE DISPLAY |

ARBITRARY DIGIT OPERATION

- ◆ NUMBER OF OPERATION DIGITS: 8 DIGITS
- ◆ OPERATION TYPE: $(1+x)^3 - 1$
- ◆ OPERAND: 0.00123

- ◇ OPERATION RESULT: 3.6945 000 e-3 — 4017a
- ◇ DIGIT INCREASE DISPLAY:
- ◇ NUMBER OF UNDERFLOWED DIGITS: ◇ EFFECTIVE PRECISION

| NUMBER OF UNDERFLOWED DIGITS | EFFECTIVE PRECISION | DIGIT INCREASE DISPLAY | DISTINCTIVE DISPLAY |

```
≡ ARBITRARY DIGIT OPERATION ≡
◆ NUMBER OF
  OPERATION DIGITS    [ 8         ]  DIGITS
◆ OPERATION TYPE     [ (1+x)³ - 1 ] ▼
◆ OPERAND            [ 0.00123    ]

◇ OPERATION RESULT   [            ]         — 4031
◇ DIGIT INCREASE
  DISPLAY            [            ]
◇ NUMBER OF          [    ]  ◇ EFFECTIVE  [    ]
  UNDERFLOWED                   PRECISION
  DIGITS

| NUMBER OF    | EFFECTIVE | DIGIT    | DISTINCTIVE |
| UNDERFLOWED  | PRECISION | INCREASE | DISPLAY     |
| DIGITS       |           | DISPLAY  |             |
```

```
≡ ARBITRARY DIGIT OPERATION ≡
◆ NUMBER OF
  OPERATION DIGITS    [ 8         ]  DIGITS
◆ OPERATION TYPE     [ (1+x)³ - 1 ] ▼
◆ OPERAND            [ 0.00123    ]

◇ OPERATION RESULT   [ 3.6945406 e-3 ]      — 4031a
◇ DIGIT INCREASE
  DISPLAY            [            ]
◇ NUMBER OF          [    ]  ◇ EFFECTIVE  [    ]
  UNDERFLOWED                   PRECISION
  DIGITS

| NUMBER OF    | EFFECTIVE | DIGIT    | DISTINCTIVE |
| UNDERFLOWED  | PRECISION | INCREASE | DISPLAY     |
| DIGITS       |           | DISPLAY  |             |
```

4030

US 8,316,067 B2

DECIMAL COMPUTING APPARATUS, ELECTRONIC DEVICE CONNECTABLE DECIMAL COMPUTING APPARATUS, ARITHMETIC OPERATION APPARATUS, ARITHMETIC OPERATION CONTROL APPARATUS, AND PROGRAM-RECORDED RECORDING MEDIUM

CROSS-REFERENCE TO RELATED APPLICATIONS

The present application is a Divisional Application of U.S. application Ser. No. 11/109,888 filed Apr. 19, 2005 now U.S. Pat. No. 7,716,267, which is based on Japanese Patent Application No. 2003-359453 filed on Oct. 20, 2003, Japanese Patent Application No. 2004-250678 filed on Aug. 30, 2004, and Japanese Patent Application No. 2004-257057 filed on Sep. 3, 2004, which are all incorporated herein by reference.

FIELD OF THE INVENTION

The present invention relates to an arithmetic unit, such as a decimal calculation apparatus.

DESCRIPTION OF THE RELATED ART

Arithmetic systems equipped with an arithmetic unit, such as a CPU (Central Processing Unit), are popular. There are various standards for an arithmetic unit, a memory and so forth which constitute an arithmetic system. The ANSI/IEEE 754-1985 standard (hereinafter simply called "IEEE 754") is an operation standard defining, for example, a binary floating-point operation. The IEEE 754 defines the numerical form (precision) that is handled in a binary floating-point operation in three types, namely, single precision (32 bits), double precision (64 bits) and long double precision (96 bits).

FIG. 28 is a diagram showing one example of the logical hierarchical structure of a conventional arithmetic system. The arithmetic system has a hierarchical structure having a CPU or an arithmetic unit as the lowermost layer, and an OS (Operating System) or the basic software which controls the CPU, a compiler which converts an overlying application program written in a high-level language to a machine-language program, a commercially available application, such as spreadsheet software or wordprocessing software, and a user application layered in order over the bottom layer.

As the conventional arithmetic system is built up as a circuit which performs an operation with a given precision (number of effective digits) as defined in, for example, the IEEE 754, it has the following shortcomings.

(1) Restriction on the Number of Effective Digits

The operation precision or the number of effective digits in the arithmetic system comprising the conventional arithmetic unit is limited to precisions defined by the operation standard (three types in the IEEE 754). That is, an operation with other numbers of digits than the specified number of effective digits cannot be performed. This disables execution of an operation with the exact precision required.

(2) Error in Binary Operation

As the arithmetic unit performs a binary operation, numerical data in the arithmetic system is expressed in binary notation. This requires binary-decimal conversion, so that an conversion-originated error is inevitable. In convergent calculation or the like, for example, every time a repetitive operation is performed, the error becomes larger with the restriction on the number of effective digits. To cancel the error, binary operations should be performed with a precision higher than the precision of decimal operations.

(3) Complex Program Writing Due to Restriction on the Number of Effective Digits The arithmetic unit is constructed in such a way as to perform an operation with a precision defined by the operation standard. Therefore, a machine instruction code is written in such a way as to perform an operation with an operation precision (number of effective digits) of the arithmetic unit, and the precision (number of effective digits) of an instruction code is fixed. As the precision (number of effective digits) cannot be designated in an instruction code itself, the precision should be coped with by a program, thus making program writing complex.

SUMMARY OF THE INVENTION

Accordingly, it is an object of the invention to provide a decimal calculation apparatus which can freely set the number of calculation digits at the time of performing calculation with a calculation instruction, and efficiently executes calculation in the set number of calculation digits with small-size calculation means To achieve the object, according to one aspect of the invention, there is provided a decimal calculation apparatus which performs multidigit decimal calculation with a number of calculation digits set in a calculation instruction, and comprises:

a multidigit memory section (e.g., a register section 360 in FIG. 9) capable of storing values with greater numbers of digits than a number of digits of a predetermined digit unit in a plurality of memory areas;

a calculation-instruction memory section (e.g., a program ROM 310 in FIG. 9) which stores a calculation instruction having a number of calculation digits and a type of calculation set therein; and a decimal calculation section (e.g., a computing unit 370 in FIG. 9) which performs decimal calculation of sequentially calculating numerical values of corresponding digit units respectively stored in the plurality of memory areas of the multidigit memory section, the digit unit by the digit unit in the number of calculation digits set in the calculation instruction stored in the calculation-instruction memory section, in decimal calculation according to the type of calculation set in the calculation instruction stored in the calculation-instruction memory section, and sequentially writing calculation results in the plurality of memory areas of the multidigit memory section the digit unit by the digit unit.

BRIEF DESCRIPTION OF THE DRAWINGS

These objects and other objects and advantages of the present invention will become more apparent upon reading of the following detailed description and the accompanying drawings in which:

FIG. 5 shows the correlation between upper addresses Fuad and Suad, and a designated register;

FIG. 8 shows the correlation between an extended instruction code EXT and an functional example of the arithmetic unit according to the first embodiment;

FIG. 12 shows the correlation between an extended instruction code EXT and an functional example of the arithmetic unit according to the second embodiment;

FIG. 20 is a diagram illustrating the cube root operation routine in the arithmetic unit according to the second embodiment;

FIG. 34A is a diagram showing one example of a display screen when entry of the number of operation digits, designation of an operation type and entry of an operand are carried out;

FIG. 34B is a diagram showing one example of a display screen when the result of the first operation (designated digit operation) is displayed;

FIG. 35A is a diagram showing one example of a display screen when an underflow digit number display instruction is given;

FIG. 35B is a diagram showing one example of a display screen when an effective precision digit number display instruction is given;

FIG. 36A is a diagram showing one example of a display screen when a digit number increase display instruction is given;

FIG. 36B is a diagram showing one example of a display screen when an underflow portion identification instruction is given;

FIG. 39A is a flowchart showing one example of a display screen when entry of the number of operation digits, designation of an operation type and entry of an operand are carried out in the second operation (additional digit operation) display routine; and FIG. 39B is a flowchart showing one example of a display screen when the underflowed result of the second operation (additional digit operation) is displayed.

DETAILED DESCRIPTION OF THE PREFERRED EMBODIMENTS

[First Embodiment]

A first embodiment to carry out the invention will be described below with reference to the accompanying drawings.

Figure 1:
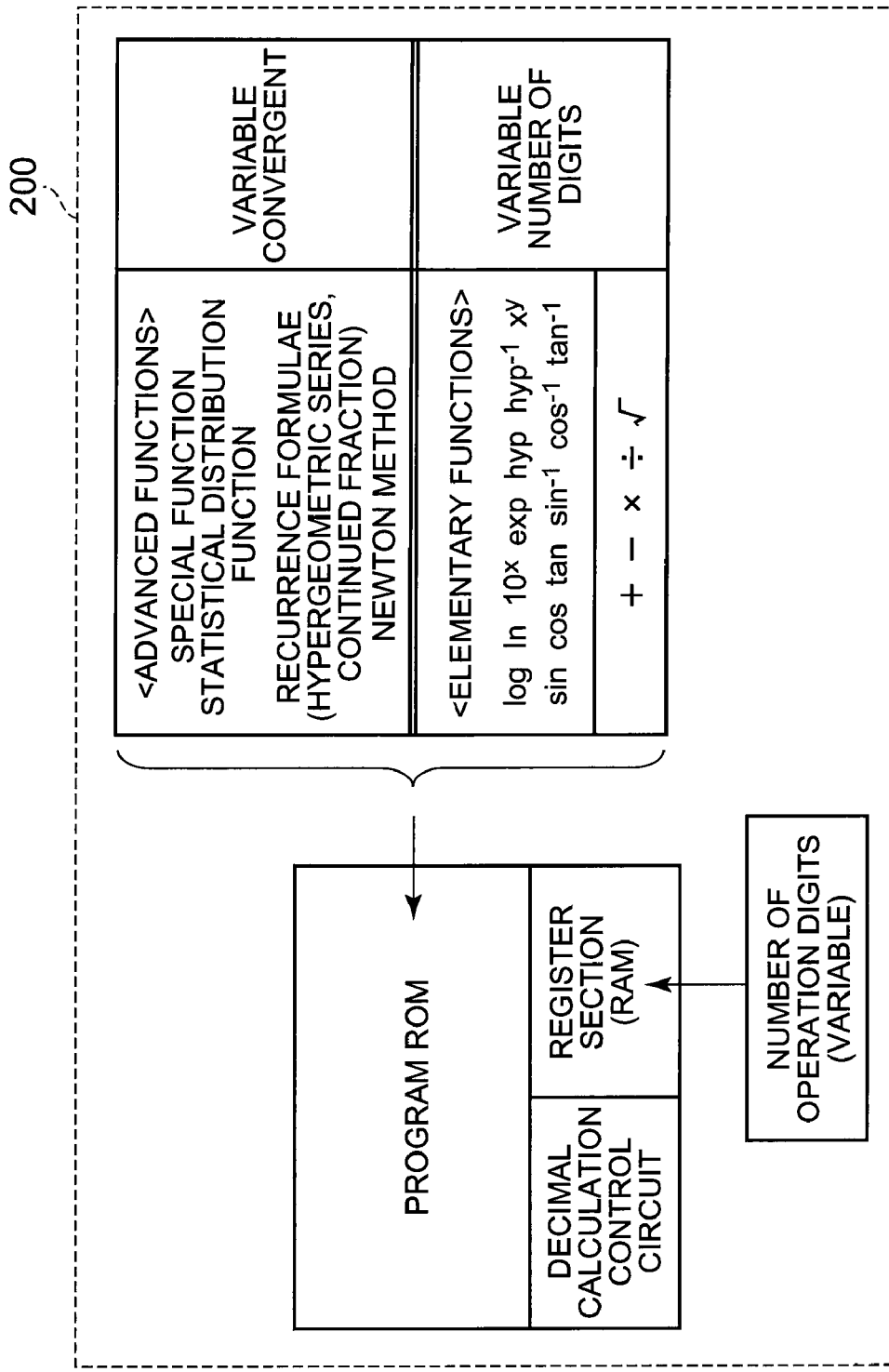
FIG. 1 is a schematic diagram showing the fundamental structure of an arithmetic unit embodying the invention.

FIG. 1 is a schematic diagram showing the fundamental structure of an arithmetic unit 200 according to the first embodiment. The arithmetic unit 200 comprises a program ROM which stores an operation program, an arithmetic control circuit which reads the operation program and runs it, and a register section for temporarily storing operation data.

The number of operation digits (number of effective digits) of the register section is variable to achieve a variable number of operation digits in arithmetical operations of addition, subtraction, multiplication and division, basic operations on a square root or the like, and operations of elementary functions, such as a logarithmic function and a trigonometric function, and also achieve variable convergent conditions in operations of advanced functions, such as special functions and statistical distribution functions, and operations on recurrence formulae or the like. The arithmetic control circuit also performs decimal operations to prevent occurrence of an error originating from binary-to-decimal conversion.

A specific example of an arithmetic system equipped with such an arithmetic unit.

Figure 2A:
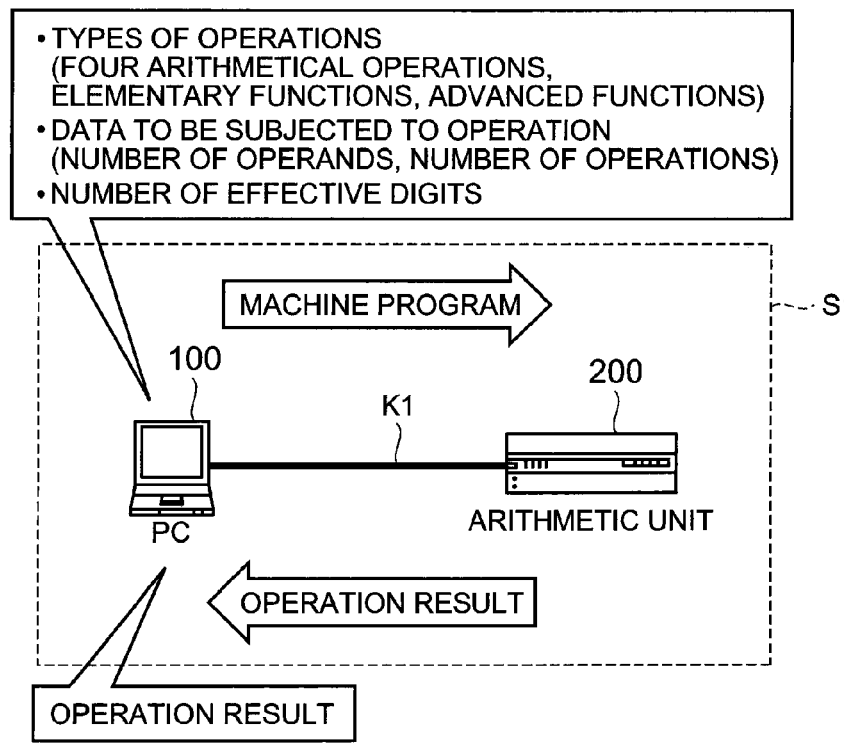
FIG. 2A is a schematic structural diagram of an arithmetic system according to a first embodiment of the invention.

FIG. 2A is a schematic structural diagram of an arithmetic system S1. The arithmetic system S1 comprises a PC (Personal Computer) 100 and an arithmetic unit 200. The PC 100 and the arithmetic unit 200 are connected together by a communication cable K1 like a USB (Universal Serial Bus) cable so as to be able to exchange data with each other.

The PC 100 is achieved by a computer which comprises a CPU (Central Processing Unit), ROM (Read Only Memory), RAM (Random Access Memory), an input device, such as a keyboard and a mouse or the like, a display device, and a communication unit having a connection terminal to which the communication cable K1 is connectable. The PC 100 serves as a man-machine interface between the arithmetic system S1 and a user.

The PC 100 generates a machine program based on the number of operation arbitrarily designated by a user, the types of operations (arithmetical operations, elementary functions, advanced functions, etc.) and initial data values to be subjected to operations, and transfers the machine program to the arithmetic unit 200, which perform the operations. The results of the operations done by the arithmetic unit 200 are displayed on the display device.

The arithmetic unit 200 executes numerical operations according to the machine program transferred from the PC 100, and, particularly, performs an operation on each of instructions constituting the machine program in the number of operation digits that is designated in that instruction. The arithmetic unit 200 sends the operation result to the PC 100. The numerical operations which are executed by the arithmetic unit 200 are classified into two, (1) a direct addressing type and (2) an indirect addressing type, according to how the number of operation digits is designated.

Figure 2B:
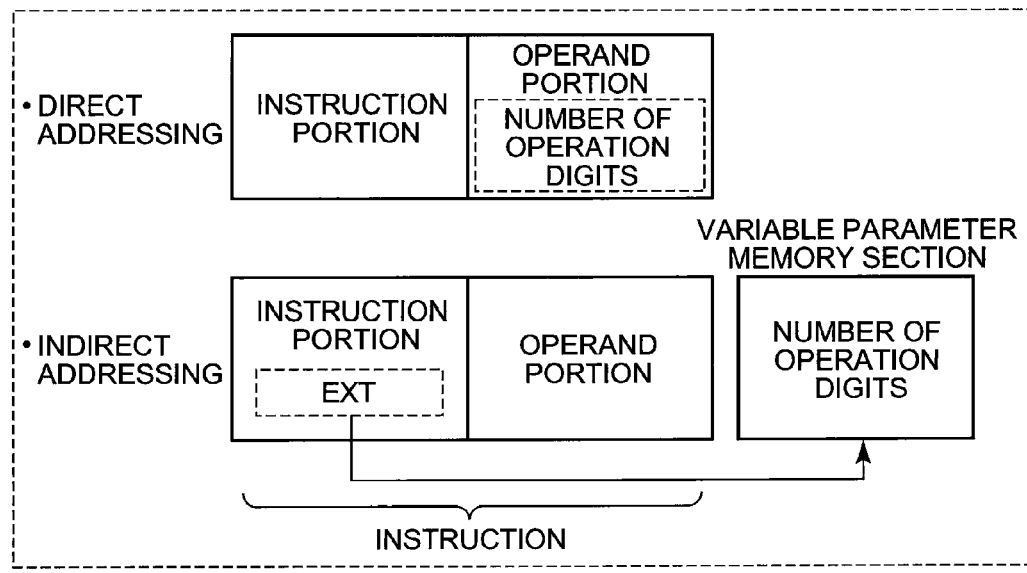
FIG. 2B is a schematic structural diagram of the arithmetic system according to the first embodiment

As shown in FIG. 2B, the direct addressing type is an instruction type to directly designate the number of operation digits in an operand portion. The arithmetic unit 200 executes a numerical operation on an instruction in the number of operation digits designated in the operand portion of the instruction.

The indirect addressing type is an instruction type to designate the location where the number of operation digits is stored (i.e., to indirectly designate the number of operation digits). The arithmetic unit 200 reads the number of operation digits from a location designated by an instruction, and executes a numerical operation on the instruction in the read number of operation digits.

Figure 3:
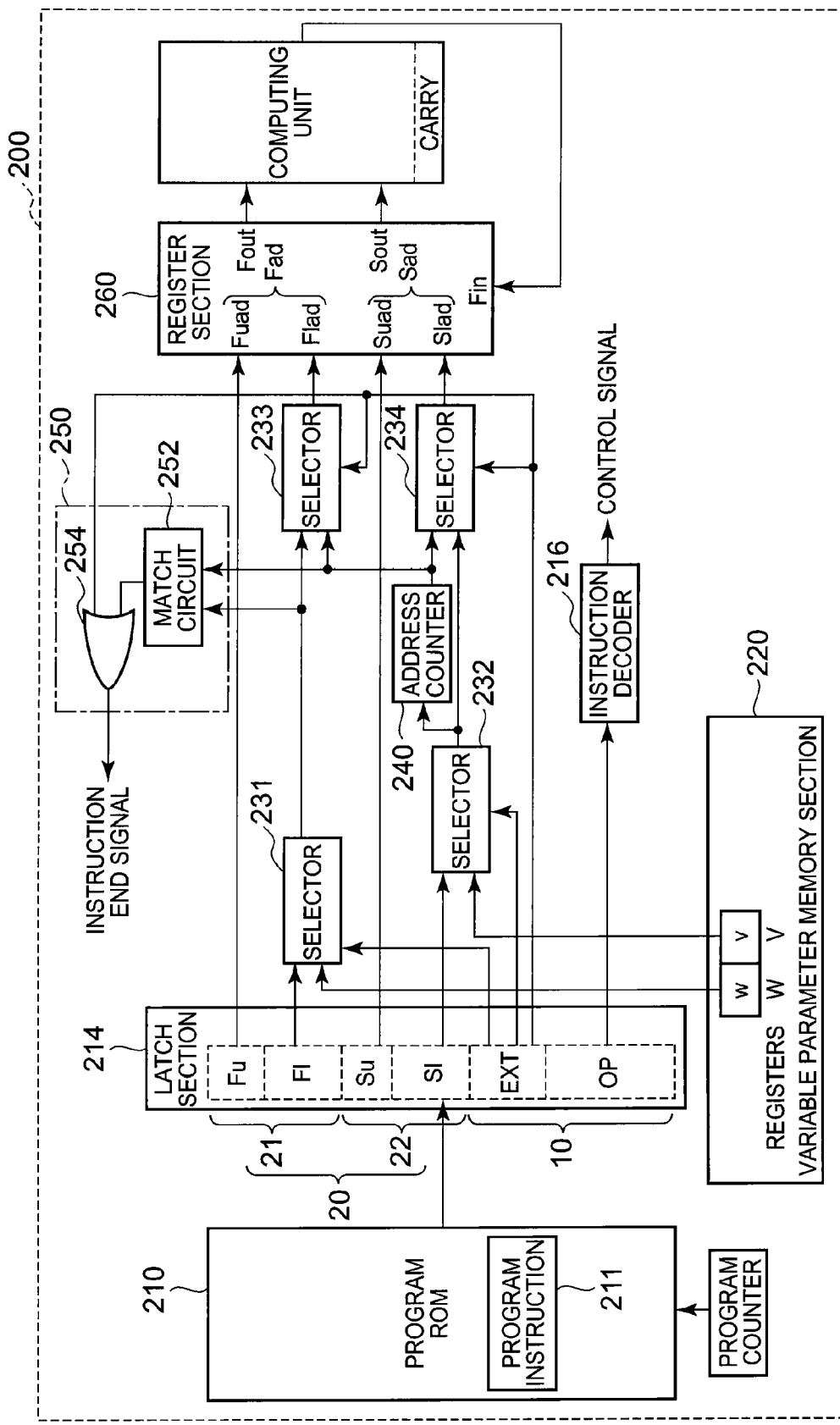
FIG. 3 is a circuit structural diagram of the essential portions of an arithmetic unit according to the first embodiment.

FIG. 3 is a block diagram showing the circuit structure of the arithmetic unit 200, and shows the essential portions that are associated with execution of numerical operations. Referring to FIG. 3, the arithmetic unit 200 comprises a program ROM 210, a program counter 212, a latch section 214, an instruction decoder 216, a variable parameter memory section 220, selectors 231, 232, 233 and 234, an address counter 240, a register section 260, a computing unit 270, and an end decision circuit 250.

The program ROM 210, which is constructed by, for example, an EEPROM (Electrical Erasable Programmable ROM) that is an electrically programmable memory, stores a machine program transferred from the PC 100 as a program instruction 211. The program instruction 211 is comprised of one or more calculation instructions in each of which the type of calculation and the number of calculation digits are set. Program instructions 211 stored in the program ROM 210 at addresses indicated by the address counter 240 are read out one after another and are stored in the latch section 214. The program ROM 210 may be replaced with an electrically programmable non-volatile RAM or the like. The latch section 214, which is constituted by a programmable memory, such as RAM, holds a single instruction read from the program ROM 210.

A single instruction comprises an instruction portion 10 and an operand portion 20. The instruction portion 10 has an instruction code OP and a 3-bit extended instruction code EXT. The operand portion 20 has a first operand portion 21 and a second operand portion 22 each consisting of six bits. The first operand portion 21 comprises 2-bit data Fu and 4-bit data F1, and the second operand portion 22 comprises 2-bit data Su and 4-bit data S1. The details of those data will be given later.

The instruction decoder 216 decodes the instruction code OP latched in the latch section 214, and outputs various control signals for execution of various control circuits in the arithmetic unit 200. For example, the instruction decoder 216 sends the computing unit 270 an operation control signal for allowing the computing unit 270 to execute the decoded instruction.

The variable parameter memory section 220, constituted by a RAM or the like, has registers W and V each capable of storing 4-bit data. In case of indirect addressing, the number of operation digits is stored in the registers W and V which store values to be the number of operation digits in a changeable manner.

The selector 231 receives the data F1 latched in the latch section 214 and data stored in the register W (hereinafter called "data w"), and receives data of the third bit in the extended instruction code EXT (hereinafter called "data EXT[3]") as a select control signal. The selector 231 selects and outputs one of the two input data according to the select control signal or the value of the data EXT[3]. Specifically, the selector 231 selectively outputs the data w when the value of the data EXT[3] is "1", and selectively outputs the data F1 when the value of the data EXT[3] is "0".

The selector 232 receives the data S1 latched in the latch section 214 and data, stored in the register V (hereinafter called "data v"), and receives data of the second bit in the extended instruction code EXT (hereinafter called "data EXT[2]") as a select control signal. The selector 232 selects and outputs one of the two input data according to the select control signal or the value of the data EXT[3]. Specifically, the selector 232 selectively outputs the data v when the value of the data EXT[2] is "1", and selectively outputs the data S1 when the value of the data EXT[2] is "0".

The address counter 240 is a 4-bit up counter in which the output data of the selector 232 is set as an initial value. The address counter 240 counts up in synchronism with an internal clock, and outputs a present count value.

The selector 233 receives the output data of the selector 231 and the output data of the address counter 240 (count value), and receives data of the first bit in the extended instruction code EXT (hereinafter called "data EXT[1]") as a select control signal. The selector 233 selects and outputs one of the two input data according to the value of the data EXT[1]. Specifically, the selector 233 selectively outputs the output data of the selector 231 when the value of the data EXT[1] is "1", and selectively outputs the output data of the address counter 240 when the value of the data EXT[2] is "0".

The selector 234 receives the output data of the selector 232 and the output data of the address counter 240, and receives the data EXT[1] as a select control signal. The selector 234 selects and outputs one of the two input data according to the value of the data EXT[1]. Specifically, the selector 234 selectively outputs the output data of the selector 232 when the value of the data EXT[1] is "1", and selectively outputs the output data of the address counter 240 when the value of the data EXT[2] is "0".

The end decision circuit 250 has a match circuit 252 and an OR gate 254.

The match circuit 252 receives output data of the selector 231 and output data of the address counter 240. and outputs a match signal "1" when both input data match with each other, and outputs an unmatch signal "0" when they do not match with each other. The output signal of the match circuit 252 and data EXT[1] are input to the OR gate 254, which in turn outputs a signal of the logic sum of the two input signals.

Therefore, the end decision circuit 250 outputs an instruction end signal "1" when the output data of the address counter 240 matches with the output data of the selector 231 or when the value of the data EXT[1] is "1", and outputs an instruction continue signal "0" otherwise.

The register section 260, constituted by a RAM or the like, is a data register which stores values of the individual digits of BCD coded operation data in the order of addresses every predetermined number of digits. The register section 260 is a dual-port register having two ports for each of address designation and data output.

At the first port, 16-bit data stored at a 6-bit address Fad with 2-bit data input from an address terminal Fuad as an upper address and 4-bit data input from an address terminal Flad as a lower address is output from an output terminal Fout. Data Fu latched in the latch section 214 is input to an address terminal Fuad, and output data of the selector 233 is input to an address terminal Flad.

At the second port, 16-bit data stored at a 6-bit address Sad with 2-bit data input from an address terminal Suad as an upper address and 4-bit data input from an address terminal Slad as a lower address is output from an output terminal Sout. Data Su latched in the latch section 214 is input to an address terminal Suad, and output data of the selector 234 is input to an address terminal Slad.

16-bit data is input to the register section 260 from air input terminal Fin, and is written at the address ad.

The computing unit 270 capable of performing a 16-bit operation performs an operation according to an operation control signal input from the instruction decoder 216 the invention while the instruction end signal "1" is not output from the end decision circuit 250 (i.e., while the instruction continue signal "0" is output). In other words, the computing unit 270 receives 16-bit data output from each of the output terminals Fout and Sout of the register section 260, performs an operation on the two input data, and outputs the operation result as 16-bit data. The output data (operation result) of the computing unit 270 is input to the input terminal Fin of the register section 260 and written in the register section 260.

Figure 4:
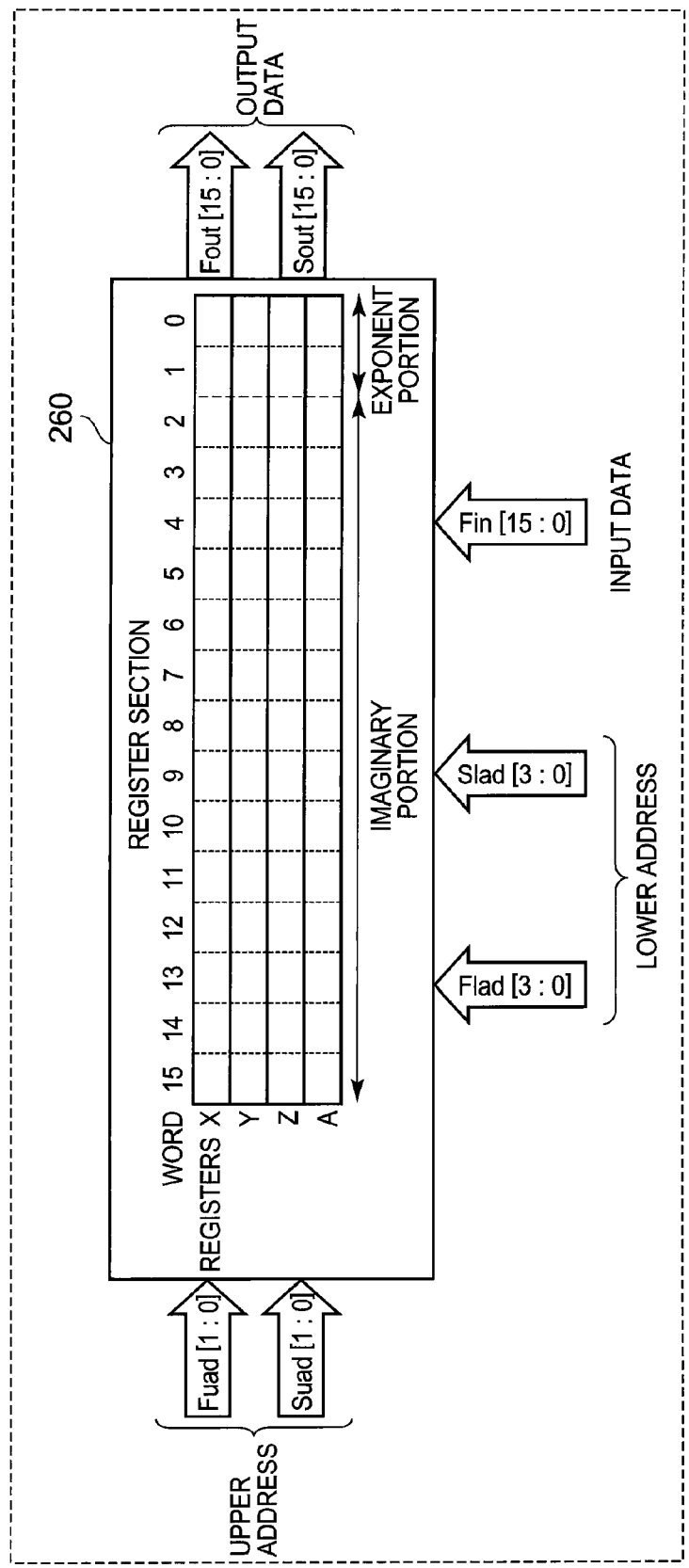
FIG. 4 is a structural diagram of a register section.

FIG. 4 is a diagram showing the detailed structure of the register section 260. Referring to the diagram, the register section 260 has four registers X, Y, Z and A each has a capacity of 16 words. One word consists of 16 bits and operation data is stored in a BCD coded form, so that one word is equivalent to four digits in decimal notation. Each register stores data of a floating-point type whose format has upper 14 words (second to fifteenth words) as an imaginary portion and lower two words (0-th word to the first word) as an exponent portion (including a sign).

Figure 5:
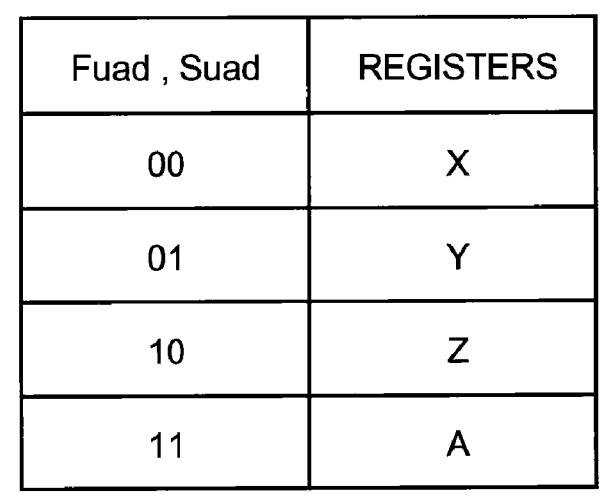

The register section 260 is addressed by designating a register with a 2-bit upper address and designating a word in the register with a 4-bit lower address. That is, addressing of the register section 260 is executed word by word, and one word of data or 16-bit data is output. The values of the upper addresses Fuad and Suad are associated with the registers as shown in a data table in FIG. 5. The value of each of the lower addresses Flad and Slad indicates a word.

Specifically, at the first port, the 2-bit upper address Fuad [1:0] designates a register, the 4-bit lower address Flad[3:0] designates a word in the register, and one word or 16-bit data Fout[15:0] is output. At the second port, the 2-bit upper address Suad[1:0] designates a register, the 4-bit lower address Slad[3:0] designates a word in the register, and one word or 16-bit data Sout[15:0] is output.

Further, one word or 16-bit data Fout[15:0] is input, and is written in a word designated by the address Fad.

Instructions which are executed by the arithmetic system S1 are classified into two, (1) 1-word instruction and (2) a serial word instruction (variable digit number operation instruction), according to the number of operations of the computing unit 270 with respect to one instruction.

In a 1-word instruction, only a single word is designated at each port for one instruction and the computing unit 270 performs an operation only once. In a 1-word instruction, therefore, operation data of one word designated by the address Fad becomes an operand and operation data of one word designated by the address Sad becomes an operator.

In a serial word instruction, a plurality of consecutive words are designated in order at each port for one instruction and the computing unit 270 performs operations on the individual words in order. That is, the computing unit 270 repeatedly performs the same operation on operation data of each of words designated in order. The lower addresses Flad and Slad designate words from the designated start word to the designated end word in order. With n being the start word and m being the end word, a total of (m−n+1) words from the n-th word to the m-th word are designated in order for each register designated by the upper address Fuad, Suad, operations are executed accordingly, and operation results are written in the n-th word to the m-th word in the register designated by the upper address Fuad. That is, a numerical operation is executed in (4×(m−n+1)) digits.

In a serial word instruction, therefore, each operation data of consecutive words from the n-th word to the m-th word, designated by the address Fuad, becomes an operand and each operation data of consecutive words from the n-th word to the m-th word, designated by the address Suad becomes an operator.

A start word and an end word are designated by data included in the operand portion 20 of an instruction or data stored in the variable parameter memory section 220. Specifically, the start word is designated by data v in case of indirect addressing and is designated by data S1 in case of direct addressing. The end word is designated by data w in case of indirect addressing and is designated by data F1 in case of direct addressing.

Figure 6:
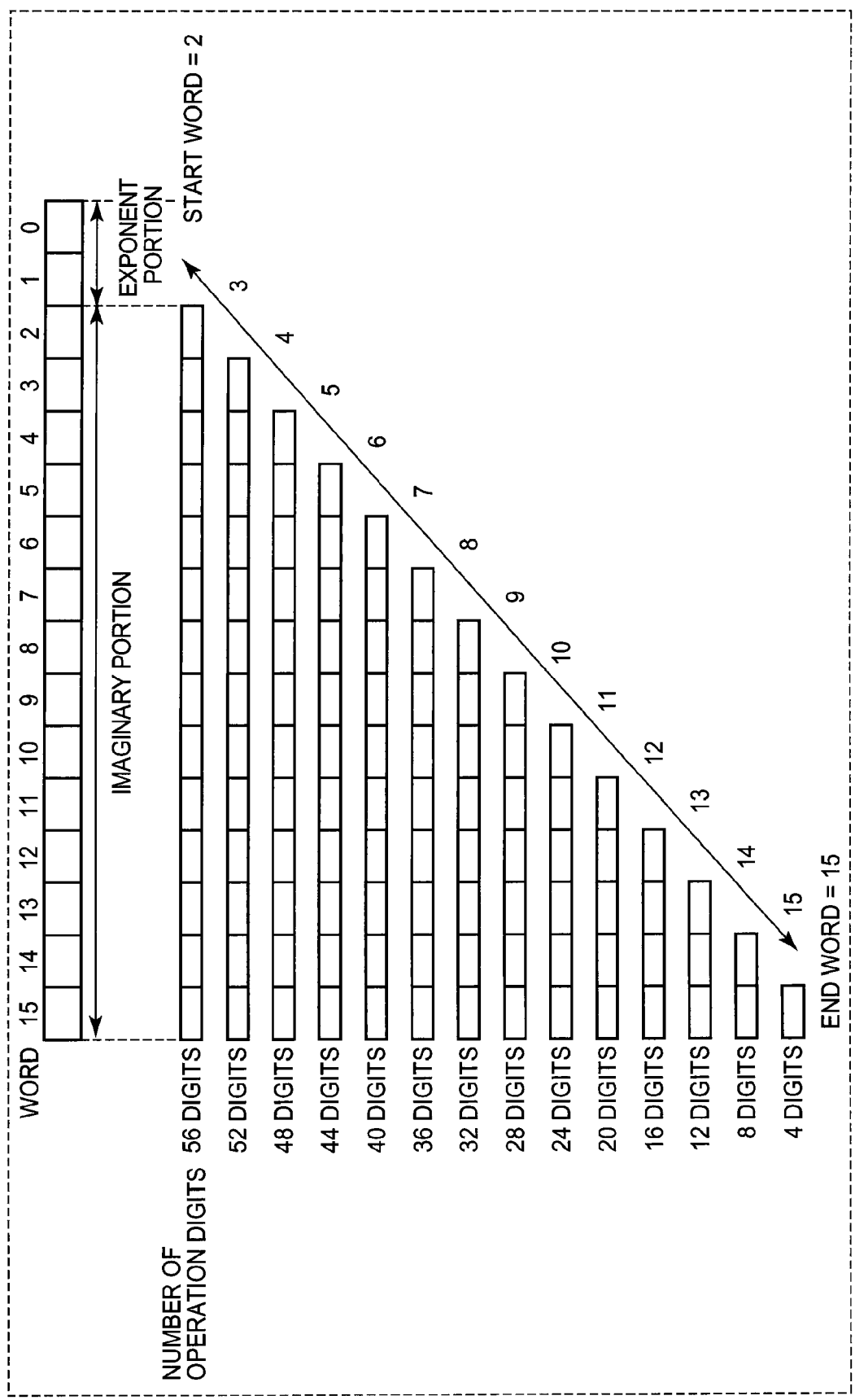
FIG. 6 is a diagram showing a change in the number of operation digits caused by a change in a start word according to the first embodiment.

FIG. 6 is a diagram showing an example of designating a start word and an end word in a serial word instruction. FIG. 6 shows a case where an end word is fixed to "15" and a start word is variable. When the start word is changed from the second word or the lowest word in the imaginary portion to the fifteenth word or the topmost word, as shown in the diagram, the number of operation digits changes to 56, 52, 48, . . . , and 4. word by word, i.e., by four digits. In other words, in a serial word instruction, a numerical operation in the desired number of operation digits can be achieved by adequately setting the start word and the end word.

Whether a serial word instruction or a 1-word instruction and whether indirect addressing or direct addressing are designated by the extended instruction code EXT included in the instruction.

Figure 7:
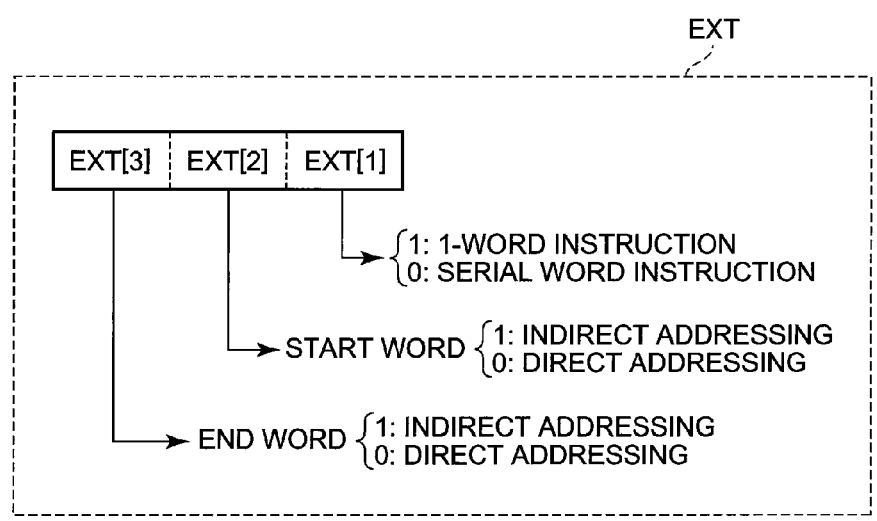
FIG. 7 shows the structure of an extended instruction code EXT according to the first embodiment.

As shown in FIG. 7, the extended instruction code EXT consists of 3 bits, the first bit, the second bit and the third bit from the right-hand side in the diagram. The first bit (EXT[1]) indicates a serial word/1-word instruction; "1" is set in the bit for a 1-word instruction and "0" is set in the bit for a serial word instruction.

The second bit (EXT[2]) indicates indirect/direct addressing of the start word; "1" is set in the bit in case of indirect addressing and "0" is set in the bit in case of direct addressing. In case of a 1-word instruction, however, a single operation is performed on operation data of one word, so that data of the start word directly becomes an operand.

The third bit (EXT[3]) indicates indirect/direct addressing of the end word: "1" is set in the bit in case of indirect addressing and "0" is set in the bit in case of direct addressing. In case of a 1-word instruction, however, a single operation is performed on operation data of one word, so that data of the end word directly becomes an operator.

FIG. 8 is a diagram showing functional examples of instructions for possible values the extended instruction code EXT can take. In the diagram, an OP code "ADD" in the instruction portion is an instruction code representing "addition". 3-bit data following "ADD" represents an extended instruction code EXT. "*" in the operand portion represents "designation not required (arbitrary word)". A mnemonic "w" in operation represents data w stored in the register W, and "v" represents data v stored in the register V.

The values of the individual bits of the extended instruction code EXT have a total of eight patterns (A) to (H). Specific operational examples of the arithmetic unit 200 for the respective patterns (A) to (H) will be discussed one by one.

(A) Extended Instruction Code EXT=[000]

In this case, an instruction is a serial word instruction which is executed by the direct addressing system. When an instruction "ADD 000 X15 Y4" is executed, for example, the arithmetic unit 200 operates as follows. First, the latch section 214 latches Fu="00 (X)", F1="1111 (15)", Su="01 (Y)", S1="0100 (4)", OP="ADD", and EXT="000". The selector 231 receives EXT[3]="0" as the select control signal and selects and outputs F1="1111". The selector 232 receives EXT[2]="0" as the select control signal and selects and outputs S1="0100". Next, the output data of the selector 232 or S1="0100" is set in the address counter 240. Then, the selectors 233 and 234 both receive EXT[1]="0" as the select control signal, and selects and outputs the output data of the address counter 240 or S1="0100". Therefore, Fu="00" is input to the address terminal Fuad of the register section 260, the output data selector 233 or "0100" is input to the address terminal Flad, and operation data stored in the fourth word in the register X is output from the output terminal Fout. Su="01" is input to the address terminal Suad, the output data selector 233 or "0100" is input to the address terminal Slad, and operation data stored in the fourth word in the register Y is output from the output terminal Sout. An operation control signal instructing addition is output from the instruction decoder 216, and two pieces of operation data output from the register section 260 are added together in the computing unit 270. The addition result is input to the input terminal Fin of the register section 260, and is written in the fourth word in the register X (operation: X4+Y4→X4). In the end decision circuit 250, the match circuit 252 outputs an unmatch signal "0" for the output data of the selector 231 (Su="1111") does not match with the output data of the address counter 240 (S1="0100"), and outputs an instruction continue signal "0" for EXT[1]="0". Then, the address counter 240 counts up, and the selectors 233 and 234 both output "0101 (5)". Accordingly, "0101" is input to the address terminals Flad and Slad of the register section 260, operation data stored in the fifth word in the register X is output from the output terminal Fout, and operation data stored in the fifth word in the register Y is output from the output terminal Sout. Then, those two pieces of output data are added together by the computing unit 270, and the addition result is written in the fifth word in the register X (operation: X5+Y5→X5). Meanwhile, the instruction continue signal "0" is output from the end decision circuit 250. Thereafter, every time the computing unit 270 performs addition, the address counter 240 counts up, and "0110 (6)", "0111 (7)", . . . are input to the address terminals Flad and Slad in order. That is, operation data stored in the sixth word in the register X, operation data stored in the seventh word, and so forth are output from the output terminal Fout in order, and operation data stored in the sixth word in the register Y, operation data stored in the seventh word, and so forth are output from the output terminal Sout in order. Those pieces of operation data are added together in the computing unit 270 in the output order, and the addition results are written in the sixth word, the seventh word, and so forth in the register X in order. When the output data (count value) of the address counter 240 becomes "1111", the match circuit 252 outputs the match signal "1" and the end decision circuit 250 outputs the instruction end signal "1". Then, the computing unit 270 terminates an operation and terminates execution of the instruction.

As apparent from the above, in the instruction "ADD 000 X15 Y4", twelve consecutive words from the fourth word to the fifteenth word are consecutively added for the registers X and Y, and the operation results are written in the fourth word to the fifteenth word in the register X in order (operation: X4~15+Y4~15→X4~15). That is, a numerical operation in 48 (=4×12 words) digits in decimal notation is executed.

(B) Extended Instruction Code EXT=[010]

In this case, an instruction is a serial word instruction which is executed by the indirect addressing system. When an instruction "ADD 010 X15 Y*" is executed, for example, the arithmetic unit 200 operates as follows. First, the latch section 214 latches Fu="00", F1="1111", Su="01", S1="*", OP="ADD", and EXT="010". The selector 231 receives "0" as the select control signal and selects and outputs F1="111". The selector 232 receives "1" as the select control signal and selects and outputs data v, which is in turn set in the address counter 240. Then, the selectors 233 and 234 both receive "0" as the select control signal, and select and output the data v. Therefore, "00" is input to the address terminal Fuad of the register section 260, the data v is input to the address terminal Flad, and operation data stored in the v-th word in the register X is output from the output terminal Fout. "01" is input to the address terminal Suad, the data v is input to the address terminal Slad. and operation data stored in the v-th word in the register Y is output from the output terminal Sout. The two pieces of operation data output from the register section 260 are added together in the computing unit 270, and the addition result is written in the v-th word in the register X (operation: Xv+Yv→Xv). Thereafter, while the instruction end signal "1" is not output from the end decision circuit 250, the address counter 240 counts up every operation performed by the computing unit 270, and operation data stored in the (v+1)-th word in the register X, operation data stored in the (v+2)-th word, and so forth are output from the output terminal Fout in order, and operation data stored in the (v+1)-th word in the register Y, operation data stored in the (v+2)-th word, and so forth are output from the output terminal Sout in order. Those pieces of operation data are added together in the computing unit 270 in the output order, and the addition results are written in the (v+1)-th word, the (v+2)-th word, and so forth in the register X in order. When the output data of the address counter 240 becomes "1111", the match circuit 252 outputs the match signal "1" and the end decision circuit 250 outputs the instruction end signal "1" after which execution of the instruction is terminated.

As apparent from the above, in the instruction "ADD 010 X15 Y*", the fourth word to the fifteenth word are consecutively added for the registers X and Y, and the operation results are written in the v-th word to the fifteenth word in the register X in order (operation: Xv~15+Yv~15→Xv~15). In this case, the start word is designated by the data v. Because the value of the data v is changeable, as a value according to the desired number of operation digits is stored, the arithmetic unit 200 can be allowed to perform a numerical operation in an arbitrary number of operation digits as has been discussed above referring to FIG. 6.

(C) Extended Instruction Code EXT=[100]

In this case, an instruction is a serial word instruction which is executed by the indirect addressing system. When an instruction "ADD 100 X* Y4" is executed, for example, the arithmetic unit 200 operates as follows. First, the latch section 214 latches Fu="00", F1="*", Su="01", S1="0100", OP="ADD", and EXT="100". The selector 231 receives "1" as the select control signal and selects and outputs data w. The selector 232 receives "0" as the select control signal and selects and outputs S1="0100", which is in turn set in the address counter 240. Then, the selectors 233 and 234 both receive "0" as the select control signal, and select and output "0100". Therefore, "00" is input to the address terminal Fuad of the register section 260, "0100" is input to the address terminal Flad, and operation data stored in the fourth word in the register X is output from the output terminal Fout. "01" is input to the address terminal Suad, "0100" is input to the address terminal Slad, and operation data stored in the fourth word in the register Y is output from the output terminal Sout. The two pieces of operation data output from the register section 260 are added together in the computing unit 270, and the addition result is written in the fourth word in the register X (operation: X4+Y4→X4). Thereafter, while the instruction end signal "1" is not output from the end decision circuit 250, the computing unit 270 repeatedly executes an operation (addition) on operation data output from the register section 260 and the address counter 240 counts up even operation performed by the computing unit 270. When the output data of the address counter 240 matches with the data w, the end decision circuit 250 outputs the instruction end signal "1" after which execution of the instruction is terminated.

As apparent from the above, in the instruction "ADD 100 X* Y4", the fourth word to the w-th word are consecutively added for the registers X and Y, and the operation results are written in the fourth word to the w-th word in the register X in order (operation: X4~w+Y4~w→X4~w). In this case, the end word is designated by the data w. Because the value of the data w is changeable, as a value according to the desired number of operation digits is stored, the arithmetic unit 200 can be allowed to perform a numerical operation in an arbitrary number of operation digits.

(D) Extended Instruction Code EXT=[110]

In this case, an instruction is a serial word instruction which is executed by the indirect addressing system. When an instruction "ADD 110 X* Y4" is executed, for example, the arithmetic unit 200 operates as follows. First, the latch section 214 latches Fu="00", F1="*", Su="01", S1="*", OP="ADD", and EXT="110". The selector 231 receives "1" as the select control signal and selects and outputs data w. The selector 232 receives "1" as the select control signal and selects and outputs data v, which is in turn set in the address counter 240. Then, the selectors 233 and 234 both receive "0" as the select control signal, and select and output the data v. Therefore, "00" is input to the address terminal Fuad of the register section 260, the data v is input to the address terminal Flad, and operation data stored in the v-th word in the register X is output from the output terminal Fout. "01" is input to the address terminal Suad, the data v is input to the address terminal Slad, and operation data stored in the v-th word in the register Y is output from the output terminal Sout. The two pieces of operation data output from the register section 260 are added together in the computing unit 270, and the addition result is written in the v-th word in the register X (operation: Xv+Yv→Xv). Thereafter, while the instruction end signal "1" is not output from the end decision circuit 250, the computing unit 270 repeatedly executes an operation (addition) on operation data output from the register section 260 and the address counter 240 counts up every operation performed by the computing unit 270. When the output data of the address counter 240 matches with the data w, the end decision circuit 250 outputs the instruction end signal "1" after which execution of the instruction is terminated.

As apparent from the above, in the instruction "ADD 110 X* Y*", the v-th word to the w-th word are consecutively added for the registers X and Y, and the operation results are written in the v-th word to the w-th word in the register X in order (operation: Xv~w+Yv~w→Xv~w). In this case, the start word is designated by the data v and the end word is designated by the data w. Because the values of the data v and w are changeable, as values according to the desired number of operation digits are stored, the arithmetic unit 200 can be allowed to perform a numerical operation in an arbitrary number of operation digits.

(E) Extended Instruction Code EXT=[001]

An instruction is a 1-word instruction which is executed by the direct addressing system. When an instruction "ADD 001 X* Y4" is executed, for example, the arithmetic unit 200 operates as follows. First, the latch section 214 latches Fu="00", F1="*", S="01", and the selector 231 receives "0" as the select control signal and selects and outputs "1111". The selector 232 receives "0" as the select control signal and selects and outputs "0100", and S1="0100" is set in the address counter 240. Then, the selector 233 receives "1" as the select control signal, and selects and outputs the output data of the selector 231 or F1="1111". The selector 234 receives "1" as the select control signal, and selects and outputs the output data of the selector 232 or F1="0100". Therefore, "00" is input to the address terminal Fuad of the register section 260, "1111" is input to the address terminal Flad, and operation data stored in the fifteenth word in the register X is output from the output terminal Fout. "01" is input to the address terminal Suad, "0100" is input to the address terminal Slad, and operation data stored in the fourth word in the register Y is output from the output terminal Sout. The two pieces of operation data output from the register section 260 are added together in the computing unit 270, and the addition result is written in the fifteenth word in the register X (operation: X15+Y4→X15). Meanwhile, in the end decision circuit 250, the match circuit 252 outputs the unmatch signal "0" for the output data of the selector 231 (S1="1111") does not match with the output data of the address counter 240 ("0100"), but the end decision circuit 250 outputs the instruction end signal "1" for EXT[1]="1", so that execution of the instruction is terminated.

As apparent from the above, in the instruction "ADD 001 X15 Y4", the value of the fifteenth word in the register X and the value of the fourth word in the register Y are added, and the addition result is written in the fifteenth word in the register X (operation: X15+Y4→X15).

(F) Extended Instruction Code EXT=[011]

An instruction is a 1-word instruction which is executed by the indirect addressing system. In case of executing the instruction "ADD 011 X15 Y*", for example, the value of the fifteenth word in the register X and the value of the v-th word in the register Y are added, and the addition result is written in the fifteenth word in the register X (operation: X15+Yv→X15). In this case, the number of operations is designated by the data v.

(G) Extended Instruction Code EXT=[101]

An instruction is a 1-word instruction which is executed by the indirect addressing system. In case of executing the instruction "ADD 101 X* Y*", for example, the value of the w-th word in the register X and the value of the fourth word in the register Y are added, and the addition result is written in the w-th word in the register X (operation: Xw+Y4→Xw). In this case, the number of operands is designated by the data w.

(H) Extended Instruction Code EXT=[111]

An instruction is a 1-word instruction which is executed by the indirect addressing system. In case of executing the instruction "ADD 111 X* Y*", for example, the value of the w-th word in the register X and the value of the v-th word in the register Y are added, and the addition result is written in the w-th word in the register X (operation: Xw+Yv→Xw). In this case, the number of operands is designated by the data w and the number of operations is designated by the data v.

[Effects of First Embodiment]

According to the arithmetic unit 200 of the first embodiment as the start word and the end word are designated by a single instruction, an operation on a plurality of consecutive words from the designated start word to the designated end word is performed by the computing unit 270. This can ensure execution of operations in the desired number of operation digits.

The start word and the end word can be designated directly in an instruction, or designated indirectly by the data w and v stored in the registers W and V in the variable parameter memory section 220. As the number of operation digits (number of effective digits) can be designated freely instruction by instruction, therefore, it is possible to change or designate the number of operation digits while the program is running. With the use of a program which stores the operation result in the register W, V, the number of operation digits can be changed during execution of the program. This can ensure a flexible program with respect to the number of operation digits, so that high-precision operations can be accomplished easily.

Further, as BCD coded data values are stored in the register section 260, an error originating from binary-decimal conversion in the prior art does not occur in the invention.

[Modifications of First Embodiment]

The application of the invention is not limited to the first embodiment, but can be adequately changed without departing from the scope and spirit of the invention.

(1) Variable Unit of Digits

Although the number of digits is changed by four digits in decimal notation with one word (16 bits) being a unit in the embodiment, other numbers of bits, specifically, 4×n bits (n being a natural number) may be selected as a unit. When the computing unit 270 performs an operation in 32 bits, for example, the unit may be two words. The reason for setting the multiple of 4×n is that BCD coded data is stored in the register section 260 and four bits in a BCD code are equivalent to one digit in decimal notation. In this case, an arithmetic unit capable of changing the number of digits by n digits in decimal notation can be realized. In the embodiment, digit-by-digit designation of the number of operation digits may be designated digit by digit by masking the values of unnecessary digits of the operation result.

(2) Making the Number of Operation Digits in Exponent Portion Variable

Although any one of the second to fifteenth words is taken as a start word or an end word and the number of operation digits in the imaginary portion is set variable in the embodiment, the number of operation digits in the exponent portion may be made variable.

(3) The Number of Words in a Register

Although the number of words in the register section 260 has been illustrated as "16", the number is in no way restrictive. Although the size of the imaginary portion is set to 14 words and the size of the exponent portion is set to 2 words, the word ratio may be changed as needed.

[Second Embodiment]

A second embodiment will be described below.

An arithmetic system S2 according to the second embodiment is designed in such a way that the PC 100 and an arithmetic unit 300 are connected together by a communication cable K2 like a USB cable so as to be able to exchange data with each other. As the structure of the arithmetic system S2 is approximately identical to that of the arithmetic system S1 of the first embodiment, same reference symbols are given to those components which are identical to the corresponding components of the first embodiment to avoid their otherwise redundant detailed descriptions. The detailed description given below is centered on the unique portions of the second embodiment.

The arithmetic unit 300 has a register I, which can store 6-bit data, in a variable parameter memory section 320 as a characteristic structure of the second embodiment, so that the address of a register can be designated digit by digit at the time of designating the address by the indirect addressing system. This can provide an arithmetic unit capable of freely changing, digit by digit, the number of calculation digits (number of effective digits) and the calculation start digit which are used in operations.

Figure 9:
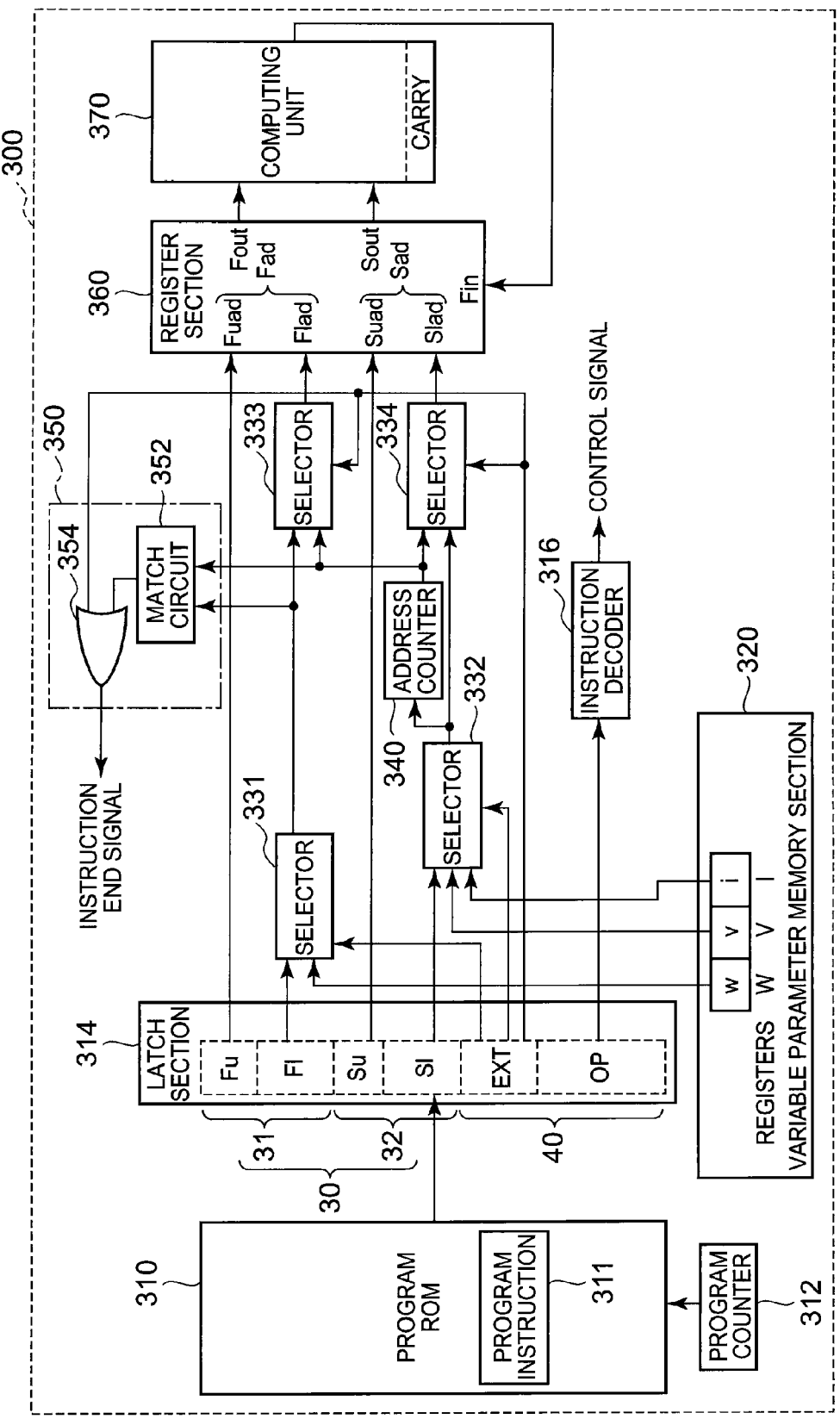
FIG. 9 is a circuit structural diagram of the essential portions of an arithmetic unit according to a second embodiment.

FIG. 9 is a block diagram showing the circuit structure of the arithmetic unit 300, and shows the essential portions that are associated with execution of numerical operations. Referring to FIG. 3, the arithmetic unit 300 comprises a program ROM 310, a program counter 312, a latch section 314, an instruction decoder 316, a variable parameter memory section 320, selectors 331, 332, 333 and 334, an address counter 340, a register section 360, a computing unit 370, and an end decision circuit 350.

The program ROM 310 whose structure is similar to that of the program ROM 210 stores program instructions 311 or machine programs transferred from the PC 100, reads the program instructions 311 at addresses indicated by the program counter 312 one after another, and are output to the latch section 314. The program instruction 311 is comprised of one or more calculation instructions in each of which the type of calculation and the number of calculation digits are set. The latch section 314, like the latch section 214, holds a single instruction read from the program ROM 310. A single instruction comprises an instruction portion 40 and an operand portion 30. As a characteristic structure of the second embodiment, the instruction portion 40 has an instruction code OP and a 3-bit extended instruction code EXT.

Figure 10:
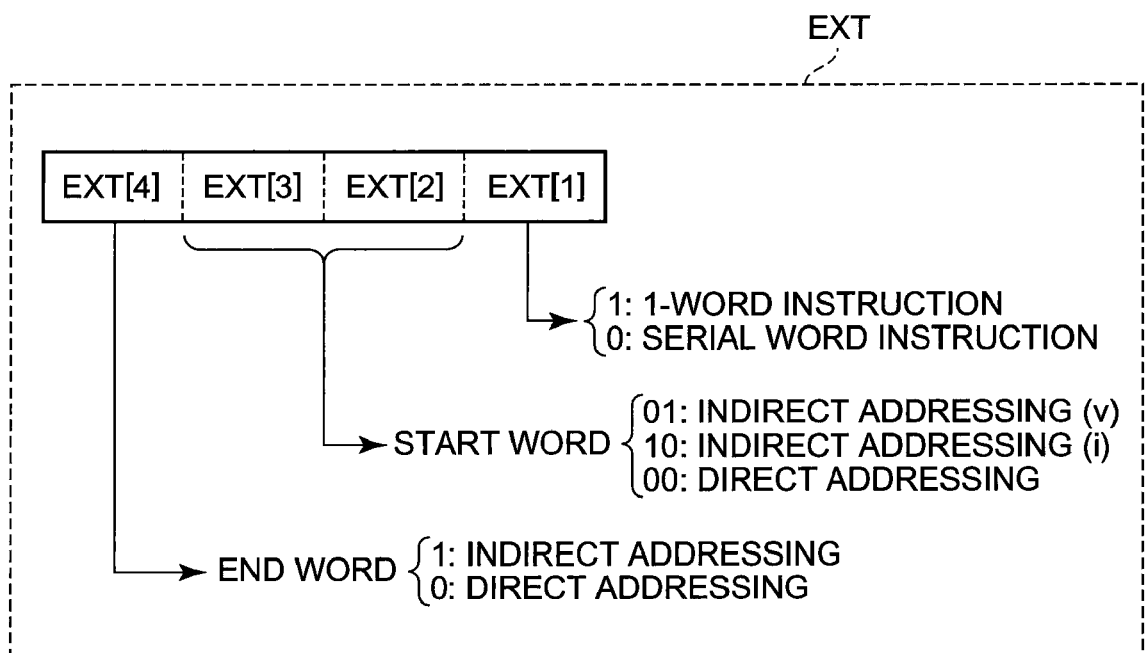
FIG. 10 shows the structure of an extended instruction code EXT according to the second embodiment.

FIG. 10 exemplifies the data structure of the extended instruction code EXT. As shown in the diagram, the extended instruction code EXT consists of 4 bits, and corresponding pieces of data are stored in the first bit, the second bit, the third bit and the fourth bit from the right-hand side in the diagram. Specifically, data indicating a 1-word/serial word instruction is stored in the first bit (EXT[1]); "1" is set in the bit for a 1-word instruction and "0" is set in the bit for a serial word instruction.

Data indicating indirect addressing (designated by the register V), indirect addressing (designated by the register I) or direct addressing of the start word is stored in the second and third bits (EXT[2] and EXT[3]). Specifically, "01" is set in the bits for indirect addressing designated by the register V, "10" is set in the bits for indirect addressing designated by the register I, and "00" is set in the bits for direct addressing.

Data indicating indirect/direct addressing of the end word is stored in the fourth bit (EXT[4]); "1" is set in the bit for indirect addressing, and "0" is set in the bit for direct addressing.

The variable parameter memory section 320, constituted by a RAM or the like, has registers W and V each capable of storing 4-bit data and a register I capable of storing 6-bit data. The register W designates the calculation end digit by a word unit or by the unit of four digits in case of indirect addressing, and designates an arbitrary one of fifteen words constituting the register with four bits. The register V designates the calculation start digit by a word unit or by the unit of four digits in case of indirect addressing, and designates an arbitrary one of fifteen words constituting the register with four bits. The register I designates the calculation start digit by the unit of one digit in case of indirect addressing, and the upper four bits designate an arbitrary one of fifteen words constituting the register with four bits while the lower two bits designate an arbitrary digit in the designated word.

The selector 331 receives the data F1 latched in the latch section 314 and data w stored in the register W, and receives data of the fourth bit in the extended instruction code EXT as a select control signal. The selector 331 selects and outputs one of the two input data according to the select control signal or the value of the data EXT[4]. Specifically, the selector 331 selectively outputs the data w when the value of the data EXT[4] is "1", and selectively outputs the data F1 when the value of the data EXT[4] is "0".

The selector 332 receives the data S1 latched in the latch section 314, data v stored in the register V and data stored in the register I (hereinafter called "data i"). The selector 332 also receives the data EXT[2] and the data EXT[3] as a select control signal.

The selector 332 selects and outputs one of the two input data according to the values of the data EXT[2] and data EXT[3]. Specifically, the selector 332 selectively outputs the data v when the values of the data EXT[2] and data EXT[3] are "01", and selectively outputs the data S1 when the values are "00".

The address counter 340 is an up counter similar to the address counter 240 of the first embodiment, counts up and outputs a present count value every time an operation is performed.

The register section 360 whose structure is similar to that of the register section 260 is a dual-port register having two ports for each of address designation and data output. At the first port, 16-bit data stored at a 6-bit address Fad with 2-bit data input from an address terminal Fuad as an upper address and 4-bit data input from an address terminal Flad as a lower address is output from an output terminal Fout. Data Fu latched in the latch section 314 is input to an address terminal Fuad, and output data of the selector 333 is input to an address terminal Flad.

At the second port, 16-bit data stored at a 6-bit or 8-bit address Sad with 2-bit data input from an address terminal Suad as an upper address and 4-bit data or 6-bit data input from an address terminal Slad as a lower address is output from an output terminal Sout. Data Su latched in the latch section 314 is input to an address terminal Suad, and output data of the selector 334 is input to an address terminal Slad. The register section 360 is addressed by designating a register with a 2-bit upper address and designating a word in the register with a 4-bit lower address or designating a word and a digit in the register with a 6-bit lower address. As address designation of the register section 360 is done by a word unit or a digit unit, one word of data or 16-bit data is output with the designated word or digit being the calculation start word or the calculation start digit.

Figure 11:
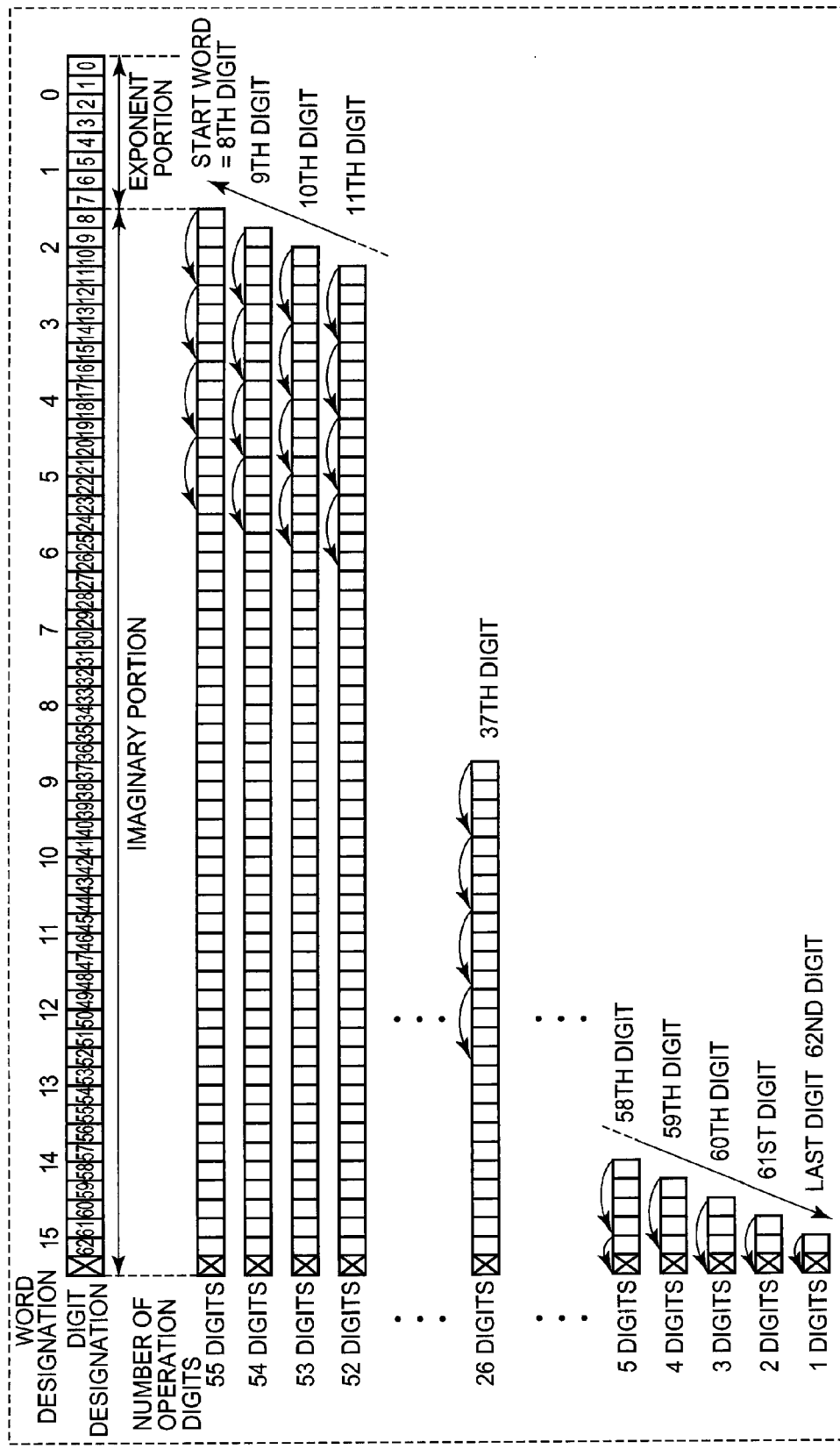
FIG. 11 is a diagram showing a change in the number of calculation digits caused by a change in a calculation start digit according to the second embodiment.

Referring to FIG. 11, a description will be given of how data is output from the register section 360 when address designation of a register Rn is done by a digit unit. As illustrated in the diagram, the register Rn comprises an imaginary portion consisting of upper 56 digits (fourteen words) and an exponent portion consisting of lower 8 digits (two words), with the most significant digit of the fifteenth word or the end digit being a blank digit. Therefore, the maximum number of calculation digits of the imaginary portion is "55". It is assumed that the calculation start digit is set by the unit of digits, and the calculation end digit is set by the word unit (i.e., the unit of digits). Further, the register Rn outputs data with one word or four digits being the unit of digits. The data output method will be specifically discussed below.

When the number of calculation digits is designated to 55, as shown in the second stage in FIG. 11, the calculation start digit is set to the eighth digit, the least significant digit in the imaginary portion, and the calculation end digit to the fifteenth word. The register section 360 sequentially outputs data for four digits or one word (16 bits) from the eighth digit set to the calculation start digit with four digits being the unit of digits, and outputs data for three digits (12 bits) in the end word to the computing unit 370 after outputting data for thirteen words. Accordingly, the number of calculation digits to be processed in the computing unit 370 becomes 55 digits.

When the number of calculation digits is designated to 54, as shown in the third stage in the diagram, the calculation start digit is designated to the ninth digit, and the calculation end digit to the fifteenth word. The register section 360 outputs data for four digits or one word (16 bits) from the ninth digit set to the calculation start digit with four digits being the unit of digits, and sequentially outputs data for two digits (8 bits) in the end word to the computing unit 370 after sequentially outputting data for thirteen words. Accordingly, the number of calculation digits to be processed in the computing unit 370 becomes 54 digits.

When the number of calculation digits is designated to 1, as shown in the lowest stage in the diagram, the calculation start digit is set to the 62nd digit, and the calculation end digit to the fifteenth word. The register section 360 outputs data for one digit (4 bits) from the 62nd digit set to the calculation start digit. In this case, the number of calculation digits to be processed in the computing unit 370 becomes one digit.

When the number of calculation digits is designated by a digit unit, as apparent from the above, data for one word or four digits is sequentially output every predetermined unit of digits from the calculation start digit set in the program instruction 311, and data for the remaining number of digits is output in the last word, thereby ensuring fast decimal calculation by the designated number of calculation digits.

The following will describe an example of the operation of the arithmetic unit 300 when a specific instruction is given.

FIG. 12 is a diagram showing functional examples of instructions for possible values the extended instruction code EXT can take. In the diagram, an OP code "ADD" in the instruction portion is an instruction code representing "addition", 4-bit data following "ADD" represents an extended instruction code EXT. A mnemonic "w" in operation represents data w stored in the register W, "v" represents data v stored in the register V, and "i" represents data i stored in the register I.

There are a total of twelve patterns (I) to (T) for functional examples of an instruction from the values of the individual bits of the extended instruction code EXT. From the correlation between the EXT[2] and EXT[3] of the extended instruction code EXT in the second embodiment with the EXT[2] of the extended instruction code EXT in the first embodiment, the patterns (I) to (T) include those which are duplex patterns of the patterns (A) to (H). The correlation of the duplex patterns will be given to avoid repeating the detailed operational descriptions. Each pair of the patterns (A) and (I), the patterns (B) and (J), the patterns (C) and (L), the patterns (D) and (M), the patterns (E) and (O), the patterns (F) and (P), the patterns (G) and (R), and the patterns (H) and (S) is a synonymous functional example. The following will describe the characteristic patterns (K), (N), (Q) and (T) of the second embodiment.

(K) Extended Instruction Code EXT=[0100]

In this case, an instruction is a serial word instruction which is executed by the indirect addressing system. When an instruction "ADD 0100 X15 Y*" is executed, for example, the arithmetic unit 300 operates as follows. First, the latch section 314 latches Fu="00 (X)", F1="1111 (15)", Su="01 (Y)", S1="*", OP="ADD", and EXT="0100". That is, the program instruction 311 or a calculation instruction in which the number of calculation digits and the type of calculation are set is read from the program ROM 310 which is the calculation-instruction memory section. The selector 331 receives EXT[4]="0" as the select control signal and selects and outputs F1="1111". The selector 332 receives EXT[2="0" and EXT[3]="1" as the select control signal and selects and outputs data i, which is in turn set in the address counter 340. Then, the selectors 333 and 334 both receive EXT[1]="0" as the select control signal. Therefore, Fu="00" is input to the address terminal Fuad of the register section 360, the data i is input to the address terminal Flad, and operation data for one word stored in the i-th to (i+3)-th digits in the register X is output from the output terminal Fout. "01" is input to the address terminal Suad, the data i is input to the address terminal Slad, and operation data for one word stored in the i-th to (i+3)-th digits in the register Y is output from the output terminal Sout as an operand. The two pieces of operation data output from the register section 360 are added together in the computing unit 370, and the addition result is written in the i-th to (i+3)-th digits in the register X (operation: Xi~(i+3)+Yi~(i+3)→Xi~(i+3)). Thereafter, while the instruction end signal "1" is not output from the end decision circuit 350, the address counter 340 counts up by one every operation performed by the computing unit 370, and operation data stored in the i-th to (i+3)-th digits in the register X, operation data stored in the (i+4)-th to (v+7)-th digits, and so forth are output from the output terminal Fout of the register section 360 in order, and operation data stored in the i-th to (i+3)-th digits in the register Y, operation data stored in the (i+4)-th to (i+7)-th digits, and so forth are output from the output terminal Sout in order. Those pieces of operation data are added together in the computing unit 370 in the output order, and the addition results are written in the i-th to (i+3)-th digits, the (i+4)-th to (i+7)-th digits, and so forth in the register X in order. When the output data of the address counter 340 becomes "1111", the match circuit 352 outputs the match signal "1" and the end decision circuit 350 outputs the instruction end signal "1" after which execution of the instruction is terminated.

As apparent from the above, in the instruction "ADD 0100 X15 Y*", the i-th word to the fifteenth word are consecutively added for the registers X and Y, and the operation results are written in the i-th to the fifteenth words in the register X in order (operation: Xi~15+Yi~15→Xi~15). This operation achieves the function of calculating the value for the corresponding unit of digits stored in each of the registers X and Y as the multidigit memory section in order every unit of digits (e.g., "unit of four digits") in the number of calculation digits (e.g., "i-th to fifteenth word) set in the program instruction 311 or a calculation instruction stored in the program ROM 310 as the calculation-instruction memory section, in decimal notation according to the type of calculation (e.g., "ADD") set in the program instruction 311, and sequentially writing the operation result in the registers X and Y as the multidigit memory section every unit of digits. In this case, the calculation start digit is designated by the data i. Because the value of the data i is changeable, as a value according to the desired number of calculation digits is stored, the arithmetic unit 300 can be allowed to perform a numerical operation in an arbitrary number of calculation digits as has been discussed above referring to FIG. 11.

(N) Extended Instruction Code EXT=[1100]

In this case, an instruction is a serial word instruction which is executed by the indirect addressing system. When an instruction "ADD 1100 X*Y4" is executed, for example, the arithmetic unit 300 operates as follows. First, the latch section 314 latches Fu="00", F1="*", Su="01", S1="*", OP="ADD", and EXT="1100". That is, the program instruction 311 or a calculation instruction in which the number of calculation digits and the type of calculation are set is read from the program ROM 310 which is the calculation-instruction memory section. The selector 331 receives "1" as the select control signal and selects and outputs data w. The selector 332 receives "10" as the select control signal and selects and outputs data i, which is in turn set in the address counter 340. Then, the selectors 333 and 334 both receive "0" as the select control signal, and select and output the data i. Therefore, "00" is input to the address terminal Fuad of the register section 360, the data i is input to the address terminal Flad, and operation data stored in the i-th to (i+3)-th digits in the register X is output from the output terminal Fout. "01" is input to the address terminal Suad, the data i is input to the address terminal Slad, and operation data stored in the i-th to (i+3)-th digits in the register Y is output from the output terminal Sout. The two pieces of operation data output from the register section 360 are added together in the computing unit 370, and the addition result is written in the fourth word in the register X (operation: Xi~(i+3)+Yi~(i+3)→Xi~(i+3)). Thereafter, while the instruction end signal "1" is not output from the end decision circuit 350, the computing unit 370 repeatedly executes an operation (addition) on operation data output from the register section 360 and the address counter 340 counts up by one every operation performed by the computing unit 370. When the upper four bits of the output data of the address counter 340 match with the data w, the end decision circuit 350 outputs the instruction end signal "1" after which execution of the instruction is terminated.

As apparent from the above, in the instruction "ADD 1100 X*Y*", the i-th to w-th words are consecutively added for the registers X and Y, and the operation results are written in the i-th to w-th words in the register X in order (operation: Xi~w+Yi~w→Xi~w). This operation achieves the function of calculating the value for the corresponding unit of digits stored in each of the registers X and Y as the multidigit memory section in order every unit of digits (e.g., "unit of four digits") in the number of calculation digits (e.g., "i-th to w-th words) set in the program instruction 311 or a calculation instruction stored in the program ROM 310 as the calculation-instruction memory section, in decimal notation according to the type of calculation (e.g., "ADD") set in the program instruction 311, and sequentially writing the operation result in the registers X and Y as the multidigit memory section every unit of digits. In this case, the calculation start digit is designated by the data i and the calculation end digit is designated by the data w. Because the values of the data i and w are changeable, as a value according to the desired number of calculation digits is stored, the arithmetic unit 300 can be allowed to perform a numerical operation in an arbitrary number of calculation digits.

(Q) Extended Instruction Code EXT=[0101]

In this case, an instruction is a 1-word instruction which is executed by the indirect addressing system. In case of executing the instruction "ADD 011 X15 Y*", for example, the values of the individual digits of the fifteenth word in the register X and the values of the i-th to (i+3)-th digits in the register Y are added, and the addition result is written in the fifteenth word in the register X (operation: X15+Yi~(i+3)→X15).

This operation achieves the function of calculating the value for the corresponding unit of digits stored in each of the registers X and Y as the multidigit memory section in order every unit of digits (e.g., "unit of four digits") in the number of calculation digits (e.g., "four digits") set in the program instruction 311 or a calculation instruction stored in the program ROM 310 as the calculation-instruction memory section, in decimal notation according to the type of calculation (e.g., "ADD") set in the program instruction 311, and sequentially writing the operation result in the registers X and Y as the multidigit memory section every unit of digits. In this case, the calculation start digit is designated by the data i. Because the value of the data i is changeable, as a value according to the desired calculation start digit is stored, the arithmetic unit 300 can be allowed to perform a numerical operation with an arbitrary value as the number of operations.

(T) Extended Instruction Code EXT=[1101]

In this case, an instruction is a 1-word instruction which is executed by the indirect addressing system. In case of executing the instruction "ADD 111 X* Y*", for example, the value of the w-th word in the register X and the values of the i-th to (i+3)-th digits in the register Y are added, and the addition result is written in the w-th word in the register X (operation: Xw+Yi~(i+3)→Xw).

This operation achieves the function of calculating the value for the corresponding unit of digits stored in each of the registers X and Y as the multidigit memory section in order every unit of digits (e.g., "unit of four digits") in the number of calculation digits (e.g., "four digits") set in the program instruction 311 or a calculation instruction stored in the program ROM 310 as the calculation-instruction memory section, in decimal notation according to the type of calculation (e.g., "ADD") set in the program instruction 311, and sequentially writing the operation result in the registers X and Y as the multidigit memory section every unit of digits. In this case, the calculation end digit is designated by the data w and the calculation start digit is designated by the data i. Because the values of the data i and w are changeable, as a value according to the desired calculation end digit and calculation start digit is stored, the arithmetic unit 300 can be allowed to perform a numerical operation with an arbitrary value as an operand.

Figure 13:
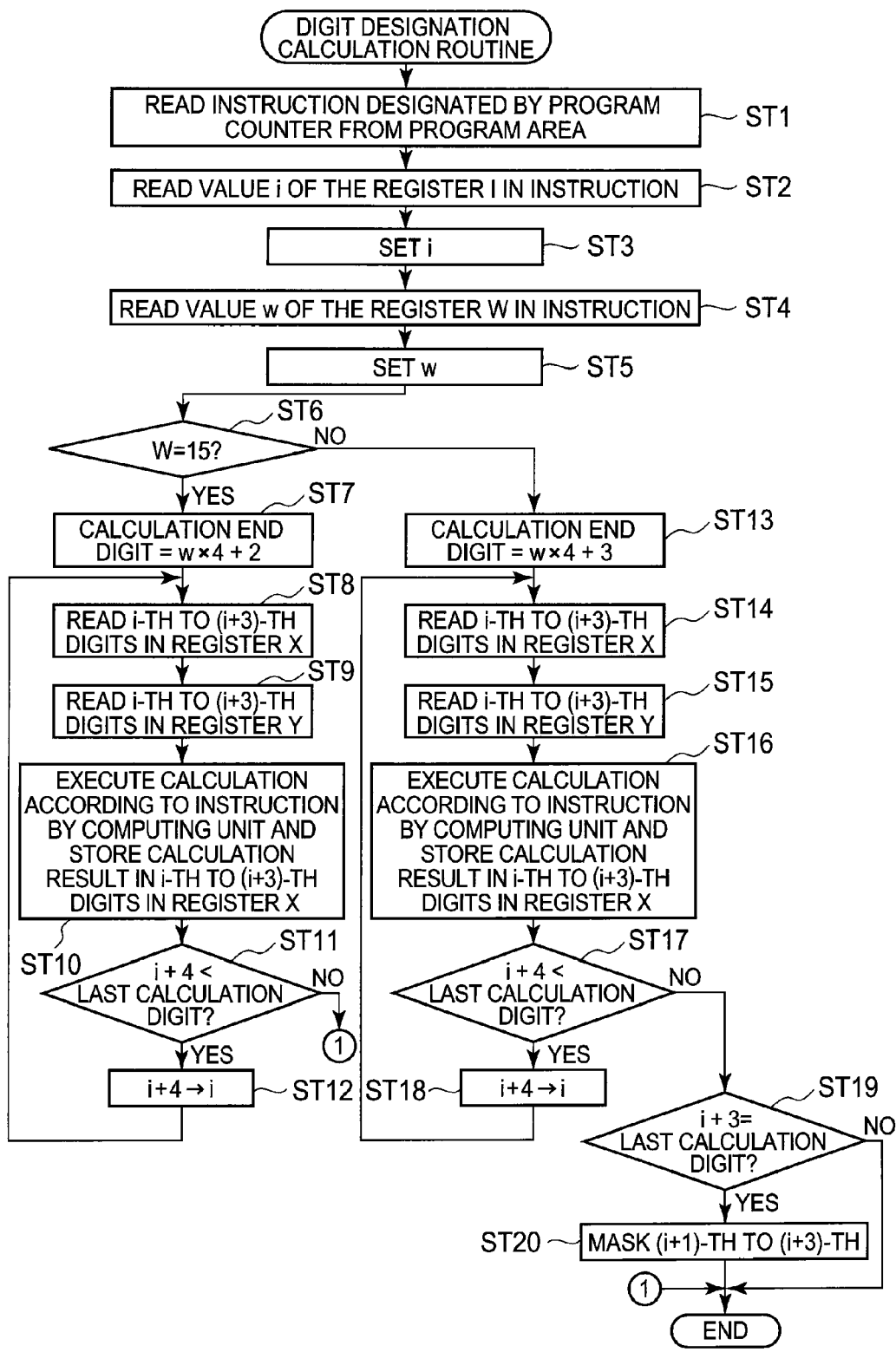
FIG. 13 is a flowchart illustrating a digit designation calculation routine.

Referring to a flowchart in FIG. 13, the following will discuss an operational example which is performed when values are set in the register I and the register W with the pattern (N) taken as an example. The flowchart in FIG. 13 illustrates a digit designation calculation routine which is executed by the arithmetic unit 300. Referring to the diagram, first, an instruction designated by the program counter 312 is read from a program area in the program ROM 310 (step ST1). Then, the value i of the register I in the instruction is read (step ST2), and data i is set in the register I (step ST3). Then, the value w of the register W in the instruction is read (step ST4), and data w is set in the register I (step ST5).

Next, it is discriminated whether or not w is the last word, i.e., whether or not w=15 (step ST6). When w=15 (step ST6; YES), the calculation end digit is computed by calculating w×4+2 (step ST7). Then, operation data at the i-th to (i+3)-th digits in the register X is read (step ST8), and operation data at the i-th to (i+3)-th digits in the register Y is read (step ST9). Then, the computing unit 370 performs calculation according to the instruction, and the calculation result is stored at i-th to (i+3)-th digits in the register X (step ST10).

Next, it is discriminated whether or not i+4 is smaller than the calculation end digit (step ST11). When i+4 is smaller than the calculation end digit (step ST11; YES), the end decision circuit 350 outputs the instruction end signal "0", and i+4 is set in the value i of the register I (step ST12). Then, the flow goes to step ST8 to repeat execution of the processes. When i+4 is larger than the calculation end digit (step ST11; NO), the end decision circuit 350 outputs the instruction end signal "1", after which the digit designation calculation routine is terminated.

When w is not the last word, i.e., w is not equal to 15 at step ST6 (step ST6; NO), the calculation end digit is computed by calculating w×4+3 (step ST13). Then, operation data at the i-th to (i+3)-th digits in the register X is read (step ST14), and operation data at the i-th to (i+3)-th digits in the register Y is read (step ST15). Then, the computing unit 370 performs calculation according to the instruction, and the calculation result is stored at i-th to (i+3)-th digits in the register X (step ST16).

Next, it is discriminated whether or not i+4 is smaller than the calculation end digit or not (step ST17). When i+4 is smaller than the calculation end digit (step ST17; YES), the end decision circuit 350 outputs the instruction end signal "0", and i+4 is set in the value i of the register I (step ST18). Then, the flow goes to step ST14 to repeat execution of the processes. When i+4 is larger than the calculation end digit (step ST17; NO), it is discriminated whether i+3 is the calculation end digit or not (step ST10). When the calculation end digit is i+3 (step ST19; YES), operation data of the calculation result stored in the register X matches with the calculation end digit, so that the end decision circuit 350 outputs the instruction end signal "1", after which the digit designation calculation routine is terminated.

When the calculation end digit is not i+3 (step ST19; NO), operation data of the calculation result stored in the register X does not match with the calculation end digit, so data of (i+1)-th to (i+3)-th digits in the i-th to (i+3)-th digits is masked (step ST20). That is, as the register section 360 outputs operation data every word or every four digits from the designated i-th digit, operation data of the end word includes unnecessary data when the number of calculation digits is not an integer multiple of 4. The calculation result of the desired number of digits can be acquired by masking unnecessary data. With the unnecessary data in the register X masked (step ST20), the end decision circuit 350 outputs the instruction end signal "1", after which the digit designation calculation routine is terminated.

A description will now be given of the calculation method to be executed by the arithmetic unit 300 when a specific type of calculation, a specific number of calculations and a specific number of calculation digits are set. To begin with, a case where "square root" is set as the type of calculation, "3" is set as the number of calculations, "56th digit (i=56)" is set as the calculation start digit and "15th word (w=15)" is set as the calculation end digit will be discussed below referring to FIGS. 14 to 17.

Arithmetic expressions on the left-hand side in FIGS. 14 to 17 are given for explaining the method of calculating a square root with figures written down on paper, and calculation procedures on the right-hand side in FIGS. 14 to 17 are given for explaining the square root calculation method that is executed by the arithmetic unit 300. It is assumed that in acquiring a square root by calculation with FIGS. written down on paper, the values of individual digits are acquired based on the following equation 1. As this method is well know, the detailed description will not be given.

$$(a+b+c+d+\ldots)^2 = a^2 + 2ab + b^2 + 2(a+b)c + c^2 + 2(a+b+c)d + d^2 + \ldots \quad (1)$$

Figure 14:
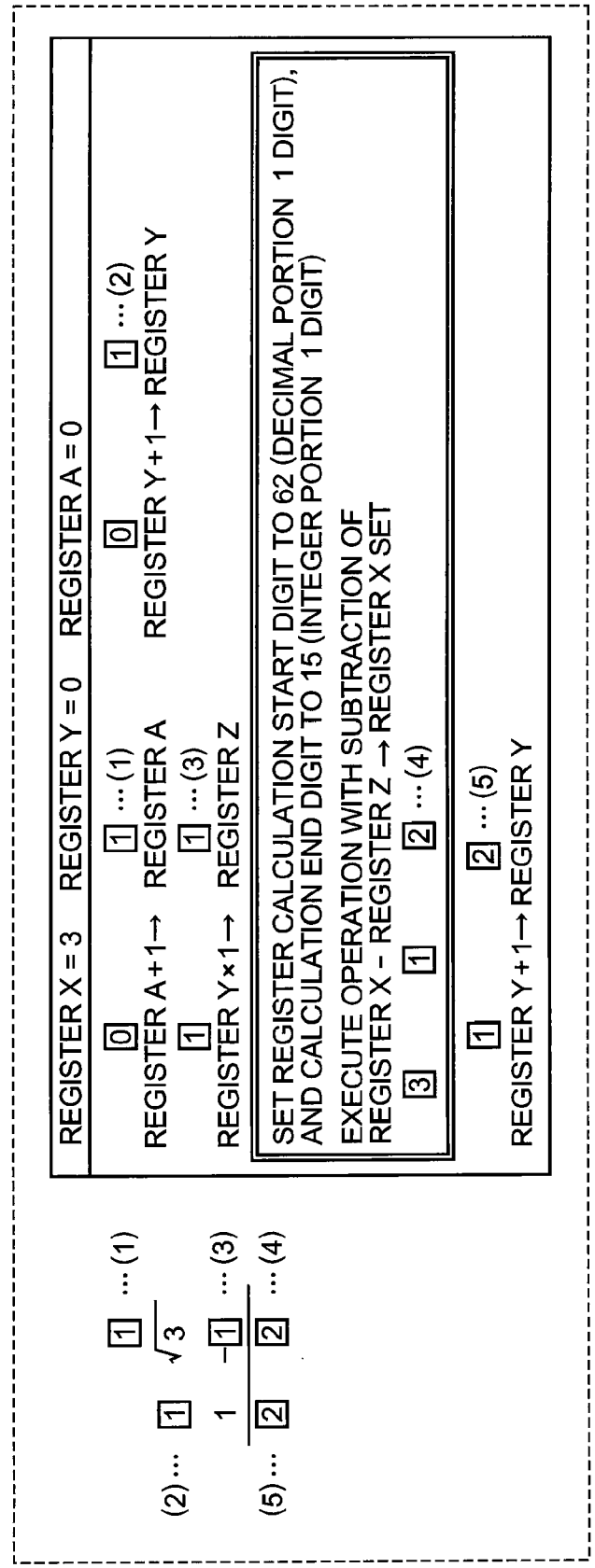
FIG. 14 is a diagram illustrating a square root operation routine in the arithmetic unit according to the second embodiment.

As shown in the left-hand side in FIG. 14, a figure (1) is acquired from the equation 1 as a value "1" which, when squared, does not exceed "3" when "3" is the number of calculations. A figure (2) is acquired as the same value "1" as the figure (1). A figure (3) is "$1^2$" or the square root of the figure (1), and the result of subtracting the square root from the number of calculations "3" is acquired as a figure (4). Further, a value "2" obtained by adding the figure (1) to the figure (2) is acquired as a figure (5), after which the flow goes to the next calculation.

The following will discuss a case where the calculation with figures written down on paper is carried out by the arithmetic unit 300. As shown in the right-hand side in FIG. 14, register X="3", register Y="0", register Z="0", and register A="0" are set at the beginning of an operation. Next, "A+1→1" (corresponding to the figure (1)) is set in the register A, "Y+1→1" (corresponding to the figure (2)) is set in the register Y, and "Y×1→1" (corresponding to the figure (3)) is set in the register Z. Then, i (calculation start digit)=62 is set in the register I, w (calculation end word)=15 is set in the register W, and when the operation starts, an operation on the output data of the register X and the output data of the register Z is performed and the operation result is set as "3−1→2" (corresponding to the figure (4)) in the register X. Further, "Y+1→2" (corresponding to the figure (5)) is set in the register Y.

Figure 15:
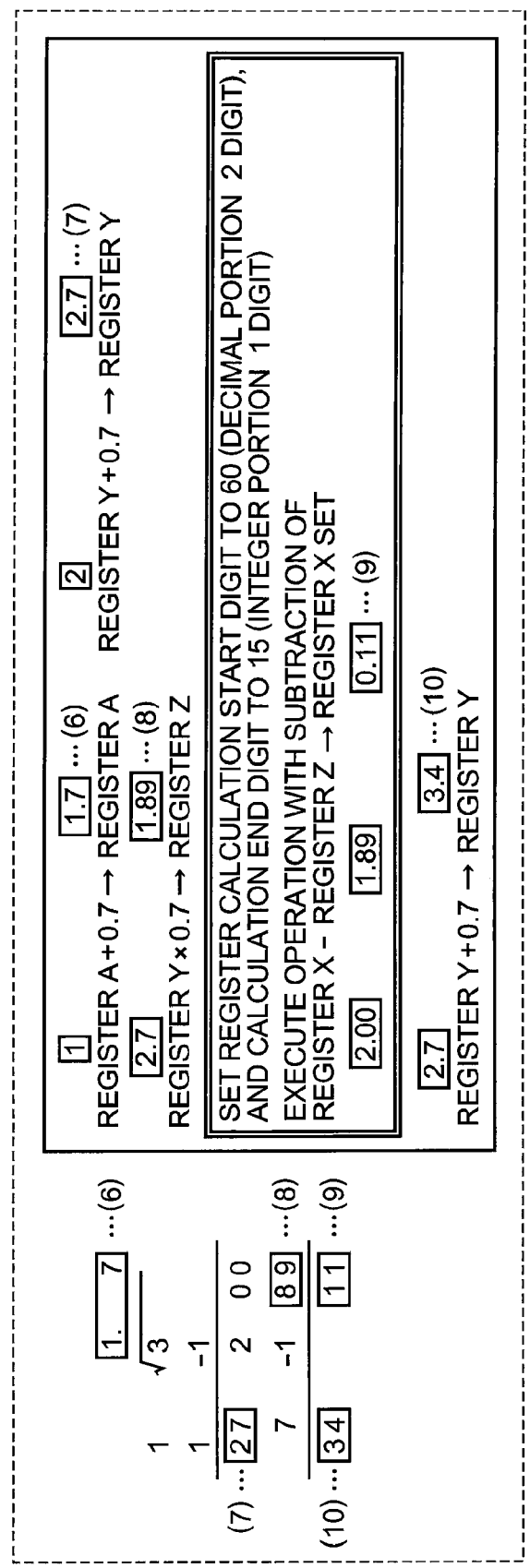
FIG. 15 is a diagram illustrating the square root operation routine in the arithmetic unit according to the second embodiment.

Next, as shown in the left-hand side in FIG. 15, the maximum x at which (20+x)×x becomes equal to or smaller than 200 is acquired from the equation 1, and a figure (6) is acquired as "1.7" from x=7. A figure (7) is acquired as "27" from (20+x). A value "189" obtained by multiplying "27" by "7" is acquired as a figure (8), the figure (8) is subtracted from 200, yielding a subtraction result "11" as a figure (9). Further, a value "37" resulting from addition of "7" to the figure (7) is acquired as a figure (10), after which the step goes to the next calculation.

The following will discuss a case where the calculation with figures written down on paper is carried out by the arithmetic unit 300. As shown in the right-hand side in FIG. 15, "A+0.7→1.7" (corresponding to the figure (6)) is set in the register A, "Y+0.7→2.7" (corresponding to the figure (7)) is set in the register Y, and "Y×0.7→1.89" (corresponding to the figure (8)) is set in the register Z. Then, i (calculation start digit)=60 is set in the register I, w (calculation end word)=15 is set in the register W, and when the operation starts, an operation on the output data of the register X and the output data of the register Z is performed and the operation result is set as "2.00−1.89→0.11" (corresponding to the figure (9)) in the register X. Further, "Y+0.7→3.4" (corresponding to the figure (10)) is set in the register Y.

Figure 16:
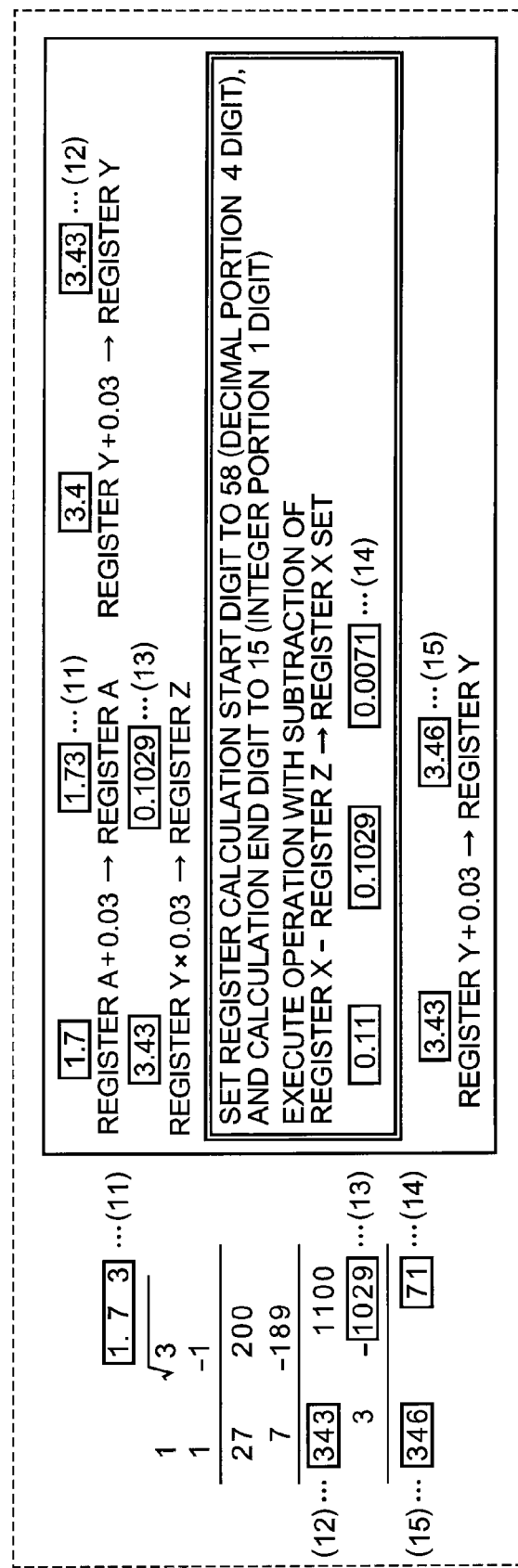
FIG. 16 is a diagram illustrating the square root operation routine in the arithmetic unit according to the second embodiment.

Next, as shown in the left-hand side in FIG. 16, the maximum x at which (340+x)×x becomes equal to or smaller than 1100 is acquired from the equation 1, and a figure (11) is acquired as "1.73" from x=3. A figure (12) is acquired as "343" from (340+x). A value "1029" obtained by multiplying "343" by "3" is acquired as a figure (13), the figure (13) is subtracted from 1100, yielding a subtraction result "71" as a figure (14). Further, a value "346" resulting from addition of "3" to the figure (12) is acquired as the figure (15), after which the step goes to the next calculation.

The following will discuss a case where the calculation with figures written down on paper is carried out by the arithmetic unit 300. As shown In the right-hand side in FIG. 16, "A+0.03→1.73" (corresponding to the figure (11)) is set in the register A, "Y+0.03→3.43" (corresponding to the figure (12)) is set in the register Y and "Y×0.03→0.1029" (corresponding to the figure (13)) is set in the register Z. Then, i (calculation start digit)=58 is set in the register I, w (calculation end word)=15 is set in the register W, and when the operation starts, an operation on the output data of the register X and the output data of the register Z is performed and the operation result is set as "0.11−0.1029→0.0071" (corresponding to the figure (14)) in the register X. Further, "Y+0.03→3.46" (corresponding to the figure (15)) is set in the register Y.

Figure 17:
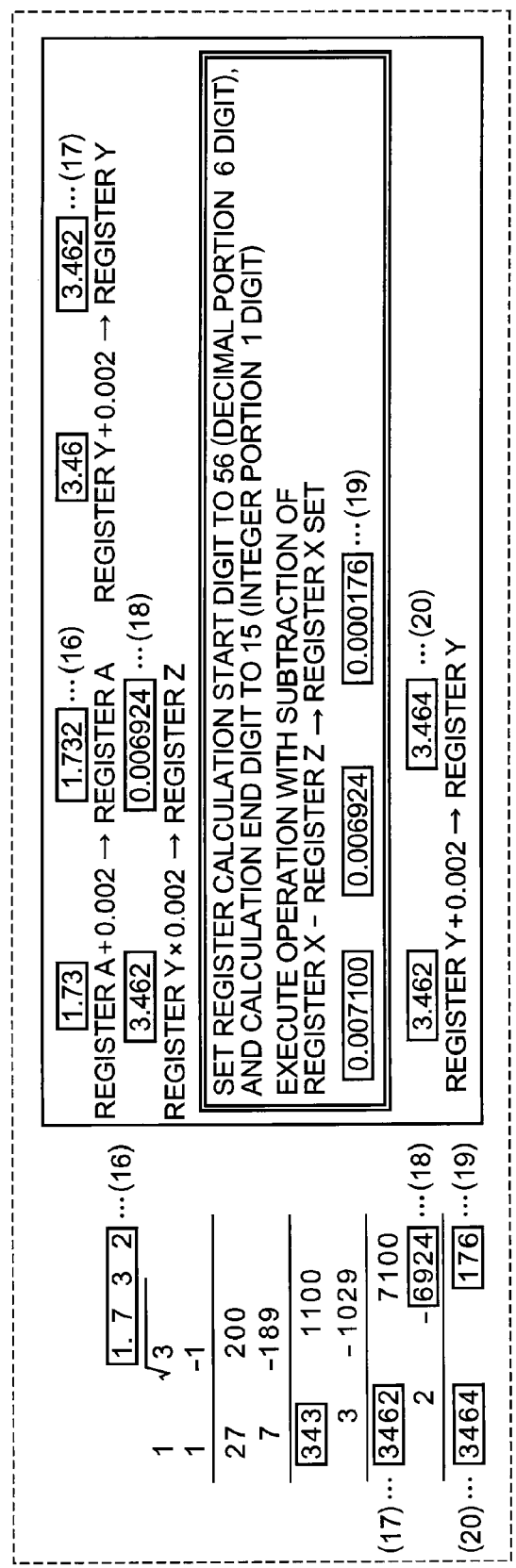
FIG. 17 is a diagram illustrating the square root operation routine in the arithmetic unit according to the second embodiment.

Next, as shown in the left-hand side in FIG. 17, the maximum x at which (3460+x)×x becomes equal to or smaller than 7100 is acquired from the equation 1, and a figure (16) is acquired as "1.732" from x=2. A figure (17) is acquired as "3462" from (3460+x). A value "6924" obtained by multiplying "3462" by "2" is acquired as a figure (18), the figure (18) is subtracted from 7100, yielding a subtraction result "176" as a figure (19). Further, a value "3464" resulting from addition of "2" to the figure (17) is acquired as the figure (20), after which the step goes to the next calculation.

The following will discuss a case where the calculation with figures written down on paper is carried out by the arithmetic unit 300. As shown in the right-hand side in FIG. 17, "A+0.002→1.732" (corresponding to the figure (16)) is set in the register A, "Y+0.002→3.462" (corresponding to the figure (17)) is set in the register Y, and "Y×0.002→0.006924" (corresponding to the figure (18)) is set in the register Z. Then, i (calculation start digit)=56 is set in the register I, w (calculation end word)=15 is set in the register W, and when the operation starts, an operation on the output data of the register X and the output data of the register Z is performed and the operation result is set as "0.007100−0.006924→0.00176" (corresponding to the figure (19)) in the register X. Further, "Y+0.002→3.464" (corresponding to the figure (20)) is set in the register Y.

When the type of calculation, "square root", the number of calculations, "3", the calculation start digit, "56th digit", and the calculation end digit, "15th word", are given as instructions, as described above, "1.732" is acquired as the operation result.

Next, referring to FIGS. 18 to 20, a description will be given of an operation method when "cube root" is set as the type of calculation, "3" is set as the number of calculations, "56-th digit (i=56)" is set as the calculation start digit and "15-th word (w=15)" is set as the calculation end digit. In the following description, the register section 360 in the arithmetic unit 300 is Illustrated as having five registers X, Y, Z, A and B which are adequately changed from one to another in use.

Figure 18:
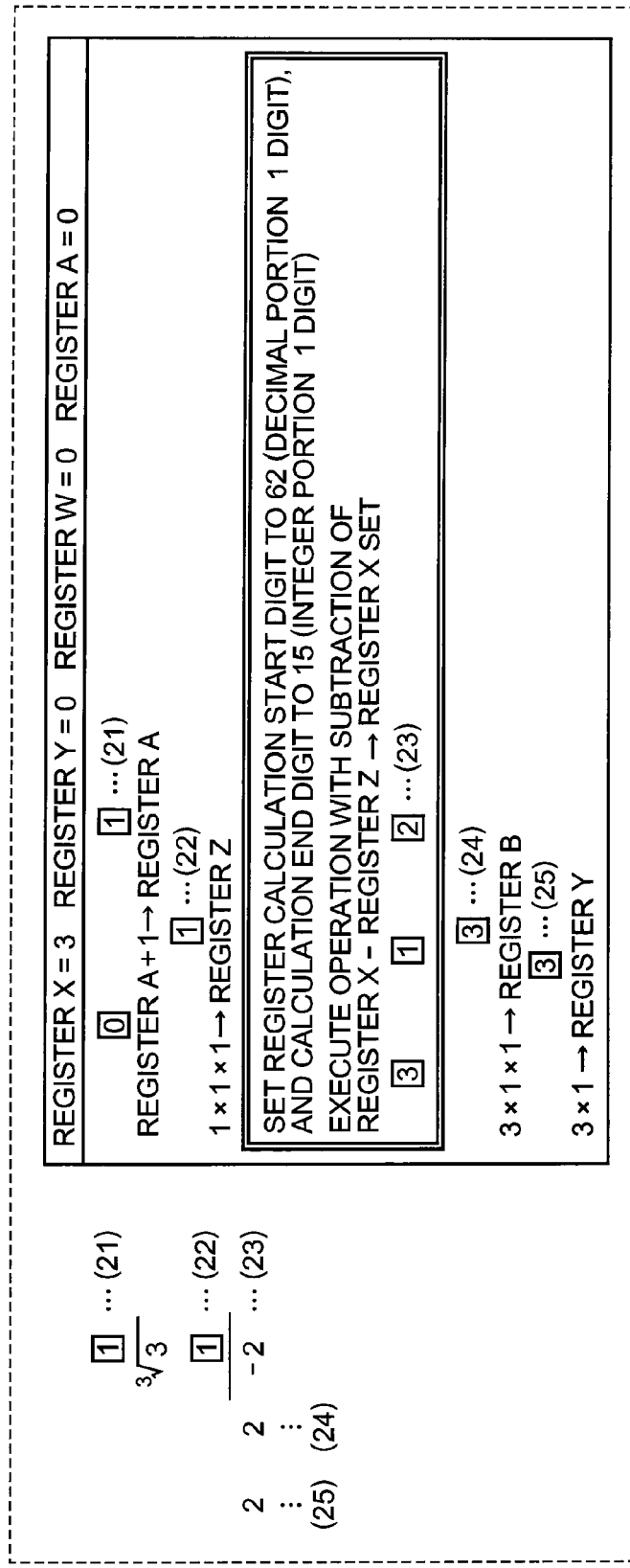
FIG. 18 is a diagram illustrating a cube root operation routine in the arithmetic unit according to the second embodiment.
Figure 19:
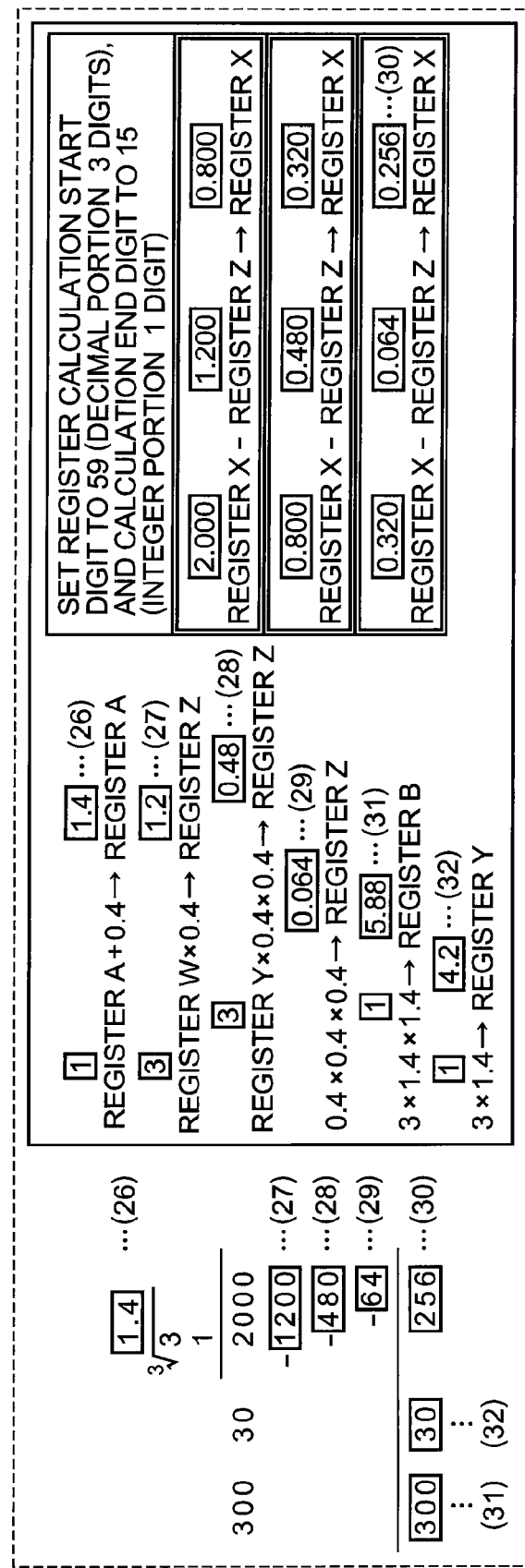
FIG. 19 is a diagram illustrating the cube root operation routine in the arithmetic unit according to the second embodiment.

Arithmetic expressions on the left-hand side in FIGS. 18 to 20 are given for explaining the method of calculating a cube root with FIGS. written down on paper, and calculation procedures on the right-hand side in FIGS. 18 to 20 are given for explaining the cube root calculation method that is executed by the arithmetic unit 300. It is assumed that in acquiring a cube root by calculation with figures written down on paper, the values of individual digits are acquired based on the following equation 2. As this method is well know, the detailed description will not be given.

$$(a+b+c+d+\ldots)^3 = a^3+3a^2b+3ab^2+b^3+(3a^2+6ab+3b^2)c+(3a+3b)c^2+(3a+3b)c^2+c^3+\ldots \quad (2)$$

As shown in the left-hand side in FIG. 18, a figure (21) is acquired from the equation 2 as a value "1" which, when cubed, does not exceed "3" when "3" is the number of calculations. A cube root "$1^3$" of the figure (21) is acquired as a figure (22), and a subtraction result "2" obtained by subtracting the figure (22) from the number of calculations "3" is acquired as a figure (23). A figure (24) is acquired as a value "3" obtained by multiplying the square root "$1^2$" of the figure (21) by "3". A figure (25) is acquired as a value "3" obtained by multiplying the figure (21) by "3", after which the flow goes to the next calculation.

The following will discuss a case where the calculation with figures written down on paper is carried out by the arithmetic unit 300. As shown in the right-hand side in FIG. 18, register X="3", register Y="0", register Z="0", register W="0", and register A="0" are set at the beginning of an operation. Next, "A+1→1" (corresponding to the figure (21)) is set in the register A, and "$1^3$→1" (corresponding to the figure (22)) is set in the register Z. Then, i (calculation start digit)=62 is set in the register I, w (calculation end word)=15 is set in the register W, and when the operation starts, an operation on the output data of the register X and the output data of the register Z is performed and the operation result is set as "3−1→2" (corresponding to the figure (23)) in the register X. Further, "3×1×1→3" (corresponding to the figure (24)) is set in the register B, and "3×1→3" (corresponding to the figure (25)) is set in the register Y.

Next, as shown in the left-hand side in FIG. 19, the maximum x at which 300×x, 30×$x^2$, and $x^3$ become equal to or smaller than 2000 is acquired from the equation 2, and a figure (26) is acquired as "14" from x=4. A figure (27) is acquired as "1200" from 300×4. A figure (28) is acquired as "480" from 30×$4^2$, and a figure (29) as "64" from $4^3$. Then, the figures (27) to (29) are subtracted from 2000, yielding a subtraction result "256" as a figure (30). Further, a value "588" obtained by multiplying "3" by the square root "196" of the figure (26) is acquired as a figure (31), and a value "42" obtained by multiplying "3" by the figure (26) is acquired as a figure (32).

The following will discuss a case where the calculation with figures written down on paper is carried out by the arithmetic unit 300. As shown in the right-hand side in FIG. 19, "A+0.4→1.4" (corresponding to the figure (26)) is set in the register A, and "3×0.4→1.2" (corresponding to the figure (27)) is set in the register Z. Then, i (calculation start digit)=59 is set in the register I, w (calculation end word)=15 is set in the register W, and when the operation starts, an operation on the output data of the register X and the output data of the register Z is performed and the operation result is set in the register X as "2.000−1.200→0.800". Next, "3×$0.4^2$→0.48" (corresponding to the figure (28)) is set in the register Z, an operation on the output data of the register X and the output data of the register Z is performed and the operation result is set in the register X as "0.800−0.480→0.320".

Further, "$0.4^3$→0.064" (corresponding to the figure (29)) is set in the register Z, an operation on the output data of the register X and the output data of the register Z is performed and the operation result is set in the register X as "0.320−0.064→0.256" (corresponding to the figure (30)). "3×$1.4^2$→5.88" (corresponding to the figure (31)) is set in the register B, and "3×1.4→4.2" (corresponding to the figure (32)) is set in the register Y.

Next, as shown in the left-hand side in FIG. 20, the maximum x at which 58800×$x^3$, 420×$x^2$ and $4^3$ become equal to or smaller than 256000 is acquired from the equation 2, and a figure (33) is acquired as "144" from x=4. A figure (34) is acquired as "235200" from 58800×4. A figure (35) is acquired as "6720" from 420×$4^2$, and a figure (36) as "64" from $4^3$. Then, the figures (34) to (36) are subtracted from 256000, yielding a subtraction result "14016" as a figure (37). Further, a value "62208" obtained by multiplying "3" by the square root "20736" of the figure (33) is acquired as a figure (38), and a value "432" obtained by multiplying "3" by the figure (33) is acquired as a figure (38), after which the calculation is terminated.

The following will discuss a case where the calculation with figures written down on paper is carried out by the arithmetic unit 300. As shown in the right-hand side in FIG. 20, "A+0.04→1.44" (corresponding to the figure (33)) is set in the register A, and "5.88×0.04→0.2352" (corresponding to the figure (34)) is set in the register Z. Then, i (calculation start digit)=59 is set in the register I, w (calculation end word)=15 is set in the register W, and when the operation starts, an operation on the output data of the register X and the output data of the register Z is performed and the operation result is set in the register X as "0.25600−0.235200→0.020800". Next, "4.2×$0.4^2$→0.00672 (corresponding to the figure (35)) is set in the register Z, an operation on the output data of the register X and the output data of the register Z is performed and the operation result is set m the register X as "0.020800−0.006720→0.014080".

Further, "$0.04^3$→0.00064" (corresponding to the figure (36)) is set in the register Z, an operation on the output data of the register X and the output data of the register Z is performed and the operation result is set in the register X as "0.014080320−0.000064→0.014016" (corresponding to the figure (37)). "3×$1.44^2$→6.2208" (corresponding to the figure (38)) is set in the register B, and "3×1.44→4.32" (corresponding to the figure (39)) is set in the register Y.

When the type of calculation, "square root", the number of calculations, "3", the calculation start digit, "56th digit", and the calculation end digit, "15th word", are given as instructions, as described above, "1.44" is acquired as the operation result.

In an operation to obtain a solution by repeatedly executing calculation of multiple digits in order, as done in performing an operation of a square root or a cube root, as described above, multidigit calculation that is carried out sequentially often corresponds to a single instruction which is executed with certain digits designated. As the arithmetic unit 300 can perform multidigit calculation with adequate digits designated in such a single instruction, therefore, it is easier to create a program for performing an operation of a square root or a cube root. In the operation of a square root or a cube root, the unit of multidigit calculation which is executed in order coincides with the process unit in the arithmetic unit 300, so that calculation can be done with the exact number of digits set by the program. This can provide an operation result with the required precision.

[Effects of Second Embodiment]

According to the second embodiment, the variable parameter memory section 320 of the arithmetic unit 300 has the 6-bit register I and the calculation start digit can be set by the unit of a digit with the data i set in the register I. That is, the calculation start digit can be set by the unit of a digit, so that multidigit calculation can be separated into small decimal calculations for individual units of digits from the calculation start digit to the calculation end digit and can be carried out calculation by calculation. As the calculation start digit and the calculation end digit are set in a calculation instruction beforehand by a program or the like created by a user, decimal calculation with the exact number of calculation digits set by the program instruction 311 in the program ROM 310 can be performed, thereby easily ensuring efficient decimal calculation.

Because the computing unit 370 performs an calculation every four digits while the digit unit for the calculation start digit can be designated by the 6-bit register I, the arithmetic unit of the second embodiment can be achieved with approximately the same circuit configuration as that of the arithmetic unit 200 of the first embodiment. In other words, the digit unit can be designated with a simple circuit alteration while hardly changing the program according to the number of calculation digits, leading to cost reduction and downsizing of the decimal calculation apparatus.

[Modifications of Second Embodiment]

(1) Unit of the Number of Calculation Digits

Although an operation is performed every four digits in decimal notation with one word (16 bits) being a unit in the second embodiment, the unit of the number of calculation digits is not limited to four digits. When the designated calculation digits are not a multiple of four, unnecessary data in a calculation end word is masked. Instead, an operation may be started every four digits from a predetermined n-th word including the calculation start digit and unnecessary data in the calculation start word may be masked.

(2) Variable Calculation End Digit

Although the calculation end digit is designated word by word by the register W in the second embodiment, the variable parameter memory section 320 may be further provided with a 6-bit register which can designate the calculation end digit by a digit unit.

(3) Making the Number of Calculation Digits in Exponent Portion Variable

Although any one of the second to fifteenth words is taken as a calculation start digit or a calculation start word, or a calculation end digit and the number of calculation digits in the imaginary portion is set variable in the second embodiment, the number of calculation digits in the exponent portion may be made variable.

(4) The Number of Words in a Register

Although the number of words in the register section 360 has been illustrated as "16", the number is in no way restrictive. Although the size of the imaginary portion is set to 14 words and the size of the exponent portion is set to 2 words, the word ratio may be changed as needed.

(5) The Number of Registers

Although the number of registers in the register section 360 has been mentioned to be "4" or "5" in the second embodiment, the number of registers is not restrictive.

[Third Embodiment]

A third embodiment will be described below.

An arithmetic system according to the third embodiment is designed to improve the operation speed by pipelining an operation in a computing unit. The following will discuss a case where pipeline processing is adapted to the arithmetic unit 200 of the arithmetic system S1 of the first embodiment. Same reference symbols are given to those components which are identical to the corresponding components of the first embodiment to avoid otherwise redundant illustrations and detailed descriptions. The detailed description given below is centered on the unique portions of the third embodiment.

Figure 21:
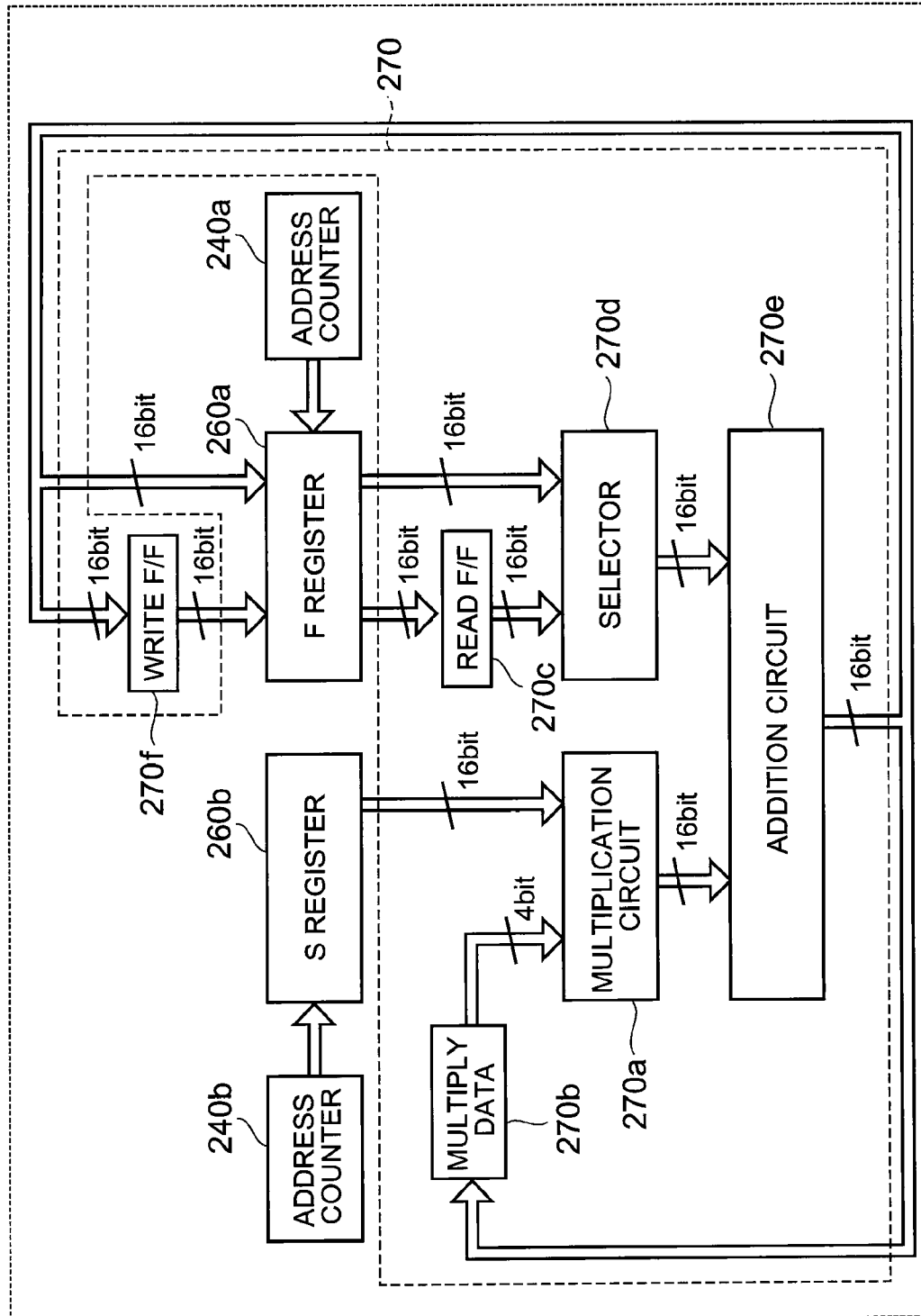
FIG. 21 is a block diagram of the components of a third embodiment.

FIG. 21 is a diagram showing the component blocks of the essential portions that are associated with pipeline processing of the computing unit. Referring to the diagram, the component blocks associated with pipeline processing include a computing unit 270, a register section 260, and an address counter 240. As the register section 260 is a dual port register having two ports for each of address designation and data output, the register section is illustrated, for the sake of convenience, as an F register 260a having a first port and an S register 260b having a second port. In an actual circuit, the register section 260 may be constituted physically by a single memory. The address counter 240, which outputs addresses to the two ports of the register section 260, comprises an address counter 240a which outputs an address to the first port, and an address counter 240b which outputs an address to the second port.

The F register 260a, which is accessible by two words (32 bits), reads 32 bits of data from an address designated by the address counter 240a and sends the data to the computing unit 270. The F register 260a writes two words (32 bits) of data, input from the computing unit 270 at an address designated by the address counter 240a. That is, the F register 260a alternately carries out reading of 32-bit data and writing of 32-bit data every clock.

The S register 260b, which is accessible by one word (16 bits), reads 16 bits of data from an address designated by the address counter 240b and sends the data to the computing unit 270.

The computing unit 270 comprises a multiplication circuit 270a, a latch circuit 270b, a read flip-flop (F/F) 270c, a selector 270d, an addition circuit 270e, and a write F/F 270f. The multiplication circuit 270a multiplies 16-bit data, input from the S register 260b, by 4-bit data, input from the latch circuit 270b, and sends the multiplication result as 16-bit data to the addition circuit 270e. The latch circuit 270b, which is constituted by a flip-flop (F/F), holds 4-bit data, and sends the data to the multiplication circuit 270a.

The read F/F 270c holds 16-bit data, input from the F register 260a, and sends the data to the selector 270d alternately selects 16-bit data from the F register 260a and 16-bit data from the read F/F 270c, and sends the selected data to the addition circuit 270e every clock.

The addition circuit 270e adds 16-bit data from the multiplication circuit 270a and 16-bit data from the selector 270d as operands, and sends the addition result as 16-bit data to the write F/F 270f and the F register 260a. The addition circuit 270e sends a part of the addition result as 4-bit data to the latch circuit 270b. The write F/F 270f holds 16-bit data from the addition circuit 270e, and sends the data to the F register 260a.

Figure 22:
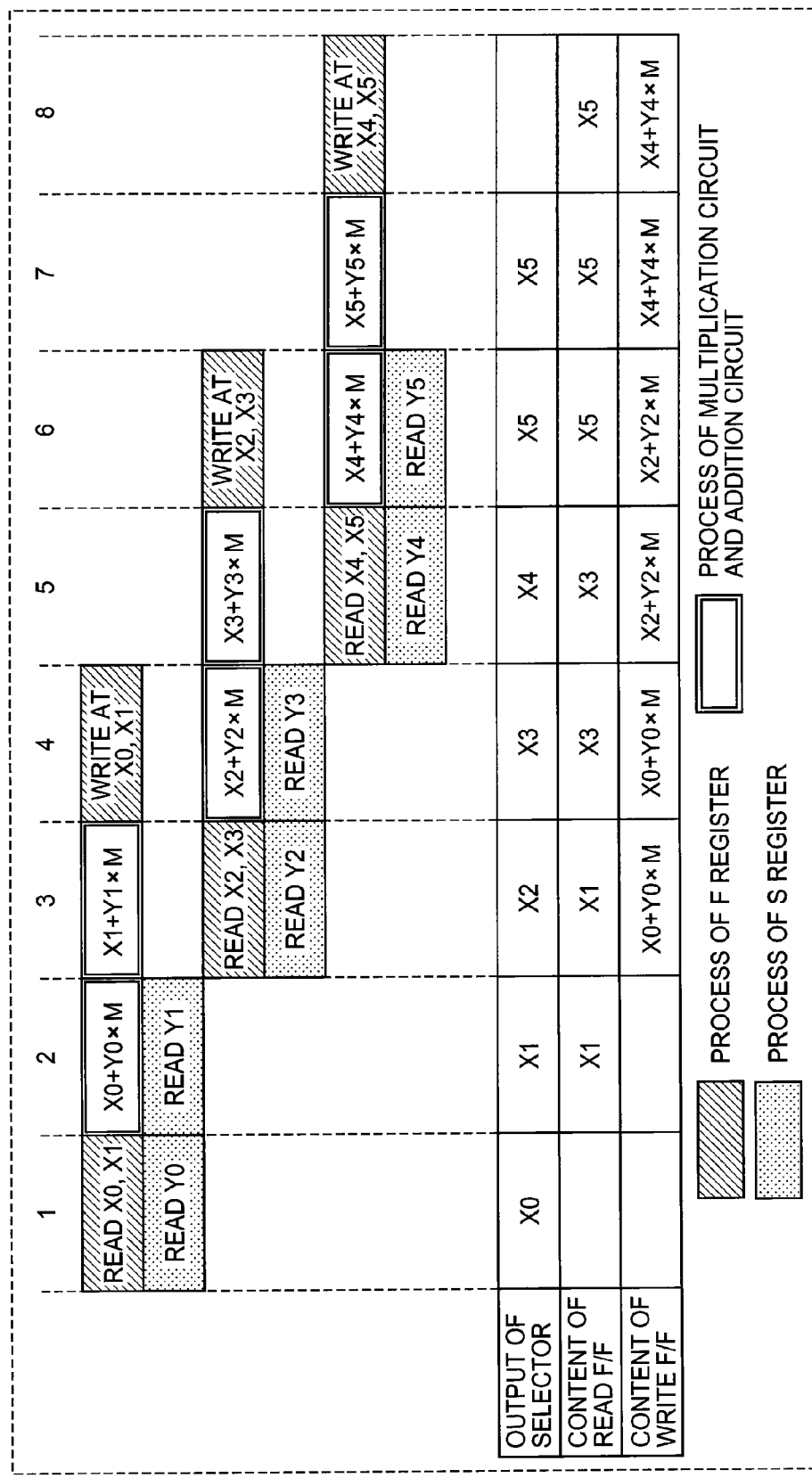
FIG. 22 is a diagram illustrating a timing chart.

The operation of the computing unit 270 will be described referring to a timing chart illustrated in FIG. 22. FIG. 22 shows the timing chart of sum of products which is executed based on a calculation instruction "X0~5+Y0~5". In the diagram, X is data which is input and output to and from the F register 260a, Y is data which is output from the S register 260b, and M is data which is output from the latch circuit 270b.

First, at the first clock, data X0 and X1 are read from the F register 260a, and the data X0 is selected by the selector 270d and is output to the addition circuit 270e. The data X1 is held in the read F/F 270c. Data Y0 is read from the S register 260b and is output to the multiplication circuit 270a.

At the second clock, a sum of products "X0+Y0×M" is carried out by the multiplication circuit 270a and the addition circuit 270e. The data X1 is output to the selector 270d from the read F/F 270c, is selected by the selector 270d, and is output to the addition circuit 270e. Data Y1 is read from the S register 260b and is output to the multiplication circuit 270a.

At the third clock, a sum of products "X1+Y1×M" is carried out by the multiplication circuit 270a and the addition circuit 270e. The result of the operation of "X0+Y0×M" performed previously is held in the write F/F 270f. Data X2 and X3 are read from the F register 260a. The data X2 is selected by the selector 270d, and is output to the addition circuit 270e. The data X3 is held in the read F/F 270c. Data Y2 is read from the S register 260b and is output to the multiplication circuit 270a.

At the fourth clock, the result of the operation of "X0+Y0× M" held in the write F/F 270f, and the result of the operation of "X1+Y1×M" output from the addition circuit 270c are written at X0 and X1 in the F register 260a. A sum of products "X2+Y2×M" is carried out by the multiplication circuit 270a and the addition circuit 270e. The data X3 is output to the selector 270d from the read F/F 270c, is selected by the selector 270d, and is output to the addition circuit 270e. Data Y3 is read from the S register 260b and is output to the multiplication circuit 270a.

As apparent from the above, the sum of products based on the calculation instruction "X0~5+Y0~5" is performed in such a way that one cycle is executed in four clocks, and at and following the third clock, the process is carried out sequentially with two clocks overlapping the next cycle, thereby ensuring a fast operation. That is, the sum of products is performed in such a way that two operations (e.g., X0+Y0×M and X1+Y1×M) are executed in one cycle, and "X0~5+ Y0~5" requires three cycles for it includes six operations, so that the total number of clocks is 3×4=12 clocks. However, pipelining permits three cycles to be executed in eight clocks, thus shortening the operation time by four clocks.

[Effects of Third Embodiment]

According to the third embodiment, as described above, the input stage and the output stage of the F register that is accessible with 32-bit data (two words) are provided with the write F/F 270f and the read F/F 270c as temporary memory sections in which write data and read data, 16 bits each, are respectively held temporarily. Pipelining is accomplished by alternately executing writing and reading of 32-bit data to and from the F register 260a clock by clock at the same time as calculation of 16-bit data is executed in the computing unit 270 clock by clock. This can improve the operation speed of the arithmetic unit.

[Modifications of Third Embodiment]

The calculation instruction "X0~5+Y0~5" is just an example, and the calculation start word and the calculation end word can be changed as needed. For a calculation instruction "X0~n+Y0~n". for example, when n is an odd value, a sum of products can be performed with the number of clocks=n+3. Although the foregoing description of the third embodiment has been given of the case where the component blocks include the multiplication circuit 270a and the addition circuit 270e and a sum of products is performed, an operation is not limited to a sum of products but other various operations can be adapted.

Although the foregoing description of the third embodiment has been given of the case where pipelining is carried out by the arithmetic unit 200 of the first embodiment, pipelining may be carried out by the arithmetic unit 300 of the second embodiment. In this case, a pipelined operation can be performed with the calculation start digit designated by a digit unit.

[Fourth Embodiment]

A fourth embodiment will be described below.

Figure 23:
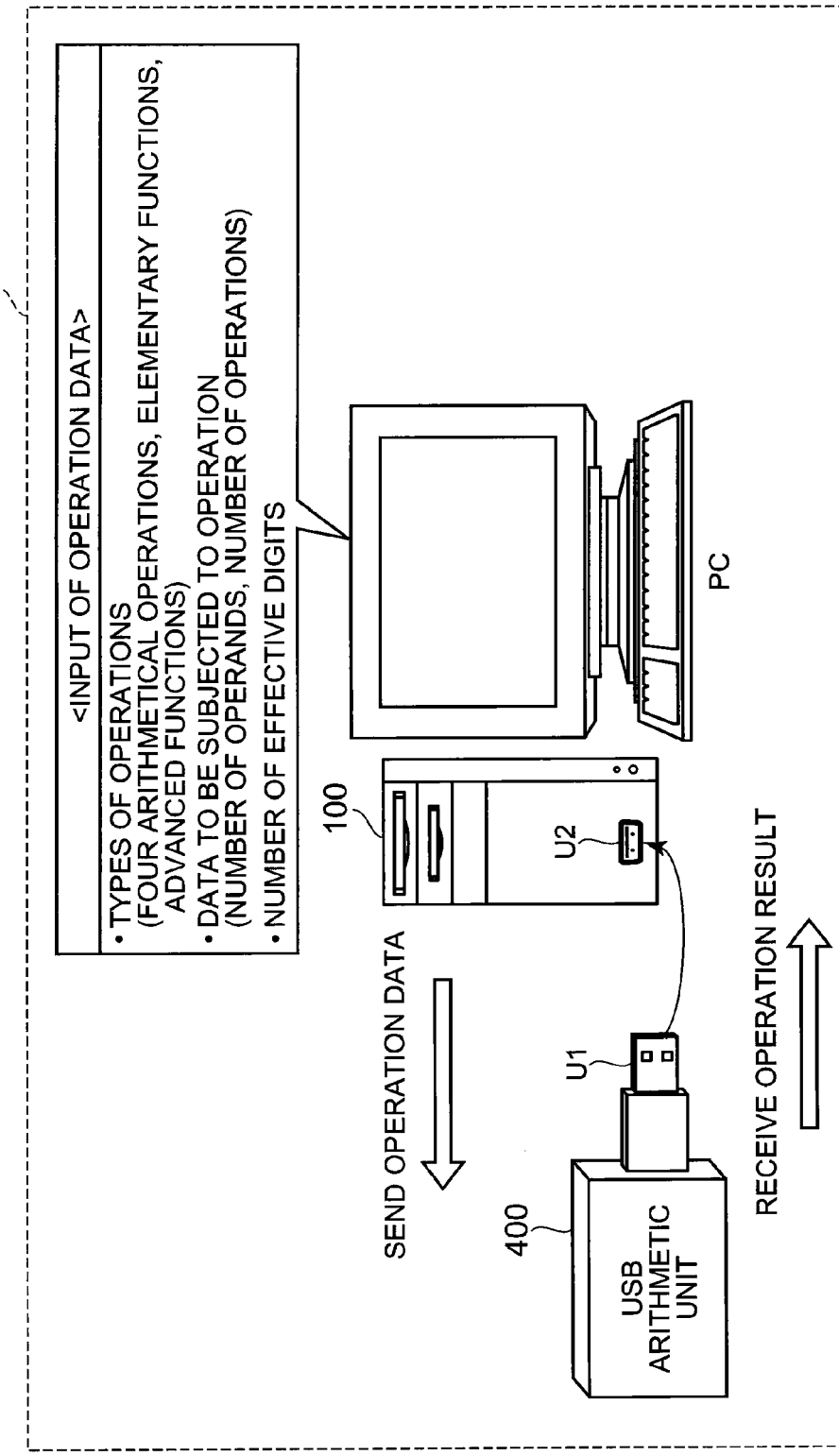
FIG. 23 is a schematic structural diagram of an arithmetic system according to a fourth embodiment.

FIG. 23 is a schematic structural diagram of an arithmetic system S3 according to the fourth embodiment. Referring to the diagram, the arithmetic system S3 is designed in such a way that the PC 100 and a USB arithmetic unit 400 are connected together via their respective USB terminals U2 and U1.

The PC 100 receives operation data input through an input device, such as a keyboard, and sends the input operation data to the USB arithmetic unit 400 connected via the USB terminals U2 and U1. In the fourth embodiment, operation data is data including the type of an operation (e.g., four arithmetic operations, elementary functions, and advanced functions), numeric data to be subjected to operations (the number of operands and the number of operations), and the number of effective digits (number of calculation digits). When receiving an operation result from the USB arithmetic unit 400, the PC 100 displays the operation result on a display device, such as a monitor.

Figure 24:
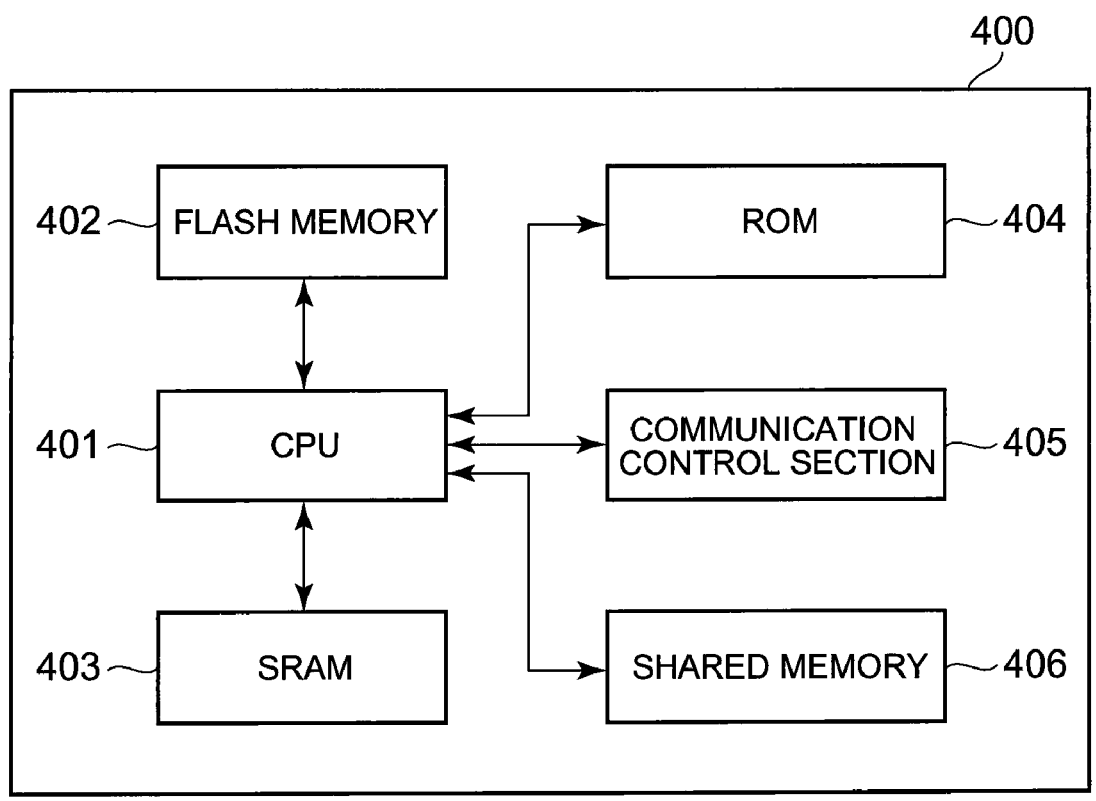
FIG. 24 is a block diagram showing the structures of the essential portions of a USB arithmetic unit.

FIG. 24 is a block diagram showing the structures of the essential portions of the USB arithmetic unit 400. Referring to the diagram, the USB arithmetic unit 400 comprises a CPU 401, a flash memory 402, an SRAM 403, a ROM 404, a communication control section 405, and a shared memory 406.

The CPU 401, constituted by an FPGA (Field Programmable Gate Array) or the like, reads a system program stored in the ROM 404, and various processing programs stored in the flash memory 402, and performs the general control of the apparatus and various kinds of operation processes. The CPU 401 is equivalent to the arithmetic unit 200 of the first embodiment shown in FIG. 3 or the arithmetic unit 300 of the second embodiment shown in FIG. 9. As the CPU 401 performs an operation from the designated calculation start digit or the designated calculation start word to a calculation end word, therefore, various operations can be executed with the desired number of calculation digits.

The flash memory 402, constituted by an electrically programmable non-volatile memory, stores various operation programs and stores an operation program, transferred from the PC 100, in a rewritable manner. A program stored in the flash memory 402 is used, for example, after being expanded on the program ROM 210 in the first embodiment.

The SRAM 403 is a memory section to be used as a word area or the like for the CPU 401, and stores a program read from the flash memory 402 or the ROM 404, and the results of an operation or so preformed by the CPU 401. The ROM 404 is equivalent to the register section 260 in the arithmetic unit 200 of the first embodiment or the register section 360 in the arithmetic unit 300 of the second embodiment.

The ROM 404 stores, for example, the system program for setting the initial states of the main body of the apparatus, and a communication control program for executing data communication with another apparatus connected by the USB terminal.

The communication control section 405, which has the USB terminal U1, controls data communication based on the USB standards with another apparatus connected by the USB terminal U1. Specifically, the communication control section 405 performs a communication control routine of performing serial or parallel conversion of data received from the PC 100, and writing the converted data in the shared memory 406, reading an operation result when the operation result is written in the shared memory 406 by the CPU 401 and transferring data to the PC 100.

The shared memory 406, constituted by an electrically programmable memory, stores operation data received from the PC 100 (e.g., the type of an operation, numeric data to be subjected to operations, and the number of effective digits) and an operation result or so output from the CPU 401.

Figures 25A, 25B, 25C:
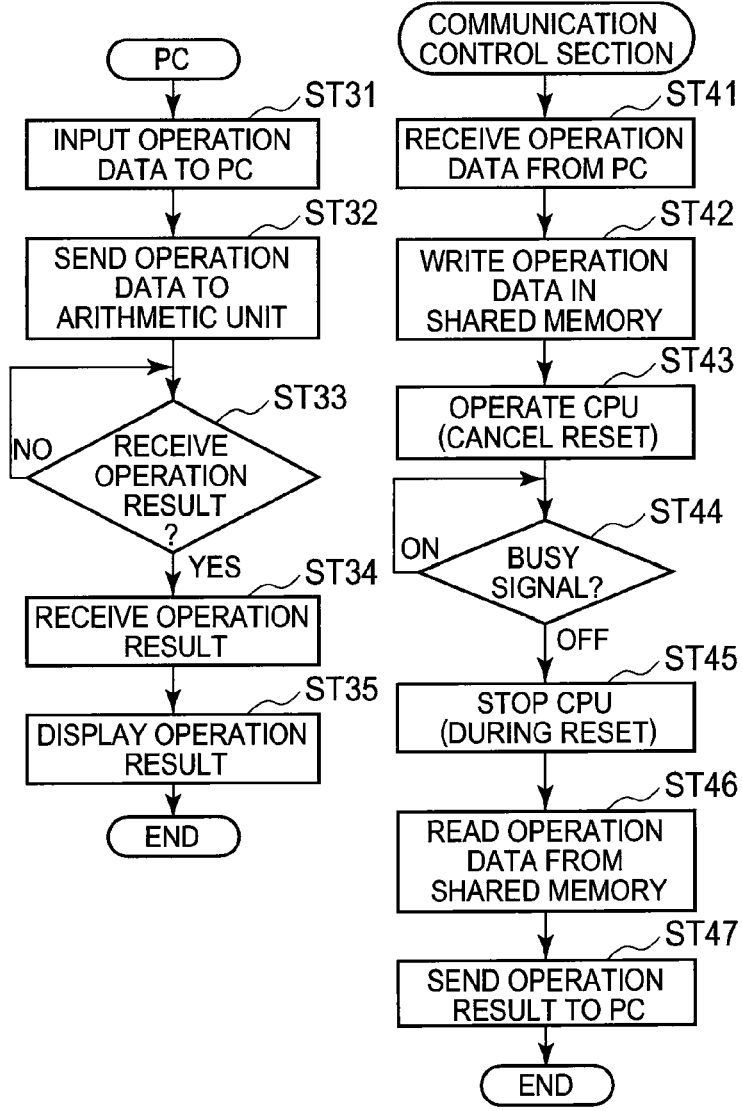
FIG. 25A is a flowchart illustrating a communication routine which is executed by a personal computer.
FIG. 25B is a flowchart illustrating a communication routine which is executed by a communication control section.
FIG. 25C is a flowchart illustrating a communication routine which is executed by a CPU.

The operation of the arithmetic system S2 according to the fourth embodiment will be described next. FIG. 25A is a flowchart illustrating a communication routine which is executed by the PC 100, FIG. 25B is a flowchart illustrating a communication routine which is executed by the communication control section 405, and FIG. 25C is a flowchart illustrating a communication routine which is executed by the CPU 401.

To begin with, the communication routine which is executed by the PC 100 will be discussed. As shown in FIG. 25A, when operation data is input according to the invention a user manipulation (step ST31), the PC 100 sends the input operation data to the USB arithmetic unit 400 connected via the USB terminal U2 (step ST32).

Next, the PC 100 stands by for reception of an operation result from the USB arithmetic unit 400 (step ST33). When receiving the operation result (step ST34), the PC 100 displays the received operation result on a display section (not shown) (step ST35), and terminates the communication routine.

Next, a description will be given of the communication routine which is executed by the communication control section 405. As shown in FIG. 25B, when receiving operation data from the PC connected via the USB terminal U1 (step ST41), the communication control section 405 writes the received operation data in the shared memory 406 (step ST42). Then, the communication control section 405 cancels outputting of a reset signal to the CPU 401 and operates the CPU 401 (step ST43).

Then, the communication control section 405 monitors a busy signal from the CPU 401 (step ST44). When the busy signal is disabled (step ST44; OFF), the communication control section 405 outputs the reset signal to stop the operation of the CPU 401 (step ST45). The communication control section 405 reads an operation result, written in the shared memory 406 by the CPU 401, from the shared memory 406 (step ST46). sends the operation result to the PC 100 (step ST47), then terminates the communication routine.

Next, a description will be given of the communication routine which is executed by the CPU 401 of the USB arithmetic unit 400. As shown in FIG. 25C, the CPU 401 discriminates whether the reset signal from the communication control section 405 has been canceled or not (step ST51). When the output of the reset signal has been canceled (step ST51; YES), the CPU 401 enables the busy signal and sends the busy signal to the communication control section 405 (step ST52). Then, the CPU 401 reads operation data from the shared memory 406 (step ST53), and executes an operation process (step ST54).

Figure 26:
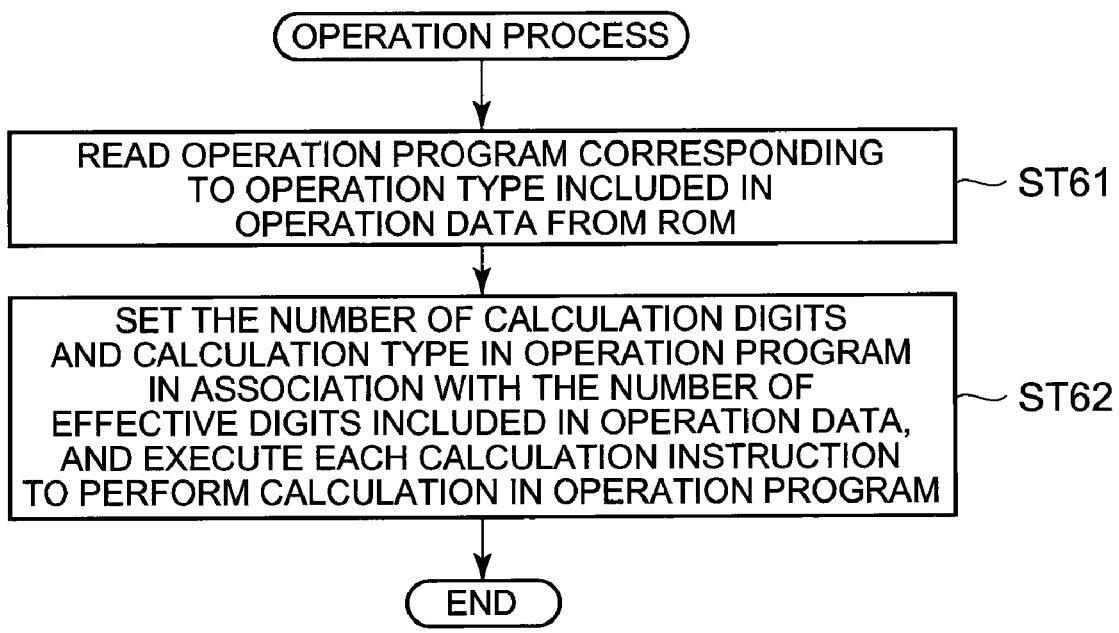
FIG. 26 is a flowchart illustrating an operation process which is executed by the CPU.

The operation process will be described next. FIG. 26 is a flowchart illustrating an operation process which is executed by the CPU 401. As shown in FIG. 26, the CPU 401 reads from the ROM an operation program corresponding to the type of an operation data included in the operation data (step ST61). Then, the CPU 401 sets the number of calculation digits of a calculation instruction and the type of calculation in the operation program in association with the number of effective digits included in the operation data, and executes each calculation instruction to perform calculation in the operation program (step ST62).

When the operation process is finished, the CPU 401 writes the operation result in the shared memory 406 (step ST55), and disables the busy signal to stop outputting the busy signal to the communication control section 405 (step ST56). Then, the CPU 401 goes to step ST51 to repeatedly execute the process.

[Effects of Fourth Embodiment]

According to the fourth embodiment, as described above, the USB arithmetic unit 400 and the PC 100 are connected together by their USB terminals U1 and U2, operation data (e.g., the type of an operation, numeric data to be subjected to operations, and the number of effective digits) is input from the PC 100, and the USB arithmetic unit 400 performs an operation with the desired number of calculation digits based on the operation data and sends the operation result to the PC 100. The operation result is displayed on the display section of the PC 100, so that even a PC which does not have a function of performing decimal calculation with an arbitrary number of calculation digits can perform decimal calculation with the desired number of calculation digits.

[Modifications of Fourth Embodiment]

Although the foregoing description of the fourth embodiment has been given of the case where data communication according to the USB standards is performed, the communication system is not limited to the USB system but may be wireless communication or the like which conforms to the SCSI (Small Computer System Interface) standards or the IrDA (Infrared Data Association) standards. Electronic devices to be connected to the USB arithmetic unit 400 are not limited to personal computers, but may be a PDA (Personal Data Assistant), a notebook type computer, a portable terminal and the like.

Although operation data has been described as including the type of an operation, numeric data to be subjected to an operation and the number of effective digits, operation data is not limited to such data. For example, operation data may include the calculation start digit or the calculation start word, and the calculation end digit, based on which the number of calculation digits is acquired.

Figure 27:
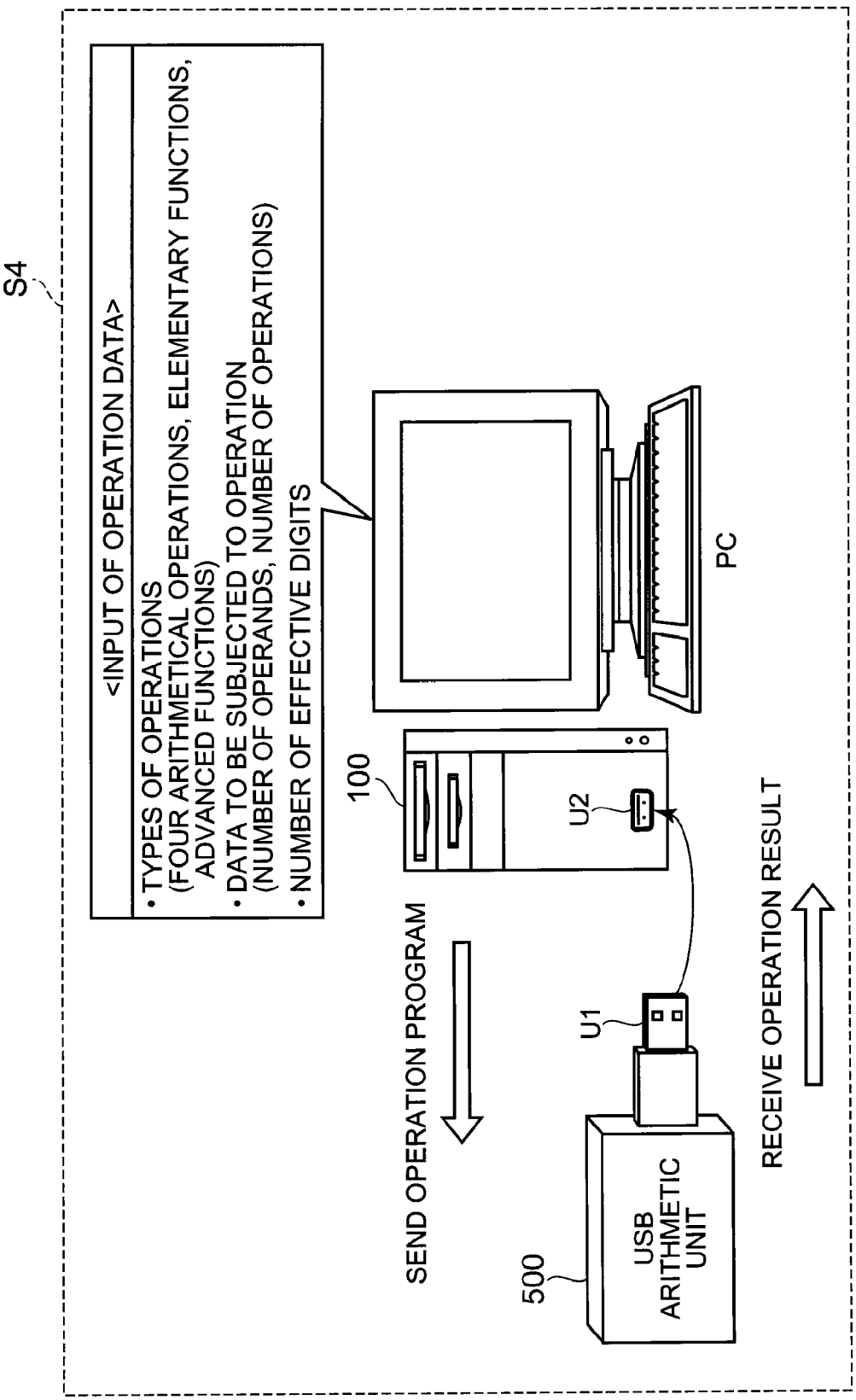
FIG. 27 shows a modification of the fourth embodiment.
Figure 28:
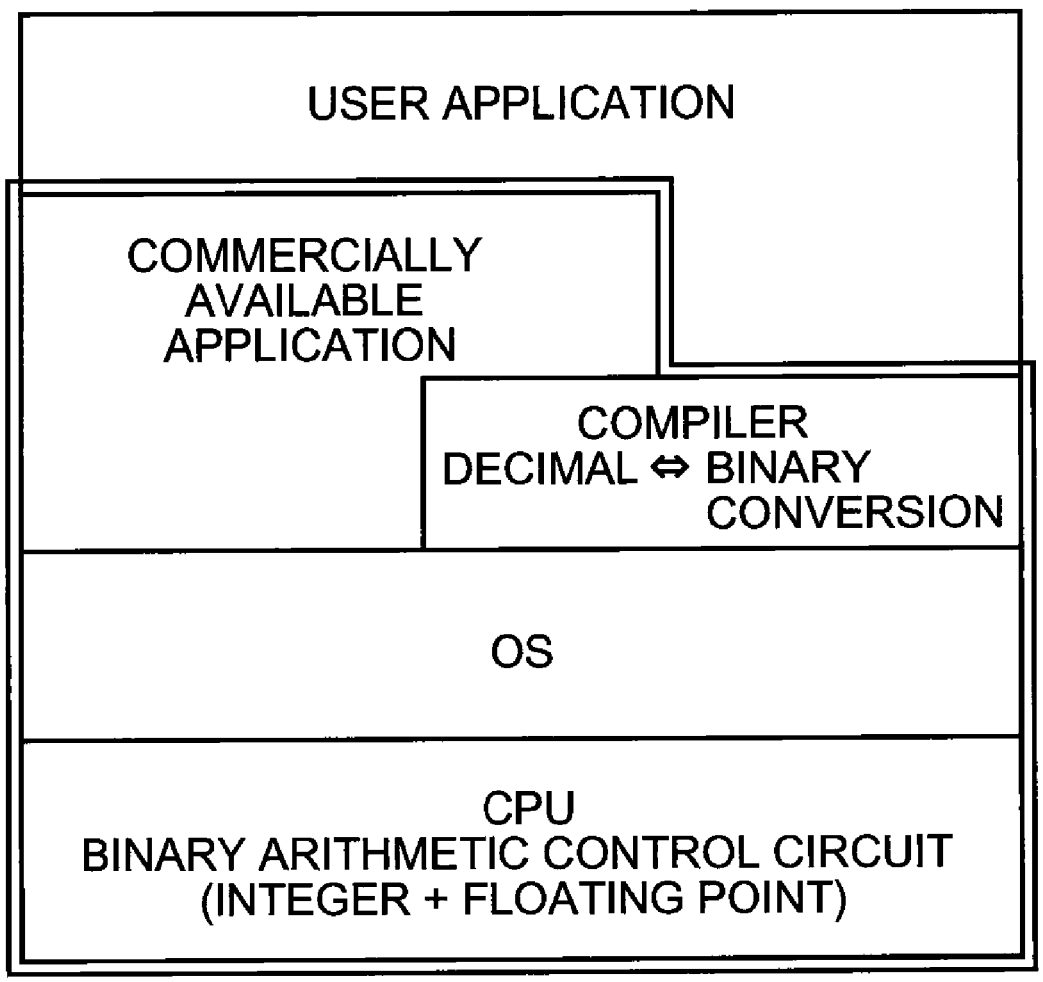
FIG. 28 is a diagram showing the logical hierarchical structure of a conventional arithmetic system.

Alternatively, the arithmetic system S3 may be designed like an arithmetic system S4 as shown in FIG. 27. When operation data is input, a PC 200 creates an operation program based on the input operation data. Specifically, an operation program according to an operation type, input by, for example, setting each number of calculation digits in the program to the number of digits corresponding to the number of effective digits is generated. Then, the generated operation program is sent to a USB arithmetic unit 500. In this case, the USB arithmetic unit 500 performs decimal calculation by executing each calculation instruction according to the operation program received from the PC 200. This configuration can permit generation of various kinds of operation programs on the PC 200 which is advantageous over the USB arithmetic unit 500 from the viewpoint of the memory capacity, so that the USB arithmetic unit 500 can execute a greater number of operation programs.

[Fifth and Sixth Embodiments (Description of Common Portions)]

Referring to FIGS. 29 to 39, a fifth embodiment in which the invention is adapted to a graph function electronic calculator, one type of arithmetic control unit, will be described in detail.

Figure 29:
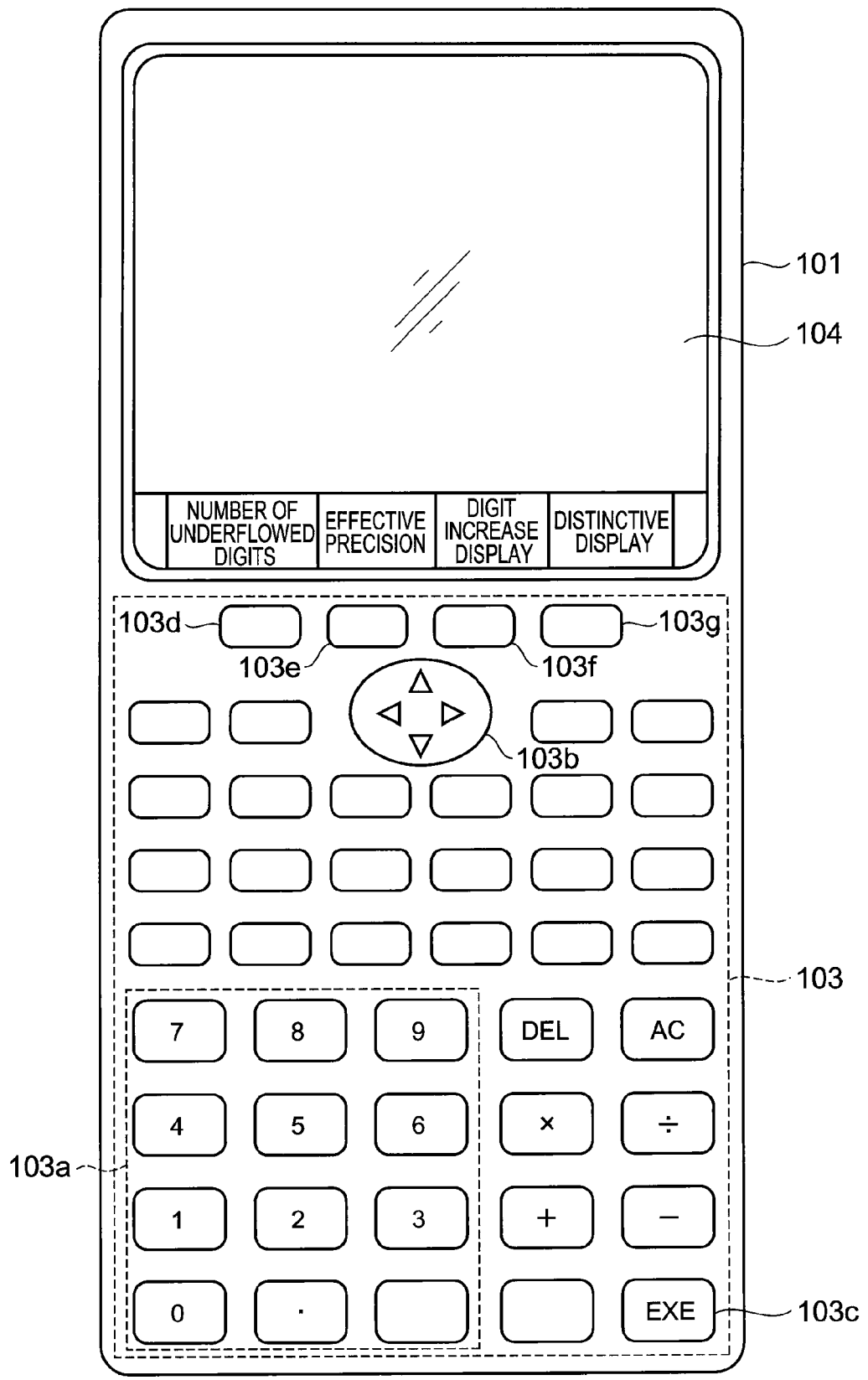
FIG. 29 is a schematic diagram of a graph function electronic calculator to which the invention is adapted.

FIG. 29 is a schematic diagram of a graph function electronic calculator 101. As illustrated in the diagram, the graph function electronic calculator 101 comprises a key group 103 including various kinds of operation keys, and a display 104.

The key group 103 includes keys that allow a user to input a numeral to the graph function electronic calculator 101 and to display an instruction to display an operation result. For example, the key group 103 has numeric keys 103a, a direction key 103b, an EXE key 103c, an underflowed-digit-number display key 103d, an effective-precision-digit-number display key 103e, a digit-number-increase display key 103f and an underflow-portion distinctive display key 103g.

The numeric keys 103a are for inputting numerals. The direction key 103b is to be depressed to, for example, move the cursor and select a function, and is so designed as to be able to input an instruction in the up, down, right and left directions.

The EXE key 103c is for instructing the graph function electronic calculator 101 to execute and decide a process. The underflowed-digit-number display key 103d is for giving an instruction to display the number of underflowed digits in the result of an operation performed. The effective-precision-digit-number display key 103e is for giving an instruction to display the number of effective precision digits. The number of effective precision digits is the number of digits of the effective precision in an operation result excluding underflowed digits, and is acquired by the difference between the number of operation digits input by a user and the number of underflowed digits.

The digit-number-increase display key 103f is for giving an instruction to display an operation result in a case where an operation is performed with an added operation digit number having a predetermined number of additional digits added to the number of operation digits input by a user. The underflow-portion distinctive display key 103g is for giving an instruction to display the values of underflowed digits in an operation result and the other values distinctively in different display modes.

Figure 30:
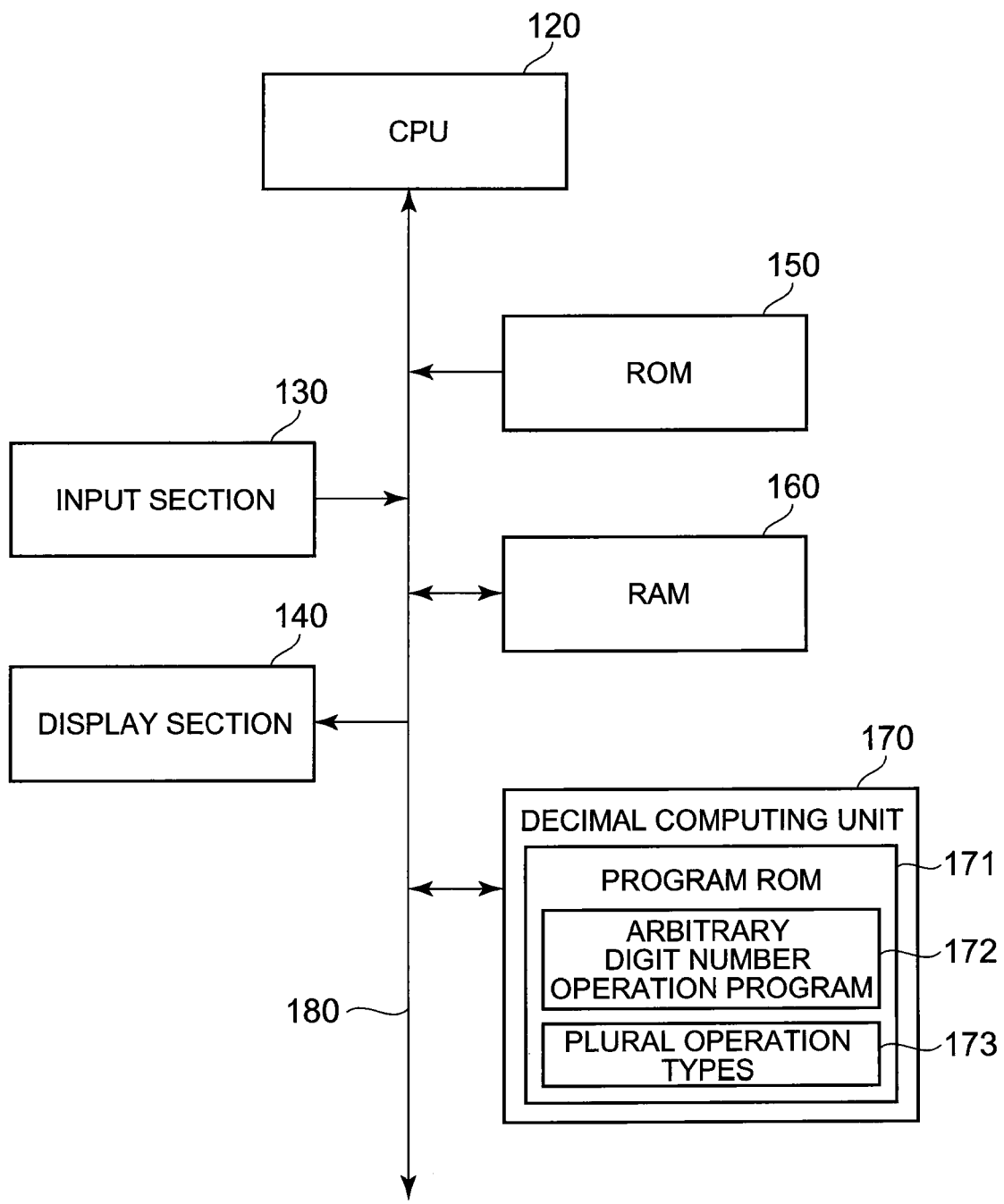
FIG. 30 is a block diagram showing the internal structure of the graph function electronic calculator to which the invention is adapted.

FIG. 30 is a block diagram showing the structure of the graph function electronic calculator 101. Referring to the diagram, the graph function electronic calculator 101 comprises a CPU 120, an input section 130, a display section 140, a ROM 150, a RAM 160, and a decimal computing unit 170, which are connected to one another in a data communicatable manner by a bus 180.

Based on an instruction input through the input section 130, the CPU 120 reads a predetermined program from the ROM 150, temporarily stores the program in the RAM 160, and performs various processes, such as detection of the number of under flowed digits in the result of an operation, performed by the decimal computing unit 170 using the program, and detection of the number of effective precision digits, and displays the processing result on the display section 140. That is, the CPU 120 serves to generally control the individual sections of the graph function electronic calculator 101.

The input section 130 is an input device having keys including numeric keys and a direction key, and sends a signal of a depressed key to the CPU 120. Key inputs through the input section 130 realize input means for inputting numerals, executing an operation, and instructing execution of a display process. The input section 130, which corresponds to the key group 103 shown in FIG. 29, should not necessarily be keys but may be a touch panel.

The display section 140 displays various screens based on various signals input from the CPU 120, and corresponds to the display 104 shown in FIG. 29.

Stored in the ROM 150 are a program for achieving each embodiment to be discussed later as well as a program and data for initializing the graph function electronic calculator 101 when powered ON. The ROM 150 will be discussed as a ROM 151 in a fifth embodiment and a ROM 153 in a sixth embodiment.

The RAM 160 is a memory area serving as a work area for the CPU 120 to temporarily store various kinds of data. The RAM 160 will be discussed as a RAM 161 in the fifth embodiment and a RAM 163 in the sixth embodiment.

The decimal computing unit 170 has a program ROM 171 and is an arithmetic unit which executes a decimal operation according to machine instructions of a machine program, and can perform an operation data in an arbitrary number of digits designated. Stored in the program ROM 171 are an arbitrary digit number operation program 172 for performing an operation in an arbitrary number of digits input, and a plural operation types 173.

The decimal computing unit 170 has a circuit structure similar to that of the decimal arithmetic unit 300 in FIG. 9. As the detailed description of the arithmetic unit 300 has already been give, the detailed description of the decimal computing unit 170 is omitted.

[Fifth Embodiment]

The fifth embodiment will be described below referring to FIGS. 31A to 36B.

To begin with, the structure of the fifth embodiment will be discussed.

Figure 31A:
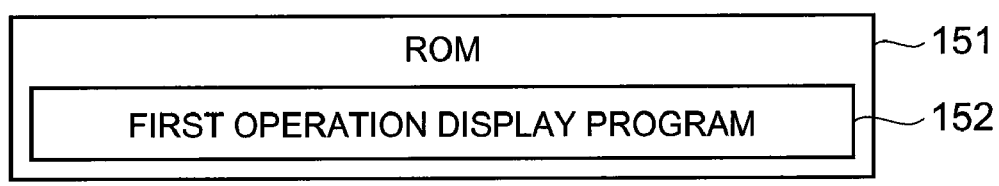
FIG. 31A is a diagram showing the data structure of a ROM according to a fifth embodiment.

FIG. 31A is a diagram showing the structure of the ROM 151 that the graph function electronic calculator 101 according to the fifth embodiment has in place of the ROM 150 in FIG. 30. Stored in the ROM 151 is a first operation display program 152 which is read and executed by the CPU 120 as a first operation display routine (see FIG. 32).

The first operation display routine is to execute an operation according to the input number of operation digits and the designated operation type, detect the number of underflowed digits and the number of effective precision digits of an operation result acquired by executing the operation, and display the operation result and notification of digit under flowing according to various display instructions. The operation of the first operation display routine will be described later in detail.

Figure 31B:
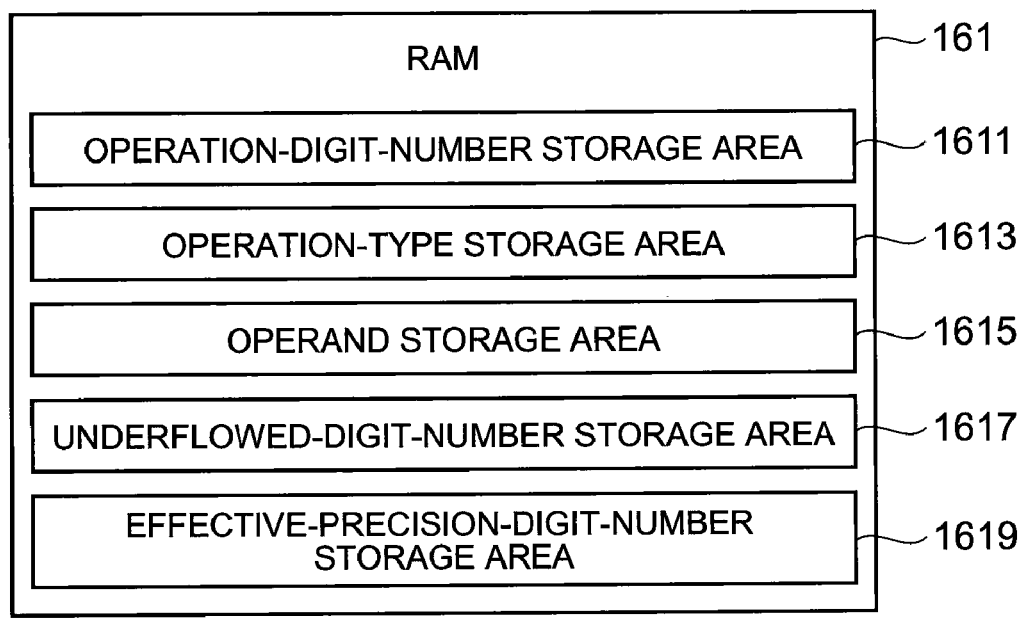
FIG. 31B is a diagram showing the data structure of a RAM according to the fifth embodiment.

FIG. 31B is a diagram showing the structure of the RAM 161 that the graph function electronic calculator 101 according to the fifth embodiment has in place of the RAM 160 in FIG. 30. The RAM 161 has an operation-digit-number storage area 1611 for storing the number of operation digits input, an operation-type storage area 1613 for storing a designated operation type, an operand storage area 1615 for storing an input operand, an underflowed-digit-number storage area 1617 for storing the number of digits underflowed through an operation, and an effective-precision-digit-number storage area 1619 for storing the number of effective precision digits of an operation result. The "number of operation digits" indicates the number of digits to be subjected to an operation, and the "operation type" indicates the type of a function to be subjected to an operation.

The operation of the fifth embodiment will now be discussed.

Figure 32:
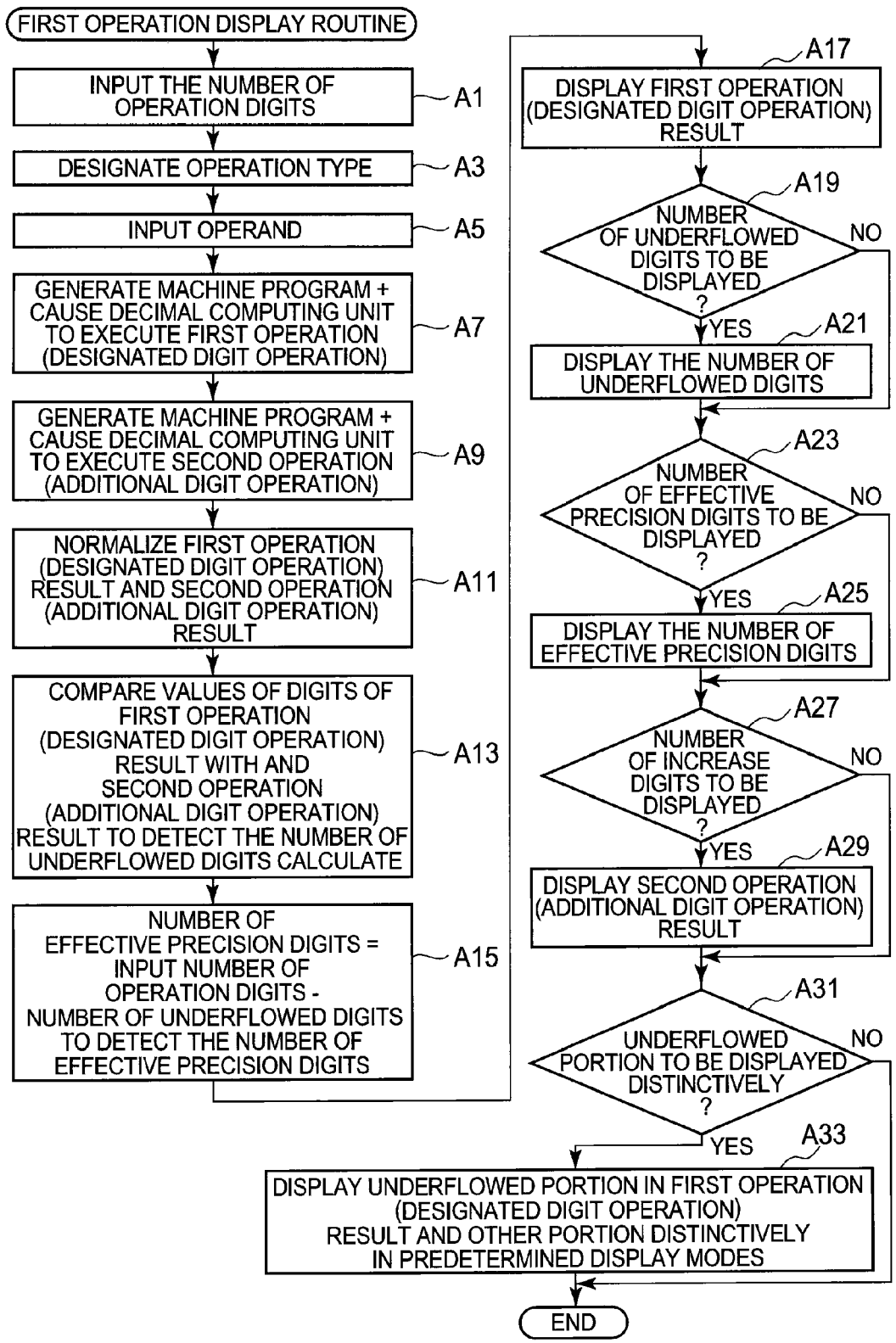
FIG. 32 is a flowchart illustrating the flow of a first operation (designated digit operation) display routine.

FIG. 32 is a flowchart illustrating the flow of a first operation display routine which is executed by the graph function electronic calculator 101 as the CPU 120 reads and executes the first operation display program 152.

When the number of operation digits is input through the input section 130 by a user (step A1), the CPU 120 stores the input number of operation digits in the operation-digit-number storage area 1611. When an operation type is designated by the user (step A3), the CPU 120 stores the designated operation type in the operation-type storage area 1613. When an operand is input by the user (step A5), the CPU 120 stores the input operand in the operand storage area 1615.

Next, the CPU 120 generates a machine program for executing an operation with the designated operation type in the input number of operation digits by using the input operand, and causes the decimal computing unit 170 to execute the operation (hereinafter called "first operation (designated digit operation)") (step A7). The CPU 120 also generates a machine program for executing the operation with the designated operation type in the added number of operation digits which is acquired by adding a predetermined number of additional digits (e.g., "four digits") to the input number of operation digits, and causes the decimal computing unit 170 to execute the operation (hereinafter called "second operation (additional digit operation)") (step A9).

Next, the CPU 120 performs normalization of setting the values of the most significant digits of operation results obtained through the first operation (designated digit operation) and the second operation (additional digit operation) (hereinafter respectively called "first operation (designated digit operation) result" and "second operation (additional digit operation) result") to other than "0" (step A11).

Then, the CPU 120 compares the first operation (designated digit operation) result with the second operation (additional digit operation) result and detects the number of digits which do not have a match as the number of underflowed digits (step A13), and stores the number of underflowed digits in the underflowed-digit-number storage area 1617. The CPU 120 detects the number of effective precision digits using the detected number of underflowed digits (step A15), and stores the number of effective precision digits in the effective-precision-digit-number storage area 1619. The "number of effective precision digits" is the number of digits of the effective precision in the first operation (designated digit operation) result excluding the underflowed digits, and is detected as the difference between the input number of operation digits and the number of underflowed digits.

Next, the CPU 120 displays the first operation (designated digit operation) result on the display section 140 (step A17). Then, the CPU 120 discriminates whether an underflowed-digit-number display is instructed or not by checking if the underflowed-digit-number display key 103$d$ is depressed (step A19). When the CPU 120 decides that such an instruction is given (step A19; YES), the CPU 120 displays the number of underflowed digits detected at step A13 on the display section 140 (step A21). When the CPU 120 does not decide that such an instruction is given (step A19; NO), the CPU 120 goes to step A23.

Then, the CPU 120 discriminates whether an effective-precision-digit-number display is instructed or not by checking if the effective-precision-digit-number display key 103$e$ is depressed (step A23). When the CPU 120 decides that such an instruction is given (step A23; YES), the CPU 120 displays the number of effective precision digits detected at step A15 on the display section 140 (step A25). When the CPU 120 does not decide that such an instruction is given (step A23; NO), the CPU 120 goes to step A27.

Then, the CPU 120 discriminates whether a digit-number-increase display is instructed or not by checking if the digit-number-increase display key 103$f$ is depressed (step A27). When the CPU 120 decides that such an instruction is given (step A27; YES), the CPU 120 displays the second operation (additional digit operation) result on the display section 140 (step A29). When the CPU 120 does not decide that such an instruction is given (step A27; NO), the CPU 120 goes to step A31.

Then, the CPU 120 discriminates whether an underflow-portion distinctive display is instructed or not by checking if the underflow-portion distinctive display key 103$g$ is depressed (step A31). When the CPU 120 decides that such an instruction is given (step A31; YES), the CPU 120 displays the values of the underflowed digits in the first operation (designated digit operation) result and the other values distinctively in different display modes (step A33), and then terminates the first operation (designated digit operation) display routine.

When the CPU 120 does not decide at step A31 that the underflow-portion distinctive display instruction is given (step A31; NO), the CPU 120 terminates the first operation (designated digit operation) display routine.

The processes discussed above will be described specifically referring to display screen examples.

Figure 33A:
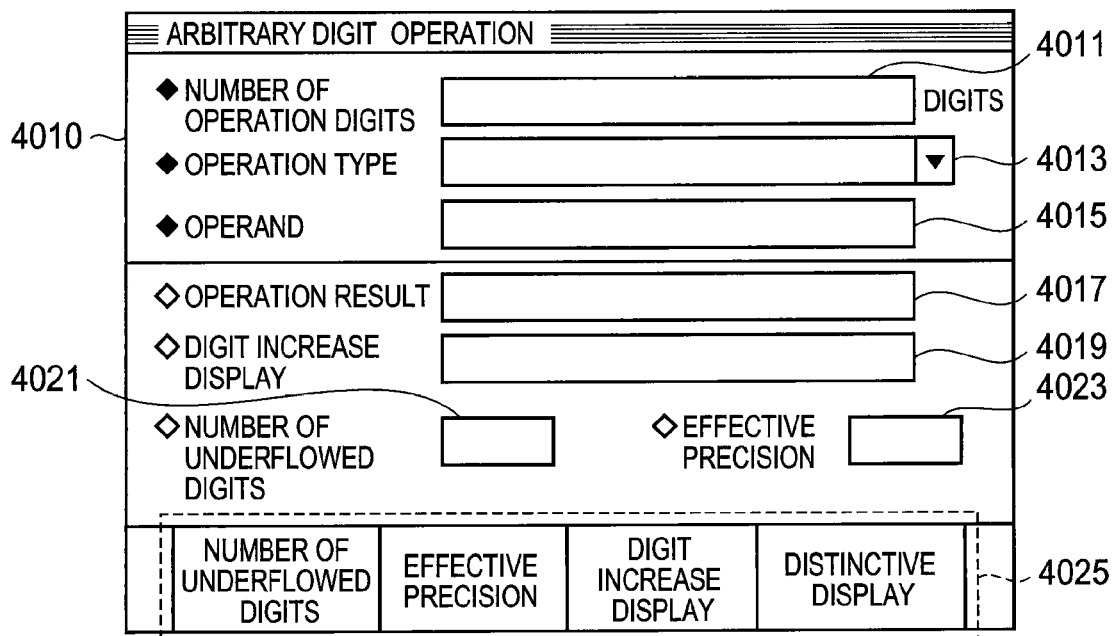
FIG. 33A is a diagram showing one example of a display screen to be displayed in the first operation (designated digit operation) display routine.

FIG. 33A shows a display screen 4010 which is one example of display screens to be displayed on the display section 140 of the graph function electronic calculator 101.

The upper portion of the display screen 4010 shows an operation-digit-number input box 4011 through which a user inputs the number of operation digits, an operation-type designation box 4013 for designating an operation type, and an operand input box 4015 for inputting an operand. The operation type can be selected and designated from a pull-down menu.

The lower portion of the display screen 4010 shows an operation-result display box 4017 which displays the first operation (designated digit operation) result, a digit-number-increase display box 4019 which displays the second operation (additional digit operation) result, an underflowed-digit-number display box 4021 which displays the number of underflowed digits, and an effective-precision-digit-number display box 4023 which displays the number of effective precision digits.

The lowest portion of the display screen 4010 shows four types of display instructions 4025, so that the user understands, at a glance, which display instruction has been given. When the underflowed-digit-number display key 103$d$ is depressed to instruct the underflowed-digit-number display, for example, the portion displayed as "number of underflowed digits" in the display instructions 4025 is highlighted.

Figure 33B:
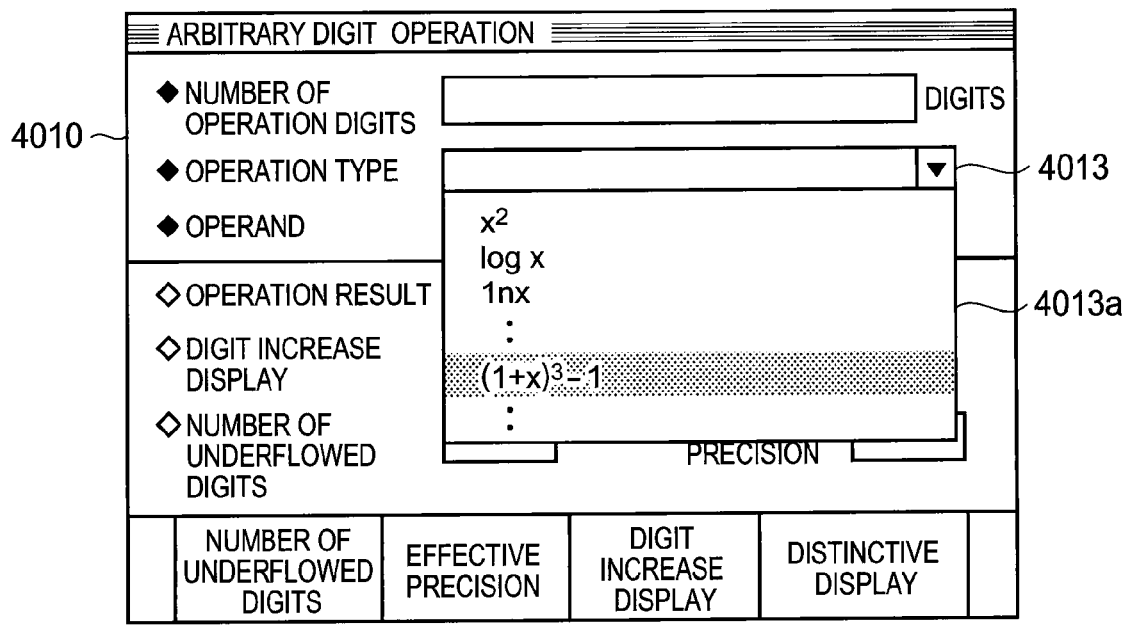
FIG. 33B is a diagram showing one example of a display screen when an operation type is designated.

FIG. 33B shows the display screen 4010 when an operation type is designated from the pull-down menu. The pull-down menu of the operation-type designation box 4013 shows a plurality of operation types, such as "$x^2$" and "logx"; in the example, "$(1+x)^3-1$", which is one type of calculation of compound interest and is indicated by "4013$a$", is designated and highlighted.

FIG. 34A shows the display screen 4010 when the user has input the number of operation digits, has designated the operation type and has input an operand. "8" indicated by "4011a" is input as the number of operation digits in the operation-digit-number input box 4011 (step A1 in FIG. 32), and "$(1+x)^3-1$", indicated by "4013a", is designated as the operation type in the operation-type designation box 4013 (step A3 in FIG. 32). In the operand input box 4015, "0.00123", indicated by "4015a", is designated as an operand (a value to be set in a variable x in this example) (step A5 in FIG. 32).

FIG. 34B shows the display screen 4010 when the first operation (designated digit operation) result is displayed. In the operation-result display box 4017, "3.6945000 e-3", indicated by "4017a", is displayed as the first operation (designated digit operation) result (step A17 in FIG. 32). Of the first operation (designated digit operation) result. "3.6945000" indicates an imaginary portion and "e-3" indicates an exponent portion.

FIG. 35A shows the display screen 4010 when the underflowed-digit-number display is instructed by the user. As the underflowed-digit-number display instruction is given (step A19 in FIG. 32; YES), the "number of underflowed digits" at the lowest portion of the display screen 4010 is highlighted as "4025a", and "3", indicated by "4021a", is displayed as number of underflowed digits in the underflowed-digit-number display box 4021 (step A21 in FIG. 32). This makes it apparent that the first operation (designated digit operation) result has three underflowed digits.

FIG. 35B shows the display screen 4010 when the effective-precision-digit-number display is instructed by the user. As the effective-precision-digit-number display instruction is given (step A23 in FIG. 32; YES), the "effective precision" at the lowest portion of the display screen 4010 is highlighted as "4025b", and "5", indicated by "4023a", is displayed as the number of effective precision digits in the effective-precision-digit-number display box 4023 (step A25 in FIG. 32). This makes it apparent that the number of effective precision digits of the first operation (designated digit operation) result is five.

FIG. 36A shows the display screen 4010 when the digit-number-increase display is instructed by the user. As the digit-number-increase display instruction is given (step A27 in FIG. 32; YES), the "digit increase display" at the lowest portion of the display screen 4010 is highlighted as "4025c", and "3.69454056000 e-3". indicated by "4019a", is displayed as the second operation (additional digit operation) result in the digit-number-increase display box 4019 (step A29 in FIG. 32). That is, it is understood that the second operation (additional digit operation) has been executed in the added number of operation digits of 12 digits resulting from 4 digits added as additional digits to the input number of operation digits of 8 digits (step A9 in FIG. 32). Comparing 4017a or the first operation (designated digit operation) result with 4019a or the second operation (additional digit operation) result, the values of the lower three digits of the first operation (designated digit operation) result do not match with the values of the corresponding digits of the second operation (additional digit operation) result, so that the user understands that the lower three digits of the first operation (designated digit operation) result have underflowed. The result of the operation with the added number of operation digits provides an operation result with a higher precision.

FIG. 36B shows the display screen 4010 when the underflow-portion distinctive display is instructed by the user. As the underflow-portion distinctive display instruction is given (step A33 in FIG. 32; YES), the "distinctive display" at the lowest portion of the display screen 4010 is highlighted as "4025d", and "0" in the lower three digits or the underflowed portion in the first operation (designated digit operation) result is distinctively displayed in the form of a subscript (step A35 in FIG. 32). This allows the user to see, at a glance, that the lower three digits in the first operation (designated digit operation) result displayed are underflowed.

According to the fifth embodiment, as described above, an operation is executed according to the number of operation digits input and the designated operation type, and the number of underflowed digits and the number of effective precision digits of the acquired operation result are detected, thereby presenting a display which notifies underflow of digits. It is therefore possible to realize an arithmetic control unit capable of notifying underflow of digits by executing an operation according to the number of operation digits input, and detecting the exact number of underflowed digits of the acquired operation result.

[Modifications]

Although the value of the underflowed portion is identified by a subscript in the underflow-portion distinctive display at step A33, the identification method is not limited to this particular type. For example, the identification may be made by the thickness of a line in such a way that the value of the underflowed portion is displayed in thin letters while the other values are displayed in bold, or by colors in such a way that the value of the underflowed portion is displayed in red while the other values are displayed in black.

The four types of display instructions have been explained as being independent of one another and being display individually. When a plurality of desired display instructions are given simultaneously, however, the displays may be made simultaneously. When the underflowed-digit-number display instruction and the digit-number-increase display instruction are given simultaneously, for example, simultaneously display of the number of underflowed digits and the second operation (additional digit operation) result allows the user to grasp the occurrence of underflowed digits more easily.

[Sixth Embodiment]

Referring to FIGS. 37A to 39, a description will be given of the sixth embodiment in which the invention is adapted to a graph function electronic calculator which is one type of arithmetic control unit.

The sixth embodiment will be described below referring to FIGS. 37A to 39.

To begin with, the structure of the sixth embodiment will be discussed.

Figure 37A:
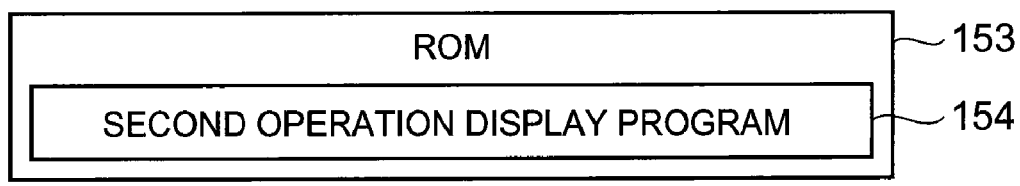
FIG. 37A is a diagram showing the data structure of a ROM according to a sixth embodiment.

FIG. 37A is a diagram showing the structure of the ROM 153 that the graph function electronic calculator 101 according to the sixth embodiment has in place of the ROM 150 in FIG. 30. Stored in the ROM 153 is a second operation display program 154 which is read and executed by the CPU 120 as a second operation (additional digit operation) display routine (see FIG. 38).

The second operation (additional digit operation) routine is to execute an operation according to the input number of operation digits and the designated operation type, detect the number of underflowed digits of an operation result acquired by executing the operation, and display the operation result with underflowed digits corrected. The operation of the second operation (additional digit operation) routine will be described later in detail.

Figure 37B:
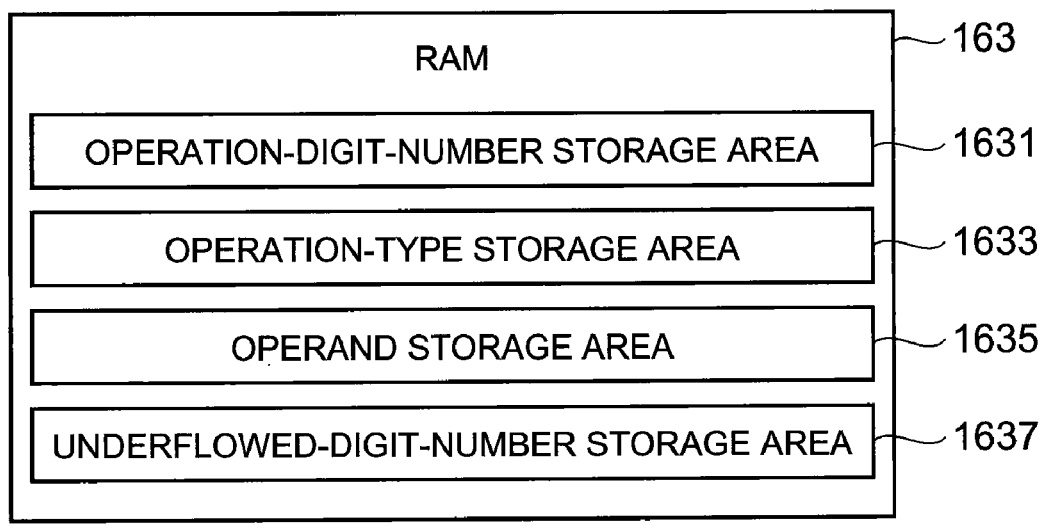
FIG. 37B is a diagram showing the data structure of a RAM according to the sixth embodiment.

FIG. 37B is a diagram showing the structure of the RAM 161 that the graph function electronic calculator 101 according to the sixth embodiment has in place of the RAM 160 in FIG. 30. The RAM 163 has an operation-digit-number storage area 1631 for storing the number of operation digits input by a user, an operation-type storage area 1633 for storing a designated operation type, an operand storage area 1635 for storing an input operand, and an underflowed-digit-number storage area 1637 for storing the number of digits underflowed through an operation. The number of operation digits and the operation type are the same as those of the fifth embodiment.

The operation of the sixth embodiment will now be discussed.

Figure 38:
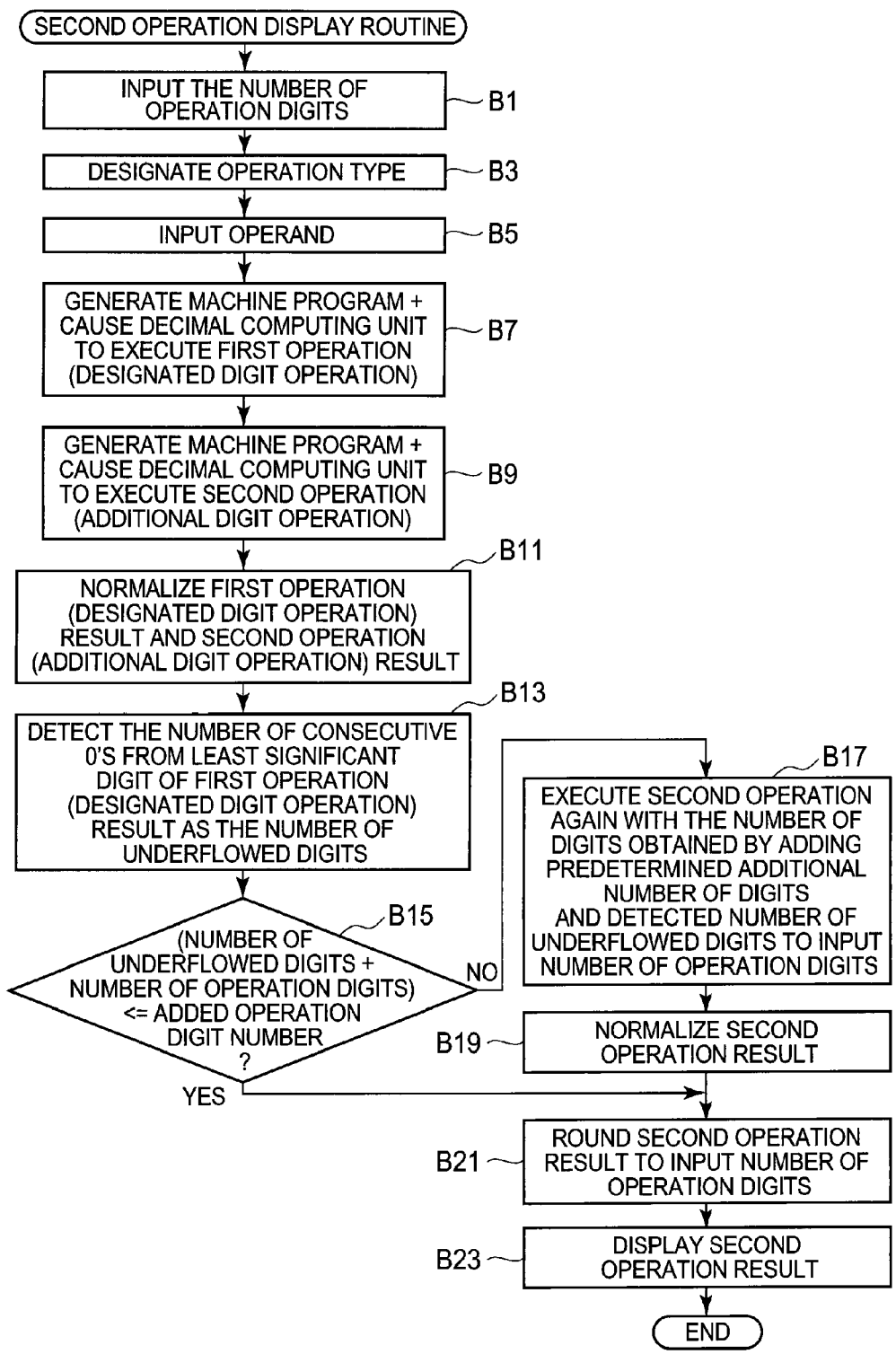
FIG. 38 is a flowchart illustrating the flow of a second operation (additional digit operation) display routine.

FIG. 38 is a flowchart illustrating the flow of a second operation (additional digit operation) routine which is executed by the graph function electronic calculator 101 as the CPU 120 reads and executes the second operation display program 154.

When the number of operation digits is input through the input section 130 by a user (step B1), the CPU 120 stores the input number of operation digits in the operation-digit-number storage area 1631. When an operation type is designated by the user (step B3), the CPU 120 stores the designated operation type in the operation-type storage area 1633. When an operand is input by the user (step B5), the CPU 120 stores the input operand in the operand storage area 1635.

Next, the CPU 120 generates a machine program for executing an operation with the designated operation type in the input number of operation digits by using the input operand, and causes the decimal computing unit 170 to execute the operation (first operation (designated digit operation)) (step B7). The CPU 120 also generates a machine program for executing the operation with the designated operation type in the added number of operation digits which is acquired by adding a predetermined number of additional digits (e.g., "four digits") to the input number of operation digits, and causes the decimal computing unit 170 to execute the operation (second operation (additional digit operation)) (step B9).

Next, the CPU 120 performs normalization of setting the values of the most significant digits of operation results obtained through the first operation (designated digit operation) and the second operation (additional digit operation) to other than "0" (step B11).

Then, the CPU 120 compares the first operation (designated digit operation) result with the second operation (additional digit operation) result and detects the number of digits which do not have a match as the number of underflowed digits (step B13), and stores the number of underflowed digits in the underflowed-digit-number storage area 1637.

Thereafter, the CPU 120 discriminates whether or not the sum of the number of underflowed digits detected at step B13 and the number of operation digits input at step B1 is equal to or smaller than the added operation digit number with which the second operation (additional digit operation) has been executed at step B9 (step B15). When it is discriminated that the sum is not equal to or smaller than the added operation digit number (step B15; NO), the CPU 120 causes the decimal computing unit 170 to execute the second operation (additional digit operation) again with a new added operation digit number obtained by adding a predetermined additional number of digits and the detected number of underflowed digits to the input number of operation digits (step B17).

Then, the CPU 120 performs normalization again to set the value of the most significant digit of the second operation (additional digit operation) result to other than 0 (step B19), rounds off the normalized second operation (additional digit operation) result to the input number of operation digits (step B21), display the rounded second operation (additional digit operation) result on the display section 140 (step B23), then terminates the second operation (additional digit operation) routine. When it is discriminated that the sum is equal to or smaller than the added operation digit number (step B15; YES), the CPU 120 goes to step B21.

The processes discussed above will be described specifically referring to display screen examples.

FIG. 39A shows a display screen 4030 which is one example of display screens to be displayed on the display section 140 of the graph function electronic calculator 101.

"8" digits, "$(1+x)^3-1$" and "0.00123" are input and designated on the display screen 4030 respectively as the number of operation digits, the operation type and an operand, as per the first embodiment (steps B1 to B5 in FIG. 38). In the embodiment, the second operation (additional digit operation) result rounded to the input number of operation digits ("8 digits" in this example) is displayed in an operation-result display box 4031.

FIG. 39B shows the display screen 4030 when the second operation (additional digit operation) result is displayed. In the operation-result display box 4031, "3.6945406 e-3", indicated by "4031*a*". is displayed as the second operation (additional digit operation) result rounded to eight digits or the input number of operation digits (steps B21 and B23 in FIG. 38). in this example, three digits are underflowed in the first operation (designated digit operation) result (step B13 in FIG. 38), the sum of "3", the number of underflowed digits, and "8", the number of operation digits, namely, "11" is equal to or smaller than the added operation digit number (step B15 in FIG. 38; YES), so that the second operation (additional digit operation) result normalized at step B11 is rounded to eight digits directly and displayed (steps B21 and B23 in FIG. 38).

The operation result is equivalent to the result of performing the operation with 12 digits, the added operation digit number, obtained by adding "4", the additional number of digits, to "8", the input number of operation digits, and is the accurate operation result with the number of underflowed digits corrected for three underflowed digits are detected.

As apparent from the above, the sixth embodiment can execute an operation according to the input number of operation digits and the designated operation type, detect the number of underflowed digits in the acquired operation result, and display an operation result with the underflowed digits corrected according to the detected number of underflowed digits.

When the detected number of underflowed digits is 5 so that the sum ("13") of the detected number of underflowed digits "5" and the number of operation digits "8" exceeds the added operation digit number "12" (step B15 in FIG. 38; NO), the operation is executed again with a new added operation digit number "17" obtained by adding the number of underflowed digits "5" and a predetermined number of additional digits "4" to the number of operation digits "8" (step B17 in FIG. 38), and the operation result is rounded off to eight digits (step B21 in FIG. 38), thereby correcting the operation result. Although the predetermined number of additional digits has been mentioned to be "4", the number is not restrictive, and may be set by, for example, a user.

Although the foregoing descriptions of the fifth and sixth embodiments has been given of the case where the invention is adapted to a graph function electronic calculator which is one type of arithmetic control unit, products to which the invention is adaptable are not limited to a graph function electronic calculator, but the invention can be adapted to other types of electronic devices, such as a calculator and a personal computer which do not have a graph drawing capability, and a PDA (Personal Digital Assistance).

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. An arithmetic control unit comprising:
    an operation digit number input section which inputs a number of operation digits according to a user operation;
    an operation type designating section which designates a type of an operation according to the user operation;
    a first operation executing section which executes an operation of the type designated by the operation type designating section in the number of operation digits input by the operation digit number input section;
    a second operation executing section which re-executes the operation in an added number of operation digits which is the number of operation digits input by the operation digit number input section with a predetermined additional number of digits added thereto;
    a value comparing and underflow digit number detecting section which compares values of individual digits of a result of the operation re-executed by the second operation executing section with values of individual digits of a result of the operation executed by the first operation executing section, and detects a number of digits which do not have a value match as a number of underflowed digits; and
    a display control section which performs display control to display the number of underflowed digits detected by the value comparing and underflow digit number detecting section together with the result of the operation executed by the first operation executing section.

2. The arithmetic control unit according to claim 1, wherein the display control section comprises an identification display control section which performs display control to display the underflowed digits and other digits in the result of the operation executed by the first operation executing section in different display modes.

3. The arithmetic control unit according to claim 1, wherein the display control section comprises a simultaneous display control section which displays the result of the operation executed by the first operation executing section and the result of the operation executed by the second operation executing section together.

4. The arithmetic control unit according to claim 1, wherein the display control section comprises a round-off display control section which rounds the result of the operation executed by the second operation executing section to the number of operation digits input by the operation digit number input section and displays the round-off result when a sum of the number of underflowed digits detected by the value comparing and underflow digit number detecting section and the input number of operation digits is equal to or smaller than the added number of operation digits in the operation executed by the second operation executing section.

5. A non-transitory recording medium having recorded thereon a program for controlling a computer having an input section and a display section to perform functions including:
    inputting a number of operation digits according to a user operation through the input section;
    designating a type of an operation according to the user operation through the input section;
    executing an operation of the designated type in the input number of operation digits;
    re-executing the operation in an added number of operation digits which is the input number of operation digits with a predetermined additional number of digits added thereto;
    comparing values of individual digits of a result of the operation re-executed in the added number of operation digits with values of individual digits of a result of the operation executed in the input number of operation digits, and detecting a number of digits which do not have a value match as a number of underflowed digits; and
    displaying the detected number of underflowed digits together with a result of the operation executed in the input number of operation digits on the display section.

* * * * *